US012744931B2

(12) United States Patent
Sethuraman et al.

(10) Patent No.: US 12,744,931 B2

(45) **Date of Patent: *Sep. 22, 2026**

(54) OPTICAL FLOW BASED VIDEO INTER PREDICTION

(71) Applicant: HUAWEI TECHNOLOGIES CO., LTD., Shenzhen (CN)

(72) Inventors: Sriram Sethuraman, Karnataka (IN); Jeeva Raj A, Tamil Nadu (IN); Sagar Kotecha, Maharashtra (IN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/984,482

(22) Filed: Dec. 17, 2024

(65) Prior Publication Data

US 2025/0203107 A1 Jun. 19, 2025

Related U.S. Application Data

(63) Continuation of application No. 18/423,846, filed on Jan. 26, 2024, now Pat. No. 12,212,777, which is a (Continued)

(30) Foreign Application Priority Data

Mar. 19, 2019 (IN) ............................. 201931010751

(51) Int. Cl.

*H04N 19/577* (2014.01)

*H04N 19/132* (2014.01)

(Continued)

(52) U.S. Cl.

CPC ......... *H04N 19/577* (2014.11); *H04N 19/132* (2014.11); *H04N 19/172* (2014.11); *H04N 19/176* (2014.11)

(58) Field of Classification Search

CPC .. H04N 19/577; H04N 19/521; H04N 19/176; H04N 19/172; H04N 19/132

See application file for complete search history.

(56) References Cited

U.S. PATENT DOCUMENTS

2006/0268989 A1* 11/2006 Kadono ............... H04N 19/467 375/E7.199

2018/0376166 A1 12/2018 Chuang et al.

FOREIGN PATENT DOCUMENTS

WO WO-2018166357 A1 * 9/2018 ........... H04N 19/577

WO WO-2018199468 A1 * 11/2018 ........... H04N 19/513

OTHER PUBLICATIONS

Document: JVET-L0123-v2, Li Jingya et al, CE9-related: Simplification of BIO, Joint Video Exploration Team (JVET) of ITU-T SG 16 WP 3 and ISO/IEC JTC 1/SC 29/WG 11, 12th Meeting: Macao, CN, Oct. 3-12, 2018, total 9 pages.

(Continued)

*Primary Examiner* — Kathleen V Nguyen

(74) *Attorney, Agent, or Firm* — WOMBLE BOND DICKINSON (US) LLP

(57) ABSTRACT

In some embodiments, a video encoder or a video decoder obtains a pair of motion vectors for a current coding block of a video signal with respect to two reference frames. Predictions of the current block are generated using the pair of motion vectors from respective reference frames. The video encoder or video decoder further determine an optical flow for the current coding block based on samples values in the predictions. One component of the optical flow is determined based on the other component of the optical flow. Bi-predictive optical flow (BPOF) can be performed on the current coding block using the determined optical flow.

22 Claims, 13 Drawing Sheets

Related U.S. Application Data continuation of application No. 17/478,184, filed on Sep. 17, 2021, now Pat. No. 11,889,109, which is a continuation of application No. PCT/CN2020/080156, filed on Mar. 19, 2020.

(51) Int. Cl.
*H04N 19/172* (2014.01)
*H04N 19/176* (2014.01)

(56) References Cited

OTHER PUBLICATIONS

Document: JVET-M1001-v3, Benjamin Bross et al, Versatile Video Coding (Draft 4), Joint Video Experts Team (JVET) of ITU-T SG 16 WP 3 and ISO/IEC JTC 1/SC 29/WG 11, 13th Meeting: Marrakech, MA, Jan. 9-18, 2019, total 254 pages.
Document: JVET-L0256_v2, Xiaoyu Xiu et al, CE9-related: Complexity reduction and bit-width control for bi-directional optical flow (BIO), Joint Video Experts Team (JVET) of ITU-T SG 16 WP 3 and ISO/IEC JTC 1/SC 29/WG 11, 12th Meeting: Macao, CN, Oct. 3-12, 2018, total 15 pages.
ITU-T H.264(Apr. 2017), Series H: Audiovisual and Multimedia Systems, Infrastructure of audiovisual services—Coding of moving video, Advanced video coding for generic audiovisual services, total 812 pages.
Document: JVET-M0316, Jingya Li et al, CE9-related: simplification of BDOF, Joint Video Experts Team (JVET) of ITU-T SG 16 WP 3 and ISO/IEC JTC 1/SC 29/WG 11, 13th Meeting: Marrakech, MA, Jan. 9-18, 2019, total 7 pages.
ITU-T H.265(Feb. 2018), Series H: Audiovisual and Multimedia Systems Infrastructure of audiovisual services—Coding of moving video, High efficiency video coding, total 692 pages.
Li (Panasonic) J et al: "CE9: Simplification of BDOF"s optical flowparameter derivation (Test 9.2.5), 126. MPEG Meeting; Mar. 25, 2019-Mar. 29, 2019; Geneva; (Motionpicture Expert Group or ISO/IEC JTC1/SC29/WG11), No. m46856 Mar. 13, 2019 (Mar. 13, 2019), XP030209672, Retrieved from the Internet:URL:http://phenix.int-evry.fr/mpeg/doc_end_user/documents/126_Geneva/wg11 /m46856-JVET-N0198-v2-N0198.zip N0198/JVET-N0198-v1.docx [retrieved on Mar. 13, 2019].
Benjamin Bross et al., Versatile Video Coding (Draft 4) , JVET of ITU-T and ISO/IEC, JVET-M1001-v7 (Mar. 17, 2019), 299 Pages.
H. Lee, J. Kang, S.-C. Lim, J. Lee, H. Y. Kim, CE9-related: A simple gradient calculation at the CU boundaries for BDOF,JVET-M0241, Joint Video Experts Team (JVET) of ITU-T SG 16 WP 3 and ISO/IEC JTC 1/SC 29/WG 11,13th Meeting: Marrakech, MA, Jan. 9-18, 2019,total 4 pages.
T. Hashimoto, et al, Non-CE4: Weighted prediction with BDOF and bi-prediction with CU weights harmonization, JVET-M0067-v1, Joint Video Experts Team (JVET) of ITU-T SG 16 WP 3 and ISO/IEC JTC 1/SC 29/WVG 11,13th Meeting: Marrakech, MA, Jan. 9-18, 2019,total 6 pages.
T. Chujoh, T. Ikai (Sharp),Non-CE9: An improvement of BDOF,JVET-M0063-v3, Joint Video Experts Team (JVET) of ITU-T SG 16 WP 3 and ISO/IEC JTC 1/SC 29/WG 11 13th Meeting: Marrakech, MA, Jan. 9-18, 2019,total 4 pages.
S. Sethuraman (Ittiam),Non-CE9: Methods for BDOF complexity reduction,JVET-M0517-v3, Joint Video Experts Team (JVET) of ITU-T SG 16 WP 3 and ISO/IEC JTC 1/SC 29/WG 11,13th Meeting: Marrakech, MA, Jan. 9-18, 2019, total 4 pages.
C.-Y. Chen, et al,CE9-related: Simplification of cascading DMVR and BDOF processes,JVET-N0097-v1, Joint Video Experts Team (JVET) of ITU-T SG 16 WP 3 and ISO/IEC JTC 1/SC 29/WG 11,14th Meeting: Geneva, CH, Mar. 19-27, 2019,total 4 pages.
T. Chujoh, T. Ikai (Sharp), CE9-related: Simplification of BDOF, JVET-N0147-v2,Joint Video Experts Team (JVET) of ITU-T SG 16 WP 3 and ISO/IEC JTC 1/SC 29/WG 11, 14th Meeting: Geneva, CH, Mar. 19-27, 2009,total 4 pages.
T. Chujoh, T. Ikai (Sharp), Non-CE9: Harmonization of DMVR and MMVD, JVET-N0145-v1, Joint Video Experts Team (JVET) of ITU-T SG 16 WP 3 and ISO/IEC JTC 1/SC 29/WG 11,14th Meeting: Geneva, CH, Mar. 19-27, 2019,total 2 pages.
T. Chujoh, T. Ikai (Sharp), Non-CE9: On conditions for DMVR and BDOF,JVET-N0146-v1, Joint Video Experts Team (JVET) of ITU-T SG 16 WP 3 and ISO/IEC JTC 1/SC 29/WG 11,14th Meeting: Geneva, CH, Mar. 19-27, 2019,total 5 pages.

* cited by examiner

518
DISPLAY
512
502
PROCESSOR
506
510
508
DATA
APPLICATION:1…
APPLICATION:VIDEO CODING
APPLICATION:…N
OPERATING SYSTEM
504
500

FIG 7: Bi-predictive Optical Flow

900

OPTICAL FLOW BASED VIDEO INTER PREDICTION

CROSS REFERENCE TO RELATED APPLICATIONS

This application is a continuation of U.S. patent application Ser. No. 18/423,846, filed on Jan. 26, 2024, which is a continuation of U.S. patent application Ser. No. 17/478,184, filed on Sep. 17, 2021, now U.S. Pat. No. 11,889,109, which is a continuation of International Application No. PCT/CN2020/080156, filed on Mar. 19, 2020. The International Application claims priority to Indian Provisional Application No. IN201931010751, filed on Mar. 19, 2019. All of the afore-mentioned patent applications are hereby incorporated by reference in their entireties.

TECHNICAL FIELD

This disclosure relates to video encoding and decoding, especially relates to a method and apparatus for bi-predictive inter prediction using optical flow.

BACKGROUND

Video coding (video encoding and decoding) is used in a wide range of digital video applications, for example broadcast digital TV, video transmission over internet and mobile networks, real-time conversational applications such as video chat, video conferencing, DVD and Blu-ray discs, video content acquisition and editing systems, and camcorders of security applications. The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited.

Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in picture quality are desirable.

In video compression, inter prediction is a process of using reconstructed samples of previously decoded reference pictures by specifying motion vectors relative to a current block. These motion vectors can be coded as a prediction residual by using spatial or temporal motion vector predictors. The motion vectors can be at sub-pixel accuracy. In order to derive the sub-pixel accurate pixel values in the reference frames from the reconstructed integer position values, an interpolation filter is applied.

Bi-prediction refers to a process where the prediction for the current block is derived as a weighted combination of two prediction blocks derived using two motion vectors from two reference picture areas. In this case, in addition to the motion vectors, the reference indices for the reference pictures from which the two prediction blocks are derived also need to be coded. The motion vectors for the current block may also be derived through a merge process where a spatial neighbor's motion vectors and reference indices are inherited without coding any motion vector residuals. In addition to spatial neighbors, motion vectors of previously coded reference frames are also stored and used as temporal merge options with appropriate scaling of the motion vectors to take care of the distance to the reference frames relative to the distance to the reference frames for the current block.

Bi-predictive Optical flow (BPOF) is sample-wise motion refinement which is performed on top of block-wise motion compensation for bi-prediction. Since the conventional estimation of optical flow has complexity issues or a compression efficiency gap, there is a need for improved devices and methods for inter prediction based on optical flow.

SUMMARY

Examples of the present disclosure provide inter prediction apparatuses and methods for encoding and decoding an image through bi-predictive inter prediction using optical flow which can improve the efficiency of a video signal. The disclosure is elaborated in the examples and claims contained in this file.

According to a first aspect, the disclosure relates to a method for bi-directional optical flow (BDOF) based inter prediction for a current block of a video signal, comprising:

- determining a horizontal motion offset, $v_x$ and a vertical motion offset, $v_y$ of the current block, and wherein the vertical motion offset is determined based on the horizontal motion offset and a fifth variable $s_5$, wherein:
  - the fifth variable $s_5$ indicates a sum of a plurality of terms, wherein each of the plurality of terms is obtained from a sign of an element of a second matrix and an element of a first matrix, and the element of the first matrix corresponds to the element of the second matrix;
  - each element of the first matrix is obtained from a sum of a first horizontal predicted sample gradient that corresponds to a first reference frame of the current block and a second horizontal predicted sample gradient that corresponds to a second reference frame of the current block, wherein the first horizontal predicted sample gradient and the second horizontal predicted sample gradient correspond to the element of the first matrix; and
  - each element of the second matrix is obtained from a sum of a first vertical predicted sample gradient that corresponds to the first reference frame of the current block and a second vertical predicted sample gradient that corresponds to the second reference frame of the current block, wherein the first vertical predicted sample gradient and the second vertical predicted sample gradient correspond to the element of the second matrix; and
- determining prediction sample values in the current block using prediction sample values corresponding to the first reference frame, prediction sample values corresponding to the second reference frame, and the horizontal motion offset and the vertical motion offset.

It is noted that the current block can be a block of any size, such as a 4×4 block. The current block can be a sub block of a frame of the video signal. Pixels of the current block can be referred to using absolute positions of the pixels relative to the upper left corner (e.g. the top-left pixel) of the frame, e.g., (x,y), or relative positions of the pixels with respect to the upper left corner (e.g. the top-left pixel) of the block, e.g., (xBlock+i, yBlock+j). Here, (xBlock, yBlock) is the coordinate of the upper left corner (e.g. the top-left pixel) of the block with respect to the upper left corner (e.g. the top-left pixel) of the frame.

It can be understood that the terms "prediction pixel value/prediction sample value", the terms "sample/pixel" and "sample location/pixel location" may be exchanged with each other in the present disclosure.

The first matrix and the second matrix can be any two-dimensional array that include rows and columns and an element of the array can be referred to using (i,j) where x is a horizontal/row index and y is a vertical/column index. The range of i and j can be, for example, i=xBlock−1, . . . , xBlock+4 and j=yBlock−1, . . . , yBlock+4. The first and second matrices correspond to, or are determined for the current block. In some examples, the size of the first matrix is the same as the size of the second matrix which can be larger than the size of the current block. For example, the size of the first matrix and the second matrix can be 6×6, whereas the current block has a size of 4×4.

An element of the first matrix (first element) corresponds to an element of the second matrix (second element) if the first element's position in the first matrix, (x,y) is the same as the second element's position in the second matrix, (p,q), i.e., (x,y)=(p,q). The first horizontal predicted sample gradient corresponds to a first reference frame of the current block means that the first horizontal predicted sample gradient is generated based on samples in the first reference frame of the current block. The second horizontal predicted sample gradient corresponds to the second reference frame of the current block means that the second horizontal predicted sample gradient is generated based on samples in the second reference frame of the current block. The first horizontal predicted sample gradient corresponds to the element of the first matrix means that the first horizontal predicted sample gradient is generated for the position (x,y) of the element in the first matrix. Likewise, the second horizontal predicted sample gradient corresponds to the element of the first matrix means that the second horizontal predicted sample gradient is generated for the position (x,y) of the element in the first matrix.

The first vertical predicted sample gradient corresponds to the first reference frame of the current block means that the first vertical predicted sample gradient is generated based on samples in the first reference frame of the current block. The second vertical predicted sample gradient corresponds to the second reference frame of the current block means that the second vertical predicted sample gradient is generated based on samples in the second reference frame of the current block. The first vertical predicted sample gradient corresponds to the element of the second matrix means that the first vertical predicted sample gradient is generated for the position (p,q) of the element in the second matrix. Likewise, the second vertical predicted sample gradient corresponds to the element of the second matrix means that the second vertical predicted sample gradient is generated for the position (p,q) of the element in the second matrix.

Each element of a matrix is obtained from a sum of two terms means that the element can be determined as the sum of two terms itself or as a value after processing the sum of two terms. The processing can include left shifting, right shifting, clipping, or a combination thereof. Similarly, a term is obtained from a sign of an element of a second matrix and an element of a first matrix means that the term can take the value of the element of the first matrix by itself or after the element of the first matrix being processed and apply the sign of the element of the second matrix. The processing of the element of the first matrix can include left shifting, right shifting, clipping, or a combination thereof. The sign of the element x can be determined as $$\text{Sign}(x) = \begin{cases} 1; & x > 0 \\ 0; & x == 0 \\ -1; & x < 0 \end{cases}$$

The technology presented herein adjusts the bi-predicted sample values of the current block based on the horizontal motion offset and the vertical motion offset. The vertical motion offset are calculated based on a fifth variable $s_5$ which only involves summation of terms obtained from a sign of an element of a second matrix and an element of a first matrix. Applying a sign of one element to another element does not involve multiplication operations. Likewise, summation also does not involve any multiplications. As a result, the BDOF based inter prediction technology presented herein eliminates the multiplication operations. Compared with the traditional approaches, the bit-depth of the fifth variable $s_5$ is reduced because multiplication operations are replaced with the sign determination. This leads to the reduction of the bit-depth of the horizontal motion offset, $v_x$ and the vertical motion offset, $v_y$ and also significant reduction in the computational complexity of the prediction and the size of the multiplier.

In an embodiment, the vertical motion offset is derived based on the horizontal motion offset, a second variable $s_2$, a fourth variable $s_4$ and the fifth variable $s_5$, wherein the second variable $s_2$ indicates a sum of absolute values of elements of the second matrix; and the fourth variable $s_4$ indicates a sum of a plurality of terms, wherein each of the plurality of terms is obtained from a sign of an element of the second matrix and an element of a third matrix, and the element of the third matrix corresponds to the element of the second matrix, and each element of the third matrix is a difference which is obtained from a first predicted sample of the first reference frame that corresponds to the element of the third matrix and a second predicted sample of the second reference frame that corresponds to the element of the third matrix.

It is noted that an element of the third matrix (first element) corresponds to an element of the second matrix (second element) if the first element's position in the third matrix, (k,l) is the same as the second element's position in the second matrix, (p,q), i.e., (k,l)=(p,q). The first predicted sample corresponds to a first reference frame of the current block means that the first predicted sample is in the first reference frame of the current block. The second predicted sample corresponds to the second reference frame of the current block means that the second predicted sample is in the second reference frame of the current block. The first predicted sample corresponds to the element of the third matrix means that the first predicted sample is at the position (k,l) of the element in the third matrix. Likewise, the second predicted sample corresponds to the element of the third matrix means that the second predicted sample is at the position (k,l) of the element in the third matrix.

The additional values, second variable $s_2$ and the fourth variable $s_4$ involved in the calculation of vertical motion offset of the current block also do not involve multiplication operations. Similar to the fifth variable $s_5$, the calculation of the fourth variable $s_4$ only involves summation of terms obtained from a sign of an element of a second matrix and an element of a third matrix. Applying a sign of one element to another element does not involve multiplication operations. Further, summation also does not involve any multiplications. Compared with the traditional approaches, the bit-depth of the fourth variable $s_4$ is reduced because multiplication operations are replaced with the sign determination. Similarly, the calculation of second variable $s_2$ involves taking absolute values of elements of the second matrix and no multiplications are involved. As such, the bit-depth of $s_2$ is also reduced. Consequently, when calculating the vertical motion offset, the bit-depth of the results are also reduced and the computational complexity are significantly reduced.

In an embodiment, the horizontal motion offset is derived based on a first variable $s_1$ and a third variable $s_3$; the first variable $s_1$ indicates a sum of absolute values of elements of the first matrix; and the third variable $s_3$ indicates a sum of a plurality of terms, wherein each of the plurality of terms is obtained from a sign of an element of the first matrix and an element of the third matrix, and the element of the third matrix corresponds to the element of the first matrix.

The element of the third matrix (third element) corresponds to the element of the first matrix (first element) means that the first element's position in the first matrix, (x,y) is the same as the third element's position in the third matrix, (k,l), i.e., (x,y)=(k,l).

By deriving the horizontal motion offset based on the first variable $s_1$ and a third variable $s_3$, additional computational complexity reduction can be achieved. Both the calculation of the first variable $s_1$ and a third variable $s_3$ do not involve multiplications. Rather, only taking absolute values, taking sign operations and summation operations are involved.

In an embodiment, the horizontal motion offset is determined according to $$v_x = -\frac{s_3}{s_1}$$

wherein $v_x$ represents the horizontal motion offset.

This shows a possible way to determine $v_x$ based on autocorrelation and cross correlation terms $s_1$ and $s_3$. $s_1$ and $s_3$ are determined without multiplication operations, which significant reduces the computational complexity of the process for determining $v_x$. As such, by calculating the horizontal motion offset in this way, the horizontal motion offset can be determined efficiently.

In an embodiment, the vertical motion offset $v_y$ is determined according to $$v_y = -\frac{(s_4 - v_x * s_5/2)}{s_2},$$

wherein: $v_x$ represents the horizontal motion offset; and $v_y$ represents the vertical motion offset.

This shows a possible way to determine $v_y$ based on autocorrelation and cross correlation terms $s_2$, $s_4$ and $s_5$. $s_2$, $s_4$ and $s_5$ are determined without multiplication operations, which significant reduces the computational complexity of the process for determining $v_y$. As such, by calculating the vertical motion offset in this way, the vertical motion offset can be determined efficiently.

In an embodiment, $s_1$, $s_2$, $s_3$, $s_4$ and $s_5$ are determined as:

$$s_1 = \sum_{i,j} \text{abs}\ (G_{x1} + G_{x0});$$

-continued $$s_2 = \sum_{i,j} \text{abs}\ (G_{y1} + G_{y0}),$$

$$s_3 = \sum_{i,j} \text{sign}\ (G_{x1} + G_{x0}) * (I^{(1)} - I^{(0)}).$$

$$s_4 = \sum_{i,j} \text{sign}\ (G_{y1} + G_{y0}) * (I^{(1)} - I^{(0)}),$$

$$s_5 = \sum_{i,j} \text{sign}\ (G_{y1} + G_{y0}) * (G_{x1} + G_{x0});$$

and wherein:

- $I^{(0)}$ is obtained from the predicted sample values that correspond to the first reference frame, and $I^{(1)}$ is obtained from the predicted sample values that correspond to the second reference frame;
- $G_{x0}$ and $G_{x1}$ indicate a set of the horizontal predicted sample gradients that correspond to the first reference frame and the second reference frame, respectively;
- $G_{y0}$ and $G_{y1}$ indicate a set of the vertical predicted sample gradients that correspond to the first reference frame and the second reference frame, respectively; and
- i and j are integer numbers, wherein a value of i varies from −1 to 4, and a value of j varies from −1 to 4.

In some embodiments, $I^{(0)}$ is a block including predicted samples in the first reference frame that are around a subblock corresponding to the current block. For example, if the current block is 4×4 block, $I^{(0)}$ can be a 6×6 block in the first reference frame surrounding the 4×4 block that corresponds to the 4×4 current block. Similarly, $I^{(1)}$ is a block including predicted samples in the second reference frame that are around a subblock corresponding to the current block. For example, if the current block is 4×4 block, $I^{(1)}$ can be a 6×6 block in the second reference frame surrounding the 4×4 block that corresponds to the 4×4 current block.

If the current block is a 4×4 block and the $I^{(0)}$ and $I^{(1)}$ are both 6×6 blocks, each of $G_{x0}$ and $G_{x1}$ is a 6×6 block.

Note that when calculating the autocorrelation and cross correlation terms $s_1$, $s_2$, $s_3$, $s_4$ and $s_5$, shifting can be applied to adjust the precision and/or bit depth of $s_1$, $s_2$, $s_3$, $s_4$ and $s_5$.

It is further noted that $s_1$, $s_2$, $s_3$, $s_4$ and $s_5$ are determined without multiplication operations, which significant reduces the computational complexity of the process for determining $v_x$ and $v_y$. $v_x$ and $v_y$ are derived based on autocorrelation and cross correlation terms as shown above with regard to $s_1$, $s_2$, $s_3$, $s_4$ and $s_5$. $v_x$ and $v_y$ can be determined as $$v_x = \frac{s_3}{s_1} \text{ and } v_y = \frac{(s_4 - v_x * s_5/2)}{s_2}$$

if the term $(I^{(1)}-I^{(0)})$ is changed to $(I^{(0)}-I^{(1)})$.

In an embodiment, the $G_{x0}$ is determined as a difference obtained from two predicted samples that correspond to the first reference frame along a horizontal direction, and the $G_{y0}$ is determined as a difference obtained from two predicted samples that correspond to the first reference frame along a vertical direction.

In some examples, the two predicted samples that correspond to the first reference frame along a horizontal direction have the same vertical coordinates and different horizontal coordinates. The two predicted samples that correspond to the first reference frame along a vertical direction have the same horizontal coordinates and different vertical coordinates. The two predicted samples can each be processed before the difference is calculated, such as right shift, left shift or clipping.

In an embodiment, the $G_{x1}$ is determined as a difference obtained from two predicted samples that correspond to the second reference frame along a horizontal direction, and the $G_{y1}$ is determined as a difference obtained from two predicted samples that correspond to the second reference frame along a vertical direction.

In some examples, the two predicted samples that correspond to the second reference frame along a horizontal direction have the same vertical coordinates and different horizontal coordinates. The two predicted samples that correspond to the second reference frame along a vertical direction have the same horizontal coordinates and different vertical coordinates. The two predicted samples can each be processed before the difference is calculated, such as right shift, left shift or clipping.

In an embodiment, the prediction sample values corresponding to the first reference frame and the prediction sample values corresponding to the second reference frame are obtained from the first and second reference frames, respectively, using a pair of motion vectors for the current block with respect to the first and second reference frames.

In an embodiment, the prediction sample values for the current block are bi-predicted sample values based on bi-directional optical flow (BDOF) prediction.

According to a second aspect, the disclosure relates to a device for encoding video data, comprising:

a video data memory; and a video encoder, wherein the video encoder is configured to:

determining a horizontal motion offset, $v_x$ and a vertical motion offset, $v_y$, of a current block of a video signal, and wherein the vertical motion offset is determined based on the horizontal motion offset and a fifth variable $s_5$, wherein:

the fifth variable $s_5$ indicates a sum of a plurality of terms, wherein each of the plurality of terms is obtained from a sign of an element of a second matrix and an element of a first matrix, and the element of the first matrix corresponds to the element of the second matrix;

each element of the first matrix is obtained from a sum of a first horizontal predicted sample gradient that corresponds to a first reference frame of the current block and a second horizontal predicted sample gradient that corresponds to a second reference frame of the current block, wherein the first horizontal predicted sample gradient and the second horizontal predicted sample gradient correspond to the element of the first matrix; and each element of the second matrix is obtained from a sum of a first vertical predicted sample gradient that corresponds to the first reference frame of the current block and a second vertical predicted sample gradient that corresponds to the second reference frame of the current block, wherein the first vertical predicted sample gradient and the second vertical predicted sample gradient correspond to the element of the second matrix; and determining prediction sample values in the current block using prediction sample values corresponding to the first reference frame, prediction sample values corresponding to the second reference frame, and the horizontal motion offset and the vertical motion offset.

It is noted that the current block can be a block of any size, such as a 4×4 block. The current block can be a sub block of a frame of the video signal. Pixels of the current block can be referred to using absolute positions of the pixels with respect to the upper left corner of the frame, e.g., (x,y), or relative positions of the pixels with respect to the upper left corner of the block, e.g., (xBlock+i, yBlock+j). Here, (xBlock, yBlock) is the coordinate of the upper left corner of the block with respect to the upper left corner of the frame.

The first matrix and the second matrix can be any two-dimensional array that include rows and columns and an element of the array can be referred to using (i,j) where x is a horizontal/row index and y is a vertical/column index. The range of i and j can be, for example, i=xBlock−1, . . . , xBlock+4 and j=yBlock−1, . . . , yBlock+4. The first and second matrices correspond to, or are determined for the current block. In some examples, the size of the first matrix is the same as the size of the second matrix which can be larger than the size of the current block. For example, the size of the first matrix and the second matrix can be 6×6, whereas the current block has a size of 4×4.

An element of the first matrix (first element) corresponds to an element of the second matrix (second element) if the first element's position in the first matrix, (x,y) is the same as the second element's position in the second matrix, (p,q), i.e., (x,y)=(p,q). The first horizontal predicted sample gradient corresponds to a first reference frame of the current block means that the first horizontal predicted sample gradient is generated based on samples in the first reference frame of the current block. The second horizontal predicted sample gradient corresponds to the second reference frame of the current block means that the second horizontal predicted sample gradient is generated based on samples in the second reference frame of the current block. The first horizontal predicted sample gradient corresponds to the element of the first matrix means that the first horizontal predicted sample gradient is generated for the position (x,y) of the element in the first matrix. Likewise, the second horizontal predicted sample gradient corresponds to the element of the first matrix means that the second horizontal predicted sample gradient is generated for the position (x,y) of the element in the first matrix.

The first vertical predicted sample gradient corresponds to the first reference frame of the current block means that the first vertical predicted sample gradient is generated based on samples in the first reference frame of the current block. The second vertical predicted sample gradient corresponds to the second reference frame of the current block means that the second vertical predicted sample gradient is generated based on samples in the second reference frame of the current block. The first vertical predicted sample gradient corresponds to the element of the second matrix means that the first vertical predicted sample gradient is generated for the position (p,q) of the element in the second matrix. Likewise, the second vertical predicted sample gradient corresponds to the element of the second matrix means that the second vertical predicted sample gradient is generated for the position (p,q) of the element in the second matrix.

Each element of a matrix is obtained from a sum of two terms means that the element can be determined as the sum of two terms itself or as a value after processing the sum of two terms. The processing can include left shifting, right shifting, clipping, or a combination thereof. Similarly, a term is obtained from a sign of an element of a second matrix and an element of a first matrix means that the term can take the value of the element of the first matrix by itself or after the element of the first matrix being processed and apply the sign of the element of the second matrix. The processing of the element of the first matrix can include left shifting, right shifting, clipping, or a combination thereof. The sign of the element x can be determined as $$\mathrm{Sign}(x) = \begin{cases} 1; & x > 0 \\ 0; & x == 0 \\ -1; & x < 0 \end{cases}$$

The technology presented herein adjusts the bi-predicted sample values of the current block based on the horizontal motion offset and the vertical motion offset. The vertical motion offset are calculated based on a fifth variable $s_5$ which only involves summation of terms obtained from a sign of an element of a second matrix and an element of a first matrix. Applying a sign of one element to another element does not involve multiplication operations. Likewise, summation also does not involve any multiplications. As a result, the BDOF based inter prediction technology presented herein eliminates the multiplication operations. Compared with the traditional approaches, the bit-depth of the fifth variable $s_5$ is reduced because multiplication operations are replaced with the sign determination. This leads to the reduction of the bit-depth of the horizontal motion offset, $v_x$ and the vertical motion offset, $v_y$ and also significant reduction in the computational complexity of the prediction and the size of the multiplier.

According to a third aspect, the disclosure relates to a device for decoding video data, comprising:

- a video data memory; and
- a video decoder, wherein the video decoder is configured to:
  - determining a horizontal motion offset, $v_x$ and a vertical motion offset, $v_y$ of a current block of a video signal, and wherein the vertical motion offset is determined based on the horizontal motion offset and a fifth variable $s_5$, wherein:
    - the fifth variable $s_5$ indicates a sum of a plurality of terms, wherein each of the plurality of terms is obtained from a sign of an element of a second matrix and an element of a first matrix, and the element of the first matrix corresponds to the element of the second matrix;
    - each element of the first matrix is obtained from a sum of a first horizontal predicted sample gradient that corresponds to a first reference frame of the current block and a second horizontal predicted sample gradient that corresponds to a second reference frame of the current block, wherein the first horizontal predicted sample gradient and the second horizontal predicted sample gradient correspond to the element of the first matrix; and
    - each element of the second matrix is obtained from a sum of a first vertical predicted sample gradient that corresponds to the first reference frame of the current block and a second vertical predicted sample gradient that corresponds to the second reference frame of the current block, wherein the first vertical predicted sample gradient and the second vertical predicted sample gradient correspond to the element of the second matrix; and
  - determining prediction sample values in the current block using prediction sample values corresponding to the first reference frame, prediction sample values corresponding to the second reference frame, and the horizontal motion offset and the vertical motion offset.

It is noted that the current block can be a block of any size, such as a 4×4 block. The current block can be a sub block of a frame of the video signal. Pixels of the current block can be referred to using absolute positions of the pixels with respect to the upper left corner of the frame, e.g., (x,y), or relative positions of the pixels with respect to the upper left corner of the block, e.g., (xBlock+i, yBlock+j). Here, (xBlock, yBlock) is the coordinate of the upper left corner of the block with respect to the upper left corner of the frame.

The first matrix and the second matrix can be any two-dimensional array that include rows and columns and an element of the array can be referred to using (i,j) where x is a horizontal/row index and y is a vertical/column index. The range of i and j can be, for example, i=xBlock−1, . . . , xBlock+4 and j=yBlock−1, . . . , yBlock+4. The first and second matrices correspond to, or are determined for the current block. In some examples, the size of the first matrix is the same as the size of the second matrix which can be larger than the size of the current block. For example, the size of the first matrix and the second matrix can be 6×6, whereas the current block has a size of 4×4.

An element of the first matrix (first element) corresponds to an element of the second matrix (second element) if the first element's position in the first matrix, (x,y) is the same as the second element's position in the second matrix, (p,q), i.e., (x,y)=(p,q). The first horizontal predicted sample gradient corresponds to a first reference frame of the current block means that the first horizontal predicted sample gradient is generated based on samples in the first reference frame of the current block. The second horizontal predicted sample gradient corresponds to the second reference frame of the current block means that the second horizontal predicted sample gradient is generated based on samples in the second reference frame of the current block. The first horizontal predicted sample gradient corresponds to the element of the first matrix means that the first horizontal predicted sample gradient is generated for the position (x,y) of the element in the first matrix. Likewise, the second horizontal predicted sample gradient corresponds to the element of the first matrix means that the second horizontal predicted sample gradient is generated for the position (x,y) of the element in the first matrix.

The first vertical predicted sample gradient corresponds to the first reference frame of the current block means that the first vertical predicted sample gradient is generated based on samples in the first reference frame of the current block. The second vertical predicted sample gradient corresponds to the second reference frame of the current block means that the second vertical predicted sample gradient is generated based on samples in the second reference frame of the current block. The first vertical predicted sample gradient corresponds to the element of the second matrix means that the first vertical predicted sample gradient is generated for the position (p,q) of the element in the second matrix. Likewise, the second vertical predicted sample gradient corresponds to the element of the second matrix means that the second vertical predicted sample gradient is generated for the position (p,q) of the element in the second matrix.

Each element of a matrix is obtained from a sum of two terms means that the element can be determined as the sum of two terms itself or as a value after processing the sum of two terms. The processing can include left shifting, right shifting, clipping, or a combination thereof. Similarly, a term is obtained from a sign of an element of a second matrix and an element of a first matrix means that the term can take the value of the element of the first matrix by itself or after the element of the first matrix being processed and apply the sign of the element of the second matrix. The processing of the element of the first matrix can include left shifting, right shifting, clipping, or a combination thereof. The sign of the element x can be determined as $$\mathrm{Sign}(x) = \begin{cases} 1; & x > 0 \\ 0; & x == 0 \\ -1; & x < 0 \end{cases}$$

The technology presented herein adjusts the bi-predicted sample values of the current block based on the horizontal motion offset and the vertical motion offset. The vertical motion offset are calculated based on a fifth variable $s_5$ which only involves summation of terms obtained from a sign of an element of a second matrix and an element of a first matrix. Applying a sign of one element to another element does not involve multiplication operations. Likewise, summation also does not involve any multiplications. As a result, the BDOF based inter prediction technology presented herein eliminates the multiplication operations. Compared with the traditional approaches, the bit-depth of the fifth variable $s_5$ is reduced because multiplication operations are replaced with the sign determination. This leads to the reduction of the bit-depth of the horizontal motion offset, $v_x$ and the vertical motion offset, $v_y$ and also significant reduction in the computational complexity of the prediction and the size of the multiplier.

In an embodiment, the vertical motion offset is derived based on the horizontal motion offset, a second variable $s_2$, a fourth variable $s_4$ and the fifth variable $s_5$, wherein:

the second variable $s_2$ indicates a sum of absolute values of elements of the second matrix; and the fourth variable $s_4$ indicates a sum of a plurality of terms, wherein each of the plurality of terms is obtained from a sign of an element of the second matrix and an element of a third matrix, and the element of the third matrix corresponds to the element of the second matrix, and each element of the third matrix is a difference which is obtained from a first predicted sample of the first reference frame that corresponds to the element of the third matrix and a second predicted sample of the second reference frame that corresponds to the element of the third matrix.

It is noted that an element of the third matrix (first element) corresponds to an element of the second matrix (second element) if the first element's position in the third matrix, (k,l) is the same as the second element's position in the second matrix, (p,q), i.e., (k,l)=(p,q). The first predicted sample corresponds to a first reference frame of the current block means that the first predicted sample is in the first reference frame of the current block. The second predicted sample corresponds to the second reference frame of the current block means that the second predicted sample is in the second reference frame of the current block. The first predicted sample corresponds to the element of the third matrix means that the first predicted sample is at the position (k,l) of the element in the third matrix. Likewise, the second predicted sample corresponds to the element of the third matrix means that the second predicted sample is at the position (k,l) of the element in the third matrix.

The additional values, second variable $s_2$ and the fourth variable $s_4$ involved in the calculation of vertical motion offset of the current block also do not involve multiplication operations. Similar to the fifth variable $s_5$, the calculation of the fourth variable $s_4$ only involves summation of terms obtained from a sign of an element of a second matrix and an element of a third matrix. Applying a sign of one element to another element does not involve multiplication operations. Further, summation also does not involve any multiplications. Compared with the traditional approaches, the bit-depth of the fourth variable $s_4$ is reduced because multiplication operations are replaced with the sign determination. Similarly, the calculation of second variable $s_2$ involves taking absolute values of elements of the second matrix and no multiplications are involved. As such, the bit-depth of $s_2$ is also reduced. Consequently, when calculating the vertical motion offset, the bit-depth of the results are also reduced and the computational complexity are significantly reduced.

In an embodiment, the horizontal motion offset is derived based on a first variable $s_1$ and a third variable $s_3$;

the first variable $s_1$ indicates a sum of absolute values of elements of the first matrix; and the third variable $s_3$ indicates a sum of a plurality of terms, wherein each of the plurality of terms is obtained from a sign of an element of the first matrix and an element of the third matrix, and the element of the third matrix corresponds to the element of the first matrix.

The element of the third matrix (third element) corresponds to the element of the first matrix (first element) means that the first element's position in the first matrix, (x,y) is the same as the third element's position in the third matrix, (k,l), i.e., (x,y)=(k,l).

By deriving the horizontal motion offset based on the first variable $s_1$ and a third variable $s_3$, additional computational complexity reduction can be achieved. Both the calculation of the first variable $s_1$ and a third variable $s_3$ do not involve multiplications. Rather, only taking absolute values, taking sign operations and summation operations are involved.

In an embodiment, the horizontal motion offset is determined according to $$v_x = -\frac{s_3}{s_1}$$

wherein:

$v_x$ represents the horizontal motion offset.

This shows a possible way to determine $v_x$ based on autocorrelation and cross correlation terms $s_1$ and $s_3$. $s_1$ and $s_3$ are determined without multiplication operations, which significant reduces the computational complexity of the process for determining $v_x$. As such, by calculating the horizontal motion offset in this way, the horizontal motion offset can be determined efficiently.

In an embodiment, the vertical motion offset $v_y$ is determined according to $$v_y = -\frac{(s_4 - v_x * s_5/2)}{s_2},$$

wherein:

$v_x$ represents the horizontal motion offset; and $v_y$ represents the vertical motion offset.

This shows a possible way to determine $v_y$ based on autocorrelation and cross correlation terms $s_2$, $s_4$ and $s_5$. $s_2$, $s_4$ and $s_5$ are determined without multiplication operations, which significant reduces the computational complexity of the process for determining $v_y$. As such, by calculating the vertical motion offset in this way, the vertical motion offset can be determined efficiently.

In an embodiment, $s_1$, $s_2$, $s_3$, $s_4$ and $s_5$ are determined as:

$$s_1 = \sum_{i,j} \text{abs}\,(G_{x1} + G_{x0});$$

$$s_2 = \sum_{i,j} \text{abs}\,(G_{y1} + G_{y0}),$$

$$s_3 = \sum_{i,j} \text{sign}\,(G_{x1} + G_{x0}) * \left(I^{(1)} - I^{(0)}\right).$$

$$s_4 = \sum_{i,j} \text{sign}\,(G_{y1} + G_{y0}) * \left(I^{(1)} - I^{(0)}\right),$$

$$s_5 = \sum_{i,j} \text{sign}\,(G_{y1} + G_{y0}) * (G_{x1} + G_{x0});$$

and wherein:

- $I^{(0)}$ is obtained from the predicted sample values that correspond to the first reference frame, and $I^{(1)}$ is obtained from the predicted sample values that correspond to the second reference frame;
- $G_{x0}$ and $G_{x1}$ indicate a set of the horizontal predicted sample gradients that correspond to the first reference frame and the second reference frame, respectively;
- $G_{y0}$ and $G_{y1}$ indicate a set of the vertical predicted sample gradients that correspond to the first reference frame and the second reference frame, respectively; and
- i and j are integer numbers, wherein a value of i varies from −1 to 4, and a value of j varies from −1 to 4.

In some examples, $I^{(0)}$ is a block including predicted samples in the first reference frame that are around a subblock corresponding to the current block. For example, if the current block is 4×4 block, $I^{(0)}$ can be a 6×6 block in the first reference frame surrounding the 4×4 block that corresponds to the 4×4 current block. Similarly, $I^{(1)}$ is a block including predicted samples in the second reference frame that are around a subblock corresponding to the current block. For example, if the current block is 4×4 block, $I^{(1)}$ can be a 6×6 block in the second reference frame surrounding the 4×4 block that corresponds to the 4×4 current block.

If the current block is a 4×4 block and the $I^{(0)}$ and $I^{(1)}$ are both 6×6 blocks, each of $G_{x0}$ and $G_{x1}$ is a 6×6 block.

Note that when calculating the autocorrelation and cross correlation terms $s_1$, $s_2$, $s_3$, $s_4$ and $s_5$, shifting can be applied to adjust the precision and/or bit depth of $s_1$, $s_2$, $s_3$, $s_4$ and $s_5$.

It is further noted that $s_1$, $s_2$, $s_3$, $s_4$ and $s_5$ are determined without multiplication operations, which significant reduces the computational complexity of the process for determining $v_x$ and $v_y$. $v_x$ and $v_y$ are derived based on autocorrelation and cross correlation terms as shown above with regard to $s_1$, $s_2$, $s_3$, $s_4$ and $s_5$. $v_x$ and $v_y$ can be determined as $$v_x = \frac{s_3}{s_1} \text{ and } v_y = \frac{(s_4 - v_x * s_5/2)}{s_2}$$

if the term $(I^{(1)}-I^{(0)})$ is changed to $(I^{(0)}-I^{(1)})$.

In an embodiment, the $G_{x0}$ is determined as a difference obtained from two predicted samples that correspond to the first reference frame along a horizontal direction, and the $G_{y0}$ is determined as a difference obtained from two predicted samples that correspond to the first reference frame along a vertical direction.

In some examples, the two predicted samples that correspond to the first reference frame along a horizontal direction have the same vertical coordinates and different horizontal coordinates. The two predicted samples that correspond to the first reference frame along a vertical direction have the same horizontal coordinates and different vertical coordinates. The two predicted samples can each be processed before the difference is calculated, such as right shift, left shift or clipping.

In an embodiment, the $G_{x1}$ is determined as a difference obtained from two predicted samples that correspond to the second reference frame along a horizontal direction, and the $G_{y1}$ is determined as a difference obtained from two predicted samples that correspond to the second reference frame along a vertical direction.

In some examples, the two predicted samples that correspond to the second reference frame along a horizontal direction have the same vertical coordinates and different horizontal coordinates. The two predicted samples that correspond to the second reference frame along a vertical direction have the same horizontal coordinates and different vertical coordinates. The two predicted samples can each be processed before the difference is calculated, such as right shift, left shift or clipping.

In an embodiment, the prediction sample values corresponding to the first reference frame and the prediction sample values corresponding to the second reference frame are obtained from the first and second reference frames, respectively, using a pair of motion vectors for the current block with respect to the first and second reference frames.

In an embodiment, the prediction sample values for the current block are bi-predicted sample values based on bi-directional optical flow (BDOF) prediction.

According to a fourth aspect, the disclosure relates to an apparatus for performing bi-directional optical flow (BDOF) based inter prediction for a current block of a video signal, comprising:

- a determining unit configured to determining a horizontal motion offset, $v_x$ and a vertical motion offset, $v_y$ of the current block, and wherein the vertical motion offset is determined based on the horizontal motion offset and a fifth variable $s_5$, wherein:
  - the fifth variable $s_5$ indicates a sum of a plurality of terms, wherein each of the plurality of terms is obtained from a sign of an element of a second matrix and an element of a first matrix, and the element of the first matrix corresponds to the element of the second matrix;
  - each element of the first matrix is obtained from a sum of a first horizontal predicted sample gradient that corresponds to a first reference frame of the current block and a second horizontal predicted sample gradient that corresponds to a second reference frame of the current block, wherein the first horizontal predicted sample gradient and the second horizontal predicted sample gradient correspond to the element of the first matrix; and
  - each element of the second matrix is obtained from a sum of a first vertical predicted sample gradient that corresponds to the first reference frame of the current block and a second vertical predicted sample gradient that corresponds to the second reference frame of the current block, wherein the first vertical predicted sample gradient and the second vertical predicted sample gradient correspond to the element of the second matrix; and a prediction processing unit configured to predict prediction sample values in the current block using prediction sample values corresponding to the first reference frame, prediction sample values corresponding to the second reference frame, and the horizontal motion offset and the vertical motion offset.

It is noted that the current block can be a block of any size, such as a 4×4 block. The current block can be a sub block of a frame of the video signal. Pixels of the current block can be referred to using absolute positions of the pixels with respect to the upper left corner of the frame, e.g., (x,y), or relative positions of the pixels with respect to the upper left corner of the block, e.g., (xBlock+i, yBlock+j). Here, (xBlock, yBlock) is the coordinate of the upper left corner of the block with respect to the upper left corner of the frame.

The first matrix and the second matrix can be any two-dimensional array that include rows and columns and an element of the array can be referred to using (i,j) where x is a horizontal/row index and y is a vertical/column index. The range of i and j can be, for example, i=xBlock−1, . . . , xBlock+4 and j=yBlock−1, . . . , yBlock+4. The first and second matrices correspond to, or are determined for the current block. In some examples, the size of the first matrix is the same as the size of the second matrix which can be larger than the size of the current block. For example, the size of the first matrix and the second matrix can be 6×6, whereas the current block has a size of 4×4.

An element of the first matrix (first element) corresponds to an element of the second matrix (second element) if the first element's position in the first matrix, (x,y) is the same as the second element's position in the second matrix, (p,q), i.e., (x,y)=(p,q). The first horizontal predicted sample gradient corresponds to a first reference frame of the current block means that the first horizontal predicted sample gradient is generated based on samples in the first reference frame of the current block. The second horizontal predicted sample gradient corresponds to the second reference frame of the current block means that the second horizontal predicted sample gradient is generated based on samples in the second reference frame of the current block. The first horizontal predicted sample gradient corresponds to the element of the first matrix means that the first horizontal predicted sample gradient is generated for the position (x,y) of the element in the first matrix. Likewise, the second horizontal predicted sample gradient corresponds to the element of the first matrix means that the second horizontal predicted sample gradient is generated for the position (x,y) of the element in the first matrix.

The first vertical predicted sample gradient corresponds to the first reference frame of the current block means that the first vertical predicted sample gradient is generated based on samples in the first reference frame of the current block. The second vertical predicted sample gradient corresponds to the second reference frame of the current block means that the second vertical predicted sample gradient is generated based on samples in the second reference frame of the current block. The first vertical predicted sample gradient corresponds to the element of the second matrix means that the first vertical predicted sample gradient is generated for the position (p,q) of the element in the second matrix. Likewise, the second vertical predicted sample gradient corresponds to the element of the second matrix means that the second vertical predicted sample gradient is generated for the position (p,q) of the element in the second matrix.

Each element of a matrix is obtained from a sum of two terms means that the element can be determined as the sum of two terms itself or as a value after processing the sum of two terms. The processing can include left shifting, right shifting, clipping, or a combination thereof. Similarly, a term is obtained from a sign of an element of a second matrix and an element of a first matrix means that the term can take the value of the element of the first matrix by itself or after the element of the first matrix being processed and apply the sign of the element of the second matrix. The processing of the element of the first matrix can include left shifting, right shifting, clipping, or a combination thereof. The sign of the element x can be determined as $$\mathrm{Sign}(x) = \begin{cases} 1; & x > 0 \\ 0; & x == 0 \\ -1; & x < 0 \end{cases}$$

The technology presented herein adjusts the bi-predicted sample values of the current block based on the horizontal motion offset and the vertical motion offset. The vertical motion offset are calculated based on a fifth variable $s_5$ which only involves summation of terms obtained from a sign of an element of a second matrix and an element of a first matrix. Applying a sign of one element to another element does not involve multiplication operations. Likewise, summation also does not involve any multiplications. As a result, the BDOF based inter prediction technology presented herein eliminates the multiplication operations. Compared with the traditional approaches, the bit-depth of the fifth variable $s_5$ is reduced because multiplication operations are replaced with the sign determination. This leads to the reduction of the bit-depth of the horizontal motion offset, $v_x$ and the vertical motion offset, $v_y$ and also significant reduction in the computational complexity of the prediction and the size of the multiplier.

In an embodiment, the determining unit is configured to determine the vertical motion offset based on the horizontal motion offset, a second variable $s_2$, a fourth variable $s_4$ and the fifth variable $s_5$, wherein:

the second variable $s_2$ indicates a sum of absolute values of elements of the second matrix; and the fourth variable $s_4$ indicates a sum of a plurality of terms, wherein each of the plurality of terms is obtained from a sign of an element of the second matrix and an element of a third matrix, and the element of the third matrix corresponds to the element of the second matrix, and each element of the third matrix is a difference which is obtained from a first predicted sample of the first reference frame that corresponds to the element of the third matrix and a second predicted sample of the second reference frame that corresponds to the element of the third matrix.

It is noted that an element of the third matrix (first element) corresponds to an element of the second matrix (second element) if the first element's position in the third matrix, (k,l) is the same as the second element's position in the second matrix, (p,q), i.e., (k,l)=(p,q). The first predicted sample corresponds to a first reference frame of the current block means that the first predicted sample is in the first reference frame of the current block. The second predicted sample corresponds to the second reference frame of the current block means that the second predicted sample is in the second reference frame of the current block. The first predicted sample corresponds to the element of the third matrix means that the first predicted sample is at the position (k,l) of the element in the third matrix. Likewise, the second predicted sample corresponds to the element of the third matrix means that the second predicted sample is at the position (k,l) of the element in the third matrix.

The additional values, second variable $s_2$ and the fourth variable $s_4$ involved in the calculation of vertical motion offset of the current block also do not involve multiplication operations. Similar to the fifth variable $s_5$, the calculation of the fourth variable $s_4$ only involves summation of terms obtained from a sign of an element of a second matrix and an element of a third matrix. Applying a sign of one element to another element does not involve multiplication operations. Further, summation also does not involve any multiplications. Compared with the traditional approaches, the bit-depth of the fourth variable $s_4$ is reduced because multiplication operations are replaced with the sign determination. Similarly, the calculation of second variable $s_2$ involves taking absolute values of elements of the second matrix and no multiplications are involved. As such, the bit-depth of $s_2$ is also reduced. Consequently, when calculating the vertical motion offset, the bit-depth of the results are also reduced and the computational complexity are significantly reduced.

In an embodiment, the determining unit is configured to determine the horizontal motion offset based on a first variable $s_1$ and a third variable $s_3$, wherein the first variable $s_1$ indicates a sum of absolute values of elements of the first matrix; and the third variable $s_3$ indicates a sum of a plurality of terms, wherein each of the plurality of terms is obtained from a sign of an element of the first matrix and an element of the third matrix, and the element of the third matrix corresponds to the element of the first matrix.

The element of the third matrix (third element) corresponds to the element of the first matrix (first element) means that the first element's position in the first matrix, (x,y) is the same as the third element's position in the third matrix, (k,l), i.e., (x,y)=(k,l).

By deriving the horizontal motion offset based on the first variable $s_1$ and a third variable $s_3$, additional computational complexity reduction can be achieved. Both the calculation of the first variable $s_1$ and a third variable $s_3$ do not involve multiplications. Rather, only taking absolute values, taking sign operations and summation operations are involved.

In an embodiment, the determining unit is configured to determine the horizontal motion offset according to $$v_x = -\frac{s_3}{s_1}$$

wherein:

$v_x$ represents the horizontal motion offset.

This shows a possible way to determine $v_x$ based on autocorrelation and cross correlation terms $s_1$ and $s_3$. $s_1$ and $s_3$ are determined without multiplication operations, which significant reduces the computational complexity of the process for determining $v_x$. As such, by calculating the horizontal motion offset in this way, the horizontal motion offset can be determined efficiently.

In an embodiment, the determining unit is configured to determine the vertical motion offset $v_y$ according to $$v_y = -\frac{(s_4 - v_x * s_5/2)}{s_2},$$

wherein:

$v_x$ represents the horizontal motion offset; and $v_y$ represents the vertical motion offset.

This shows a possible way to determine $v_y$ based on autocorrelation and cross correlation terms $s_2$, $s_4$ and $s_5$. $s_2$, $s_4$ and $s_5$ are determined without multiplication operations, which significant reduces the computational complexity of the process for determining $v_y$. As such, by calculating the vertical motion offset in this way, the vertical motion offset can be determined efficiently.

In an embodiment, $s_1$, $s_2$, $s_3$, $s_4$ and $s_5$ are determined as:

$$s_1 = \sum_{i,j} \text{abs}\,(G_{x1} + G_{x0});$$

$$s_2 = \sum_{i,j} \text{abs}\,(G_{y1} + G_{y0}),$$

$$s_3 = \sum_{i,j} \text{sign}\,(G_{x1} + G_{x0}) * (I^{(1)} - I^{(0)}).$$

$$s_4 = \sum_{i,j} \text{sign}\,(G_{y1} + G_{y0}) * (I^{(1)} - I^{(0)}),$$

$$s_5 = \sum_{i,j} \text{sign}\,(G_{y1} + G_{y0}) * (G_{x1} + G_{x0});$$

and wherein:

$I^{(0)}$ is obtained from the predicted sample values that correspond to the first reference frame, and $I^{(1)}$ is obtained from the predicted sample values that correspond to the second reference frame;

$G_{x0}$ and $G_{x1}$ indicate a set of the horizontal predicted sample gradients that correspond to the first reference frame and the second reference frame, respectively;

$G_{y0}$ and $G_{y1}$ indicate a set of the vertical predicted sample gradients that correspond to the first reference frame and the second reference frame, respectively; and i and j are integer numbers, wherein a value of i varies from −1 to 4, and a value of j varies from −1 to 4.

In some examples, $I^{(0)}$ is a block including predicted samples in the first reference frame that are around a subblock corresponding to the current block. For example, if the current block is 4×4 block, $I^{(0)}$ can be a 6×6 block in the first reference frame surrounding the 4×4 block that corresponds to the 4×4 current block. Similarly, $I^{(1)}$ is a block including predicted samples in the second reference frame that are around a subblock corresponding to the current block. For example, if the current block is 4×4 block, $I^{(1)}$ can be a 6×6 block in the second reference frame surrounding the 4×4 block that corresponds to the 4×4 current block.

If the current block is a 4×4 block and the $I^{(0)}$ and $I^{(1)}$ are both 6×6 blocks, each of $G_{x0}$ and $G_{x1}$ is a 6×6 block.

Note that when calculating the autocorrelation and cross correlation terms $s_1$, $s_2$, $s_3$, $s_4$ and $s_5$, shifting can be applied to adjust the precision and/or bit depth of $s_1$, $s_2$, $s_3$, $s_4$ and $s_5$.

It is further noted that $s_1$, $s_2$, $s_3$, $s_4$ and $s_5$ are determined without multiplication operations, which significant reduces the computational complexity of the process for determining $v_x$ and $v_y$. $v_x$ and $v_y$ are derived based on autocorrelation and cross correlation terms as shown above with regard to $s_1$, $s_2$, $s_3$, $s_4$ and $s_5$. $v_x$ and $v_y$ can be determined as $$v_x = \frac{s_3}{s_1} \text{ and } v_y = \frac{(s_4 - v_x * s_5/2)}{s_2}$$

if the term $(I^{(1)}-I^{(0)})$ is changed to $(I^{(0)}-I^{(1)})$.

In an embodiment, the $G_{x0}$ is determined as a difference obtained from two predicted samples that correspond to the first reference frame along a horizontal direction, and the $G_{y0}$ is determined as a difference obtained from two predicted samples that correspond to the first reference frame along a vertical direction.

In some examples, the two predicted samples that correspond to the first reference frame along a horizontal direction have the same vertical coordinates and different horizontal coordinates. The two predicted samples that correspond to the first reference frame along a vertical direction have the same horizontal coordinates and different vertical coordinates. The two predicted samples can each be processed before the difference is calculated, such as right shift, left shift or clipping.

In an embodiment, the $G_{x1}$ is determined as a difference obtained from two predicted samples that correspond to the second reference frame along a horizontal direction, and the $G_{y1}$ is determined as a difference obtained from two predicted samples that correspond to the second reference frame along a vertical direction.

In some examples, the two predicted samples that correspond to the second reference frame along a horizontal direction have the same vertical coordinates and different horizontal coordinates. The two predicted samples that correspond to the second reference frame along a vertical direction have the same horizontal coordinates and different vertical coordinates. The two predicted samples can each be processed before the difference is calculated, such as right shift, left shift or clipping.

In an embodiment, the prediction sample values corresponding to the first reference frame and the prediction sample values corresponding to the second reference frame are obtained from the first and second reference frames, respectively, using a pair of motion vectors for the current block with respect to the first and second reference frames.

In an embodiment, the prediction sample values for the current block are bi-predicted sample values based on bi-directional optical flow (BDOF) prediction.

The method according to some aspect of the disclosure can be performed by the apparatus according to the some aspect of the disclosure. Further features and implementation forms of the method according to the some aspect of the disclosure result directly from the functionality of the apparatus according to the some aspect of the disclosure and its different implementation forms.

It is noted that a coding device may be encoding device or decoding device.

According to another aspect the disclosure relates to an apparatus for decoding a video stream includes a processor and a memory. The memory is storing instructions that cause the processor to perform the previously shown method.

According to another aspect the disclosure relates to an apparatus for encoding a video stream includes a processor and a memory. The memory is storing instructions that cause the processor to perform the previously shown method.

According to another aspect, a computer-readable storage medium having stored thereon instructions that when executed cause one or more processors configured to code video data is proposed. The instructions cause the one or more processors to perform a previously shown method.

According to another aspect, a computer program product with a program code for performing the previously shown method when the computer program runs on a computer, is provided.

Details of one or more embodiments are set forth in the accompanying drawings and the description below. Other features, objects, and advantages will be apparent from the description, drawings, and claims.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

Further embodiments of the disclosure will be described with respect to the following figures, wherein.

Figure 1A:
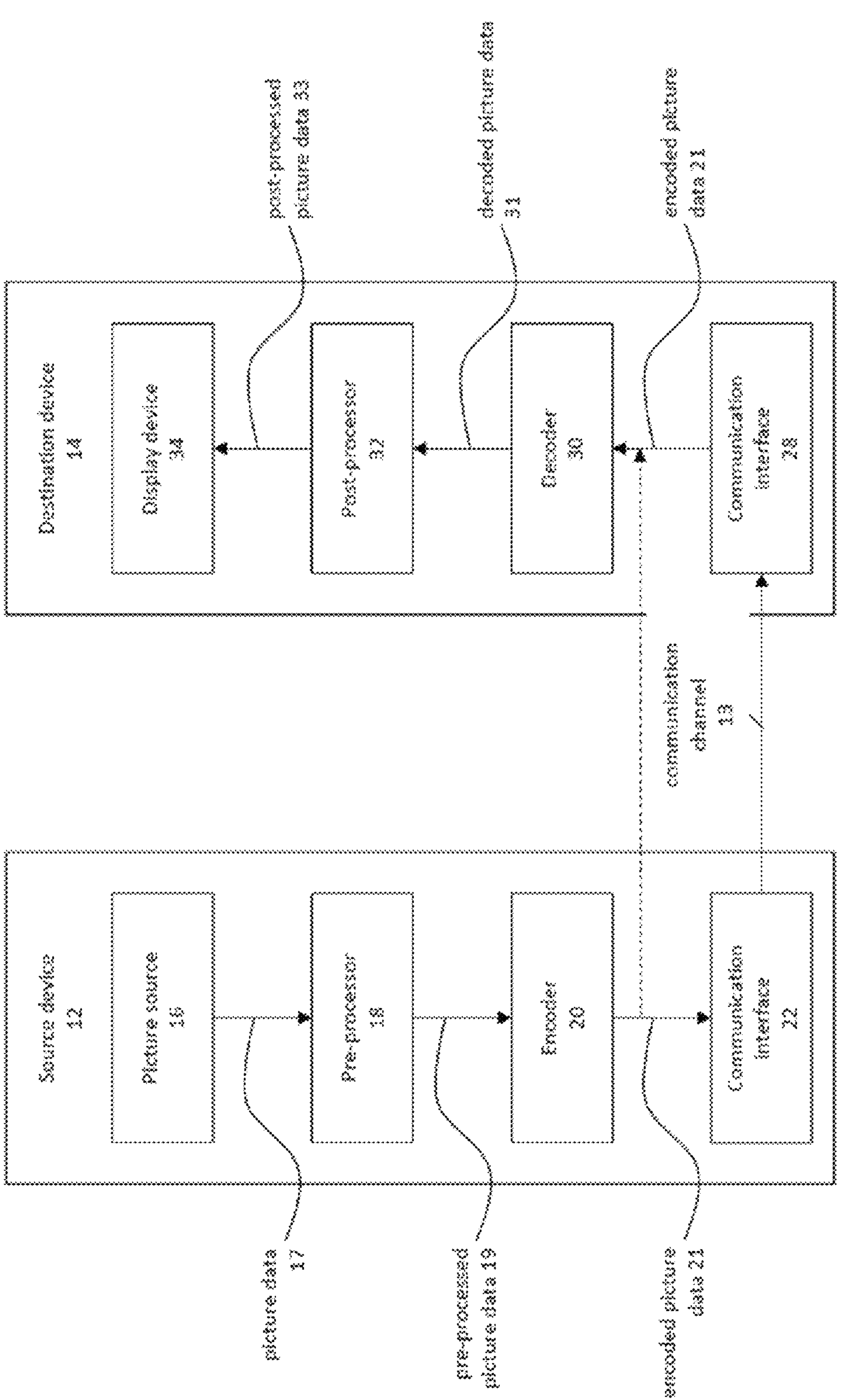
FIG. 1A shows block diagram showing an example of a video coding system configured to implement the embodiments presented herein.

In the various figures, identical reference signs will be used for identical or functionally equivalent features.

DETAILED DESCRIPTION OF EMBODIMENTS

In the following description, reference is made to the accompanying drawings, which form part of the disclosure, and in which are shown, by way of illustration, specific aspects in which the present disclosure may be placed. It is understood that other aspects may be utilized and structural or logical changes may be made without departing from the scope of the present disclosure. The following detailed description, therefore, is not to be taken in a limiting sense, as the scope of the present disclosure is defined by the appended claims.

For instance, it is understood that a disclosure in connection with a described method may also hold true for a corresponding device or system configured to perform the method and vice versa. For example, if one or a plurality of specific method operations are described, a corresponding device may include one or a plurality of units, e.g. functional units, to perform the described one or plurality of method operations (e.g. one unit performing the one or plurality of operations, or a plurality of units each performing one or more of the plurality of operations), even if such one or more units are not explicitly described or illustrated in the figures. On the other hand, for example, if a specific apparatus is described based on one or a plurality of units, e.g. functional units, a corresponding method may include one operation to perform the functionality of the one or plurality of units (e.g. one operation performing the functionality of the one or plurality of units, or a plurality of operations each performing the functionality of one or more of the plurality of units), even if such one or plurality of operations are not explicitly described or illustrated in the figures. Further, it is understood that the features of the various exemplary embodiments and/or aspects described herein may be combined with each other, unless specifically noted otherwise.

The present disclosure provides a technology that computes a second component of optical flow based on a computed first component of optical flow and without requiring any expensive multiplications. The technology can be employed at both the encoding and decoding ends when BPOF is enabled. It provides improved devices and methods for inter prediction based on optical flow, so that compression efficiency is improved compared with the conventional BPOF without increasing the computational complexity of BPOF.

In order to describe the disclosure in detail, the following terms, abbreviations and notations will be used:

POC Picture Order Count in display order

MV Motion Vector

MCP Motion Compensated Prediction

HEVC High Efficient Video Coding

BPOF BI-predictive Optical-flow based decoder side correction for MCP

BDOF Bi-Directional Optical Flow

As used herein, a video signal or video sequence is a set of subsequent frames presenting a motion picture. In other words, a video signal or video sequence consists of a plurality of frames (also referred to as pictures or images).

As used herein, coding tree unit (CTU) denotes the root of a coding structure of the video sequence of a pre-defined size, containing a part of a frame (e.g. 64×64 pixels). A CTU can be partitioned into several CUs.

As used herein, coding unit (CU) denotes a basic coding structure of the video sequence of a pre-defined size, containing a part of a frame, which is belonging to a CTU. A CU can be partitioned into further CUs.

As used herein, prediction unit (PU) denotes a coding structure, which is the result of partitioning of a CU.

As used herein, the term co-located in the present document denotes a block or region in a second frame, i.e. a reference frame, corresponding to an actual block or region in a first frame, i.e. a current frame.

Video coding typically refers to the processing of a sequence of pictures, which form the video or video sequence. Instead of the term "picture," the term "frame" or "image" may be used as synonyms in the field of video coding. Video coding (or coding in general) comprises two parts: video encoding and video decoding. Video encoding is performed at the source side, typically comprising processing (e.g. by compression) the original video pictures to reduce the amount of data required for representing the video pictures (for more efficient storage and/or transmission). Video decoding is performed at the destination side and typically comprises the inverse processing compared to the encoder to reconstruct the video pictures. Embodiments referring to "coding" of video pictures (or pictures in general) shall be understood to relate to "encoding" or "decoding" of video pictures or respective video sequences. The combination of the encoding part and the decoding part is also referred to as CODEC (Coding and Decoding).

In case of lossless video coding, the original video pictures can be reconstructed, i.e. the reconstructed video pictures have the same quality as the original video pictures (assuming no transmission loss or other data loss during storage or transmission). In case of lossy video coding, further compression, e.g. by quantization, is performed, to reduce the amount of data representing the video pictures, which cannot be completely reconstructed at the decoder, i.e. the quality of the reconstructed video pictures is lower or worse compared to the quality of the original video pictures.

Several video coding standards belong to the group of "lossy hybrid video codecs" (i.e. combine spatial and temporal prediction in the sample domain and two-dimensional transform coding for applying quantization in the transform domain). Each picture of a video sequence is typically partitioned into a set of non-overlapping blocks and the coding is typically performed on a block level. In other words, at the encoder the video is typically processed, i.e. encoded, on a block (video block) level, e.g. by using spatial (intra picture) prediction and/or temporal (inter picture) prediction to generate a prediction block, subtracting the prediction block from the current block (block currently processed/to be processed) to obtain a residual block, transforming the residual block and quantizing the residual block in the transform domain to reduce the amount of data to be transmitted (compression). At the decoder, the inverse processing compared to the encoder is applied to the encoded or compressed block to reconstruct the current block for representation. Furthermore, the encoder duplicates the decoder processing loop such that both will generate identical predictions (e.g. intra- and inter predictions) and/or re-constructions for processing, i.e. coding, the subsequent blocks.

Embodiments of a video coding system 10, a video encoder 20 and a video decoder 30 are described with respect to FIGS. 1A-3.

FIG. 1A is a schematic block diagram illustrating an example coding system 10, e.g. a video coding system 10 (or coding system 10 in short) that may implement techniques presented herein. Video encoder 20 (or encoder 20 in short) and video decoder 30 (or decoder 30 in short) of video coding system 10 represent examples of devices that may be configured to perform techniques in accordance with various examples described herein.

As shown in FIG. 1A, the coding system 10 comprises a source device 12 configured to provide encoded picture data 21, e.g. to a destination device 14 for decoding the encoded picture data 21. The source device 12 includes an encoder 20, and may additionally include a picture source 16, a pre-processor (or pre-processing unit) 18, such as a picture pre-processor 18, and a communication interface or communication unit 22.

The picture source 16 may include any kind of picture capturing device, such as a camera for capturing a real-world picture, any kind of a picture-generating device, such as a computer-graphics processor for generating a computer animated picture. The picture source 16 may also include any kind of other device for obtaining and/or providing a real-world picture, a computer generated picture (e.g. a screen content, a virtual reality (VR) picture) and/or any combination thereof (e.g. an augmented reality (AR) picture). The picture source may be any kind of memory or storage storing any of the aforementioned pictures.

In distinction to the pre-processor 18 and the processing performed by the pre-processing unit 18, the picture or picture data 17 may also be referred to as raw picture or raw picture data 17. Pre-processor 18 is configured to receive the (raw) picture data 17 and to perform pre-processing on the picture data 17 to obtain a pre-processed picture 19 or pre-processed picture data 19. Pre-processing performed by the pre-processor 18 may include trimming, color format conversion (e.g. from RGB to YCbCr), color correction, or de-noising.

The video encoder 20 is configured to receive the pre-processed picture data 19 and provide encoded picture data 21 (further details will be described below, e.g., with regard to FIG. 2). Communication interface 22 of the source device 12 may be configured to receive the encoded picture data 21 and to transmit the encoded picture data 21 (or any further processed version thereof) over communication channel 13 to another device, e.g. the destination device 14 or any other device, for storage or direct reconstruction. The destination device 14 comprises a decoder 30 (e.g. a video decoder 30), and may additionally include a communication interface or communication unit 28, a post-processor 32 (or post-processing unit 32) and a display device 34. The communication interface 28 of the destination device 14 is configured receive the encoded picture data 21 (or any further processed version thereof), e.g. directly from the source device 12 or from any other source, e.g. a storage device, e.g. an encoded picture data storage device, and provide the encoded picture data 21 to the decoder 30.

The communication interface 22 and the communication interface 28 may be configured to transmit or receive the encoded picture data 21 or encoded data 21 via a direct communication link between the source device 12 and the destination device 14, such as a direct wired or wireless connection, or via any kind of network, e.g. a wired or wireless network or any combination thereof, or any kind of private and public network, or any kind of combination thereof.

The communication interface 22 may be, e.g., configured to package the encoded picture data 21 into an appropriate format, e.g. packets, and/or process the encoded picture data using any kind of transmission encoding or processing for transmission over a communication link or communication network. The communication interface 28, forming the counterpart of the communication interface 22, may be, e.g., configured to receive the transmitted data and process the transmission data using any kind of corresponding transmission decoding or processing and/or de-packaging to obtain the encoded picture data 21.

Both, communication interface 22 and communication interface 28 may be configured as unidirectional communication interfaces as indicated by the arrow for the communication channel 13 in FIG. 1A pointing from the source device 12 to the destination device 14, or bi-directional communication interfaces, and may be configured, e.g. to send and receive messages, e.g. to set up a connection, to acknowledge and exchange any other information related to the communication link and/or data transmission, e.g. encoded picture data transmission.

The decoder 30 of the destination device 14 is configured to receive the encoded picture data 21 and provide decoded picture data 31 or a decoded picture 31 (further details will be described below, e.g., with regard to FIG. 3 or FIG. 5). The post-processor 32 of destination device 14 is configured to post-process the decoded picture data 31 (also called reconstructed picture data), e.g. the decoded picture 31, to obtain post-processed picture data 33, e.g. a post-processed picture 33. The post-processing performed by the post-processing unit 32 may comprise, e.g. color format conversion (e.g. from YCbCr to RGB), color correction, trimming, or re-sampling, or any other processing, e.g. for preparing the decoded picture data 31 for display, e.g. by display device 34.

The display device 34 of the destination device 14 is configured to receive the post-processed picture data 33 for displaying the picture, e.g. to a user or viewer. The display device 34 may be or comprise any kind of display for representing the reconstructed picture, e.g. an integrated or external display or monitor. The displays may, e.g. comprise liquid crystal displays (LCD), organic light emitting diodes (OLED) displays, plasma displays, projectors, micro LED displays, liquid crystal on silicon (LCoS), digital light processor (DLP) or any kind of other display.

Although FIG. 1A depicts the source device 12 and the destination device 14 as separate devices, embodiments of devices may also comprise both or both functionalities, the source device 12 or corresponding functionality and the destination device 14 or corresponding functionality. In such embodiments the source device 12 or corresponding functionality and the destination device 14 or corresponding functionality may be implemented using the same hardware and/or software or by separate hardware and/or software or any combination thereof.

As will be apparent for the skilled person based on the description, the existence and (exact) split of functionalities of the different units or functionalities within the source device 12 and/or destination device 14 as shown in FIG. 1A may vary depending on the actual device and application.

Figure 1B:
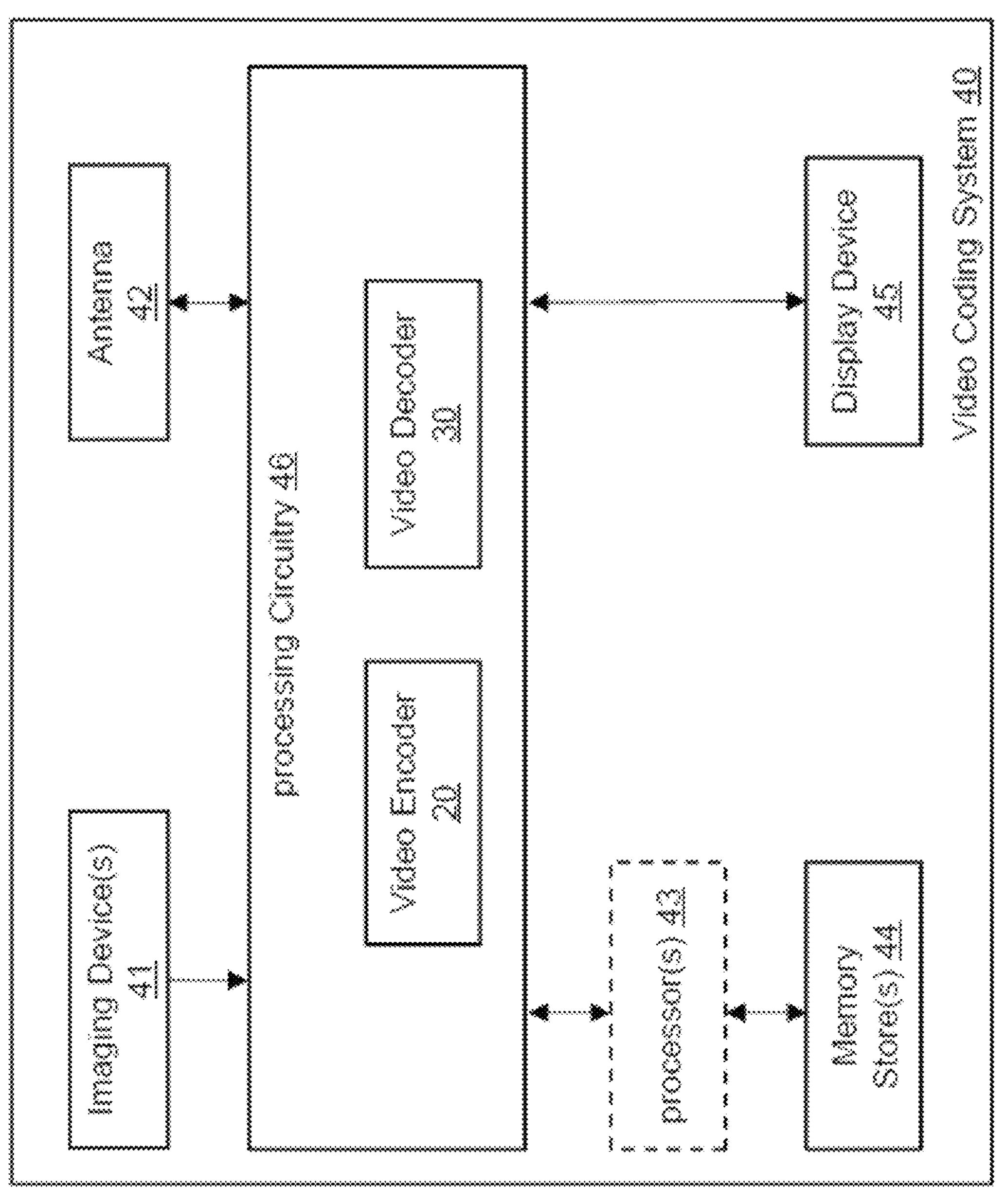
FIG. 1B shows a block diagram showing another example of a video coding system configured to implement embodiments presented herein.

The encoder 20 (e.g. a video encoder 20) or the decoder 30 (e.g. a video decoder 30) or both encoder 20 and decoder 30 may be implemented via processing circuitry as shown in FIG. 1B, such as one or more microprocessors, digital signal processors (DSPs), application-specific integrated circuits (ASICs), field-programmable gate arrays (FPGAs), discrete logic, hardware, video coding dedicated or any combinations thereof. The encoder 20 may be implemented via processing circuitry 46 to embody the various modules as discussed with respect to encoder 20 of FIG. 2 and/or any other encoder system or subsystem described herein. The decoder 30 may be implemented via processing circuitry 46 to embody the various modules as discussed with respect to decoder 30 of FIG. 3 and/or any other decoder system or subsystem described herein. The processing circuitry may be configured to perform the various operations as discussed later. As will be shown in FIG. 5, if the techniques are implemented partially in software, a device may store instructions for the software in a suitable, non-transitory computer-readable storage medium and may execute the instructions in hardware using one or more processors to perform the techniques of this disclosure. Either of video encoder 20 and video decoder 30 may be integrated as part of a combined encoder/decoder (CODEC) in a single device, for example, as shown in FIG. 1B.

Source device 12 and destination device 14 may comprise any of a wide range of devices, including any kind of handheld or stationary devices, e.g. notebook or laptop computers, mobile phones, smart phones, tablets or tablet computers, cameras, desktop computers, set-top boxes, televisions, display devices, digital media players, video gaming consoles, video streaming devices (such as content services servers or content delivery servers), broadcast receiver device, broadcast transmitter device, or the like and may use no or any kind of operating system. In some cases, the source device 12 and the destination device 14 may be equipped for wireless communication. Thus, the source device 12 and the destination device 14 may be wireless communication devices.

Video coding system 10 illustrated in FIG. 1A is merely an example and the techniques presented herein may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In some examples, the encoding and decoding is performed by devices that do not communicate with one another, but simply encode data to memory and/or retrieve and decode data from memory.

For convenience of description, embodiments are described herein, for example, by reference to High-Efficiency Video Coding (HEVC) or to the reference software of Versatile Video coding (VVC), the next generation video coding standard developed by the Joint Collaboration Team on Video Coding (JCT-VC) of ITU-T Video Coding Experts Group (VCEG) and ISO/IEC Motion Picture Experts Group (MPEG). One of ordinary skill in the art will understand that embodiments of the disclosure are not limited to HEVC or VVC.

Encoder and Encoding Method

Figure 2:
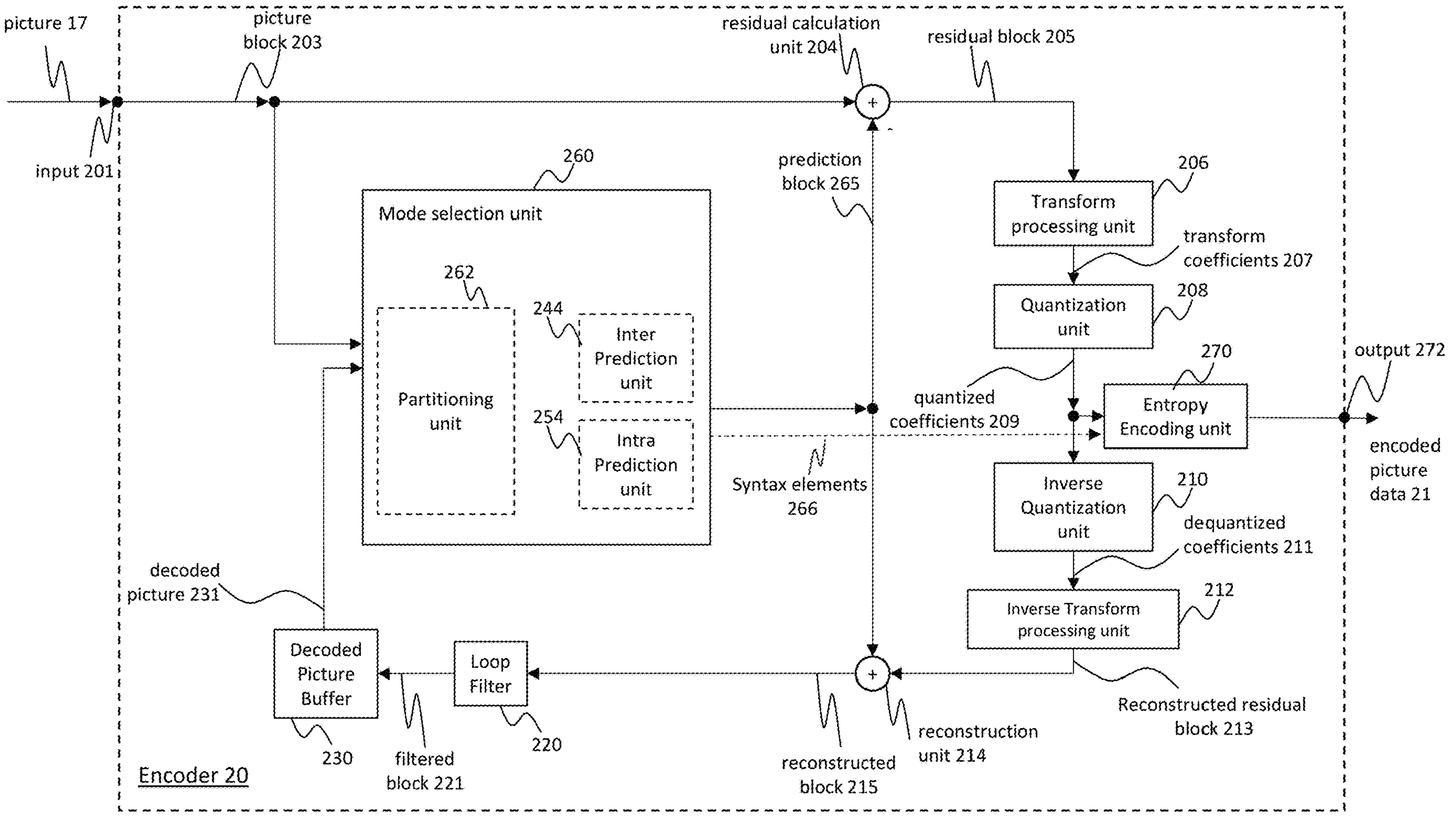
FIG. 2 shows a block diagram showing an example of a video encoder configured to implement embodiments presented herein.

FIG. 2 shows a schematic block diagram of an example video encoder 20 that is configured to implement the techniques presented herein. In the example of FIG. 2, the video encoder 20 comprises an input 201 (or input interface 201), a residual calculation unit 204, a transform processing unit 206, a quantization unit 208, an inverse quantization unit 210, and inverse transform processing unit 212, a reconstruction unit 214, a loop filter unit 220, a decoded picture buffer (DPB) 230, a mode selection unit 260, an entropy encoding unit 270 and an output 272 (or output interface 272). The mode selection unit 260 may include an inter prediction unit 244, an intra prediction unit 254 and a partitioning unit 262. Inter prediction unit 244 may include a motion estimation unit and a motion compensation unit (not shown). A video encoder 20 as shown in FIG. 2 may also be referred to as hybrid video encoder or a video encoder according to a hybrid video codec.

Figure 3:
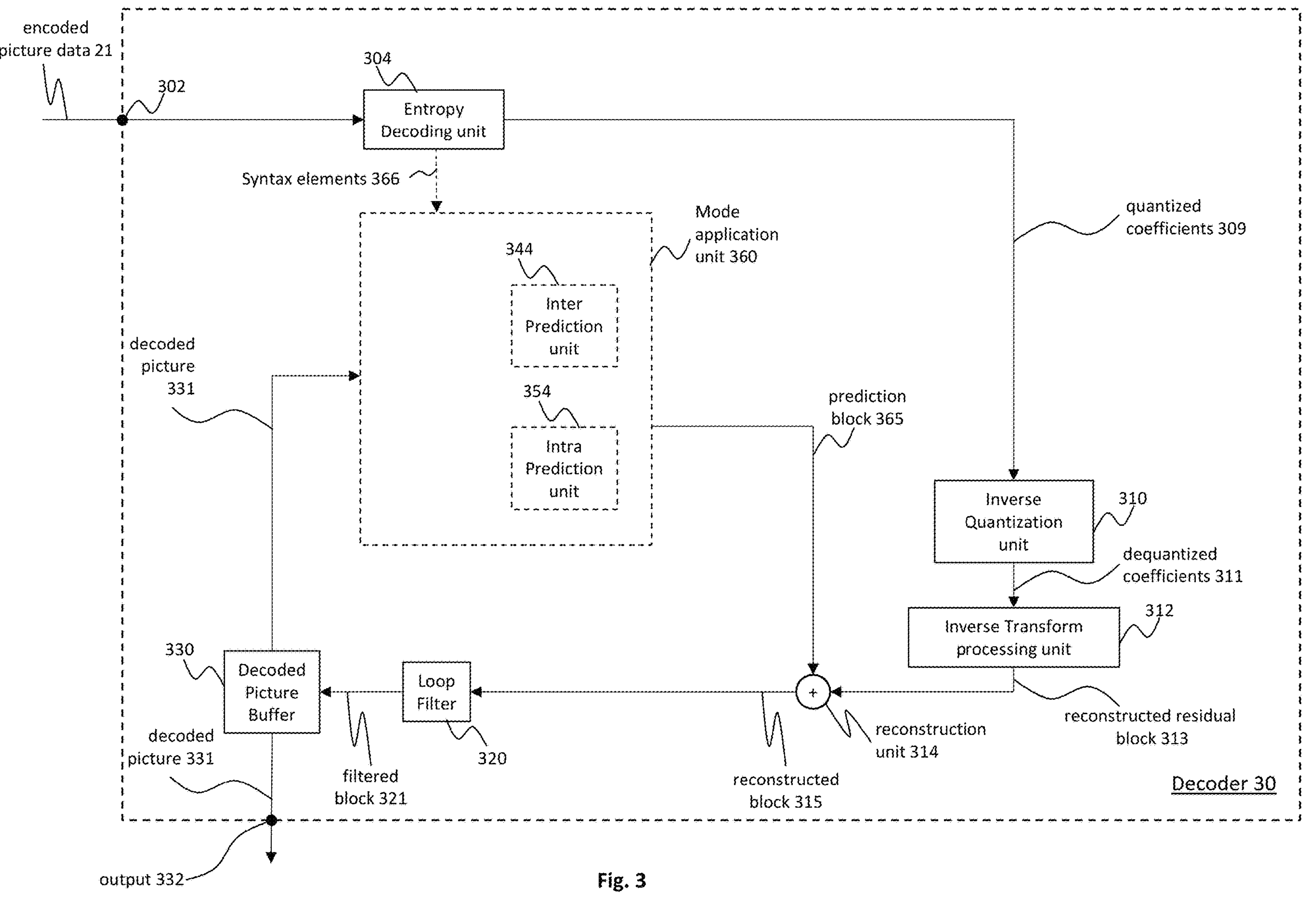
FIG. 3 is a block diagram showing an example structure of a video decoder configured to implement embodiments presented herein.

The residual calculation unit 204, the transform processing unit 206, the quantization unit 208, the mode selection unit 260 may be referred to as forming a forward signal path of the encoder 20, whereas the inverse quantization unit 210, the inverse transform processing unit 212, the reconstruction unit 214, the buffer 216, the loop filter 220, the decoded picture buffer (DPB) 230, the inter prediction unit 244 and the intra-prediction unit 254 may be referred to as forming a backward signal path of the video encoder 20, wherein the backward signal path of the video encoder 20 corresponds to the signal path of the decoder (see video decoder 30 in FIG. 3). The inverse quantization unit 210, the inverse transform processing unit 212, the reconstruction unit 214, the loop filter 220, the decoded picture buffer (DPB) 230, the inter prediction unit 244 and the intra-prediction unit 254 are also referred to forming the "built-in decoder" of video encoder 20.

Pictures & Picture Partitioning (Pictures & Blocks)

The encoder 20 may be configured to receive, e.g. via input 201, a picture 17 (or picture data 17), e.g. picture of a sequence of pictures forming a video or video sequence. The received picture or picture data may also be a pre-processed picture 19 (or pre-processed picture data 19). For sake of simplicity the following description refers to the picture 17. The picture 17 may also be referred to as current picture or picture to be coded (in particular in video coding to distinguish the current picture from other pictures, e.g. previously encoded and/or decoded pictures of the same video sequence, i.e. the video sequence which also comprises the current picture).

A (digital) picture can be regarded as a two-dimensional array or matrix of samples with intensity values. A sample in the array may also be referred to as a pixel (short form of picture element) or a pel. The number of samples in horizontal and vertical direction (or axis) of the array or picture define the size and/or resolution of the picture. For representation of color, typically three color components are employed, i.e. the picture may be represented or include three sample arrays. In RGB format or color space a picture comprises a corresponding red, green and blue sample array. However, in video coding each pixel is typically represented in a luminance and chrominance format or color space, e.g. YCbCr, which comprises a luminance component indicated by Y (sometimes also L is used instead) and two chrominance components indicated by Cb and Cr. The luminance (or short luma) component Y represents the brightness or grey level intensity (e.g. like in a grey-scale picture), while the two chrominance (or short chroma) components Cb and Cr represent the chromaticity or color information components. Accordingly, a picture in YCbCr format comprises a luminance sample array of luminance sample values (Y), and two chrominance sample arrays of chrominance values (Cb and Cr). Pictures in RGB format may be converted or transformed into YCbCr format and vice versa, the process is also known as color transformation or conversion. If a picture is monochrome, the picture may comprise only a luminance sample array. Accordingly, a picture may be, for example, an array of luma samples in monochrome format or an array of luma samples and two corresponding arrays of chroma samples in 4:2:0, 4:2:2, and 4:4:4 colour format.

Embodiments of the video encoder 20 may comprise a picture partitioning unit (not depicted in FIG. 2) configured to partition the picture 17 into a plurality of (typically non-overlapping) picture blocks 203. These blocks may also be referred to as root blocks, macro blocks (H.264/AVC) or coding tree blocks (CTB) or coding tree units (CTU) (H.265/HEVC and VVC). The picture partitioning unit may be configured to use the same block size for all pictures of a video sequence and the corresponding grid defining the block size, or to change the block size between pictures or subsets or groups of pictures, and partition each picture into the corresponding blocks.

In further embodiments, the video encoder may be configured to receive directly a block 203 of the picture 17, e.g. one, several or all blocks forming the picture 17. The picture block 203 may also be referred to as current picture block or picture block to be coded.

Like the picture 17, the picture block 203 can also be regarded as a two-dimensional array or matrix of samples with intensity values (sample values), although of smaller dimension than the picture 17. In other words, the block 203 may comprise, e.g., one sample array (e.g. a luma array in case of a monochrome picture 17, or a luma or chroma array in case of a color picture) or three sample arrays (e.g. a luma and two chroma arrays in case of a color picture 17) or any other number and/or kind of arrays depending on the color format applied. The number of samples in horizontal and vertical direction (or axis) of the block 203 define the size of block 203. Accordingly, a block may, for example, an M×N (M-column by N-row) array of samples, or an M×N array of transform coefficients.

Embodiments of the video encoder 20 as shown in FIG. 2 may be configured to encode the picture 17 block by block, e.g. the encoding and prediction is performed per block 203. Embodiments of the video encoder 20 as shown in FIG. 2 may be further configured to partition and/or encode the picture by using slices (also referred to as video slices), wherein a picture may be partitioned into or encoded using one or more slices (typically non-overlapping), and each slice may comprise one or more blocks (e.g. CTUs).

Embodiments of the video encoder 20 as shown in FIG. 2 may be further configured to partition and/or encode the picture by using tile groups (also referred to as video tile groups) and/or tiles (also referred to as video tiles), wherein a picture may be partitioned into or encoded using one or more tile groups (typically non-overlapping), and each tile group may comprise, e.g. one or more blocks (e.g. CTUs) or one or more tiles, wherein each tile, e.g. may be of rectangular shape and may comprise one or more blocks (e.g. CTUs), e.g. complete or fractional blocks.

Residual Calculation

The residual calculation unit 204 may be configured to calculate a residual block 205 (also referred to as residual 205) based on the picture block 203 and a prediction block 265 (further details about the prediction block 265 are provided later), e.g. by subtracting sample values of the prediction block 265 from sample values of the picture block 203, sample by sample (pixel by pixel) to obtain the residual block 205 in the sample domain.

Transform

The transform processing unit 206 may be configured to apply a transform, e.g. a discrete cosine transform (DCT) or discrete sine transform (DST), on the sample values of the residual block 205 to obtain transform coefficients 207 in a transform domain. The transform coefficients 207 may also be referred to as transform residual coefficients and represent the residual block 205 in the transform domain.

The transform processing unit 206 may be configured to apply integer approximations of DCT/DST, such as the transforms specified for H.265/HEVC. Compared to an orthogonal DCT transform, such integer approximations are typically scaled by a certain factor. In order to preserve the norm of the residual block which is processed by forward and inverse transforms, additional scaling factors are applied as part of the transform process. The scaling factors are typically chosen based on certain constraints like scaling factors being a power of two for shift operations, bit depth of the transform coefficients, tradeoff between accuracy and implementation costs, etc. Specific scaling factors are, for example, specified for the inverse transform, e.g. by inverse transform processing unit 212 (and the corresponding inverse transform, e.g. by inverse transform processing unit 312 at video decoder 30) and corresponding scaling factors for the forward transform, e.g. by transform processing unit 206, at an encoder 20 may be specified accordingly.

Embodiments of the video encoder 20 (respectively transform processing unit 206) may be configured to output transform parameters, e.g. a type of transform or transforms, e.g. directly or encoded or compressed via the entropy encoding unit 270, so that, e.g., the video decoder 30 may receive and use the transform parameters for decoding.

Quantization

The quantization unit 208 may be configured to quantize the transform coefficients 207 to obtain quantized coefficients 209, e.g. by applying scalar quantization or vector quantization. The quantized coefficients 209 may also be referred to as quantized transform coefficients 209 or quantized residual coefficients 209.

The quantization process may reduce the bit depth associated with some or all of the transform coefficients 207. For example, an n-bit transform coefficient may be rounded down to an m-bit Transform coefficient during quantization, where n is greater than m. The degree of quantization may be modified by adjusting a quantization parameter (QP). For example for scalar quantization, different scaling may be applied to achieve finer or coarser quantization. Smaller quantization step sizes correspond to finer quantization, whereas larger quantization step sizes correspond to coarser quantization. The applicable quantization step size may be indicated by a quantization parameter (QP). The quantization parameter may for example be an index to a predefined set of applicable quantization step sizes. For example, small quantization parameters may correspond to fine quantization (small quantization step sizes) and large quantization parameters may correspond to coarse quantization (large quantization step sizes) or vice versa.

The quantization may include division by a quantization step size and a corresponding and/or the inverse dequantization, e.g. by inverse quantization unit 210, may include multiplication by the quantization step size. Embodiments according to some standards, e.g. HEVC, may be configured to use a quantization parameter to determine the quantization step size. Generally, the quantization step size may be calculated based on a quantization parameter using a fixed point approximation of an equation including division. Additional scaling factors may be introduced for quantization and dequantization to restore the norm of the residual block, which might get modified because of the scaling used in the fixed point approximation of the equation for quantization step size and quantization parameter. In one example implementation, the scaling of the inverse transform and dequantization might be combined. Alternatively, customized quantization tables may be used and signaled from an encoder to a decoder, e.g. in a bitstream. The quantization is a lossy operation, wherein the loss increases with increasing quantization step sizes.

Embodiments of the video encoder 20 (respectively quantization unit 208) may be configured to output quantization parameters (QP), e.g. directly or encoded via the entropy encoding unit 270, so that, e.g., the video decoder 30 may receive and apply the quantization parameters for decoding.

Inverse Quantization

The inverse quantization unit 210 is configured to apply the inverse quantization of the quantization unit 208 on the quantized coefficients to obtain dequantized coefficients 211, e.g. by applying the inverse of the quantization scheme applied by the quantization unit 208 based on or using the same quantization step size as the quantization unit 208. The dequantized coefficients 211 may also be referred to as dequantized residual coefficients 211 and correspond—although typically not identical to the transform coefficients due to the loss by quantization—to the transform coefficients 207.

Inverse Transform

The inverse transform processing unit 212 is configured to apply the inverse transform of the transform applied by the transform processing unit 206, e.g. an inverse discrete cosine transform (DCT) or inverse discrete sine transform (DST) or other inverse transforms, to obtain a reconstructed residual block 213 (or corresponding dequantized coefficients 213) in the sample domain. The reconstructed residual block 213 may also be referred to as transform block 213.

Reconstruction

The reconstruction unit 214 (e.g. adder or summer 214) is configured to add the transform block 213 (i.e. reconstructed residual block 213) to the prediction block 265 to obtain a reconstructed block 215 in the sample domain, e.g. by adding—sample by sample—the sample values of the reconstructed residual block 213 and the sample values of the prediction block 265.

Filtering

The loop filter unit 220 (or short "loop filter" 220), is configured to filter the reconstructed block 215 to obtain a filtered block 221, or in general, to filter reconstructed samples to obtain filtered samples. The loop filter unit is, e.g., configured to smooth pixel transitions, or otherwise improve the video quality. The loop filter unit 220 may comprise one or more loop filters such as a de-blocking filter, a sample-adaptive offset (SAO) filter or one or more other filters, e.g. a bilateral filter, an adaptive loop filter (ALF), a sharpening, a smoothing filters or a collaborative filters, or any combination thereof. Although the loop filter unit 220 is shown in FIG. 2 as being an in loop filter, in other configurations, the loop filter unit 220 may be implemented as a post loop filter. The filtered block 221 may also be referred to as filtered reconstructed block 221.

Embodiments of the video encoder 20 (respectively loop filter unit 220) may be configured to output loop filter parameters (such as sample adaptive offset information), e.g. directly or encoded via the entropy encoding unit 270, so that, e.g., a decoder 30 may receive and apply the same loop filter parameters or respective loop filters for decoding.

Decoded Picture Buffer

The decoded picture buffer (DPB) 230 may be a memory that stores reference pictures, or in general reference picture data, for encoding video data by video encoder 20. The DPB 230 may be formed by any of a variety of memory devices, such as dynamic random access memory (DRAM), including synchronous DRAM (SDRAM), magnetoresistive RAM (MRAM), resistive RAM (RRAM), or other types of memory devices. The decoded picture buffer (DPB) 230 may be configured to store one or more filtered blocks 221. The decoded picture buffer 230 may be further configured to store other previously filtered blocks, e.g. previously reconstructed and filtered blocks 221, of the same current picture or of different pictures, e.g. previously reconstructed pictures, and may provide complete previously reconstructed, i.e. decoded, pictures (and corresponding reference blocks and samples) and/or a partially reconstructed current picture (and corresponding reference blocks and samples), for example for inter prediction. The decoded picture buffer (DPB) 230 may be also configured to store one or more unfiltered reconstructed blocks 215, or in general unfiltered reconstructed samples, e.g. if the reconstructed block 215 is not filtered by loop filter unit 220, or any other further processed version of the reconstructed blocks or samples.

Mode Selection (Partitioning & Prediction)

The mode selection unit 260 comprises partitioning unit 262, inter-prediction unit 244 and intra-prediction unit 254, and is configured to receive or obtain original picture data, e.g. an original block 203 (current block 203 of the current picture 17), and reconstructed picture data, e.g. filtered and/or unfiltered reconstructed samples or blocks of the same (current) picture and/or from one or a plurality of previously decoded pictures, e.g. from decoded picture buffer 230 or other buffers (e.g. line buffer, not shown). The reconstructed picture data is used as reference picture data for prediction, e.g. inter-prediction or intra-prediction, to obtain a prediction block 265 or predictor 265.

Mode selection unit 260 may be configured to determine or select a partitioning for a current block prediction mode (including no partitioning) and a prediction mode (e.g. an intra or inter prediction mode) and generate a corresponding prediction block 265, which is used for the calculation of the residual block 205 and for the reconstruction of the reconstructed block 215.

Embodiments of the mode selection unit 260 may be configured to select the partitioning and the prediction mode (e.g. from those supported by or available for mode selection unit 260), which provide the best match or in other words the minimum residual (minimum residual means better compression for transmission or storage), or a minimum signaling overhead (minimum signaling overhead means better compression for transmission or storage), or which considers or balances both. The mode selection unit 260 may be configured to determine the partitioning and prediction mode based on rate distortion optimization (RDO), i.e. select the prediction mode which provides a minimum rate distortion. Terms like "best", "minimum", "optimum" etc. in this context do not necessarily refer to an overall "best", "minimum", "optimum", etc. but may also refer to the fulfillment of a termination or selection criterion like a value exceeding or falling below a threshold or other constraints leading potentially to a "sub-optimum selection" but reducing complexity and processing time.

In other words, the partitioning unit 262 may be configured to partition the block 203 into smaller block partitions or sub-blocks (which form again blocks), e.g. iteratively using quad-tree-partitioning (QT), binary partitioning (BT) or triple-tree-partitioning (TT) or any combination thereof, and to perform, e.g., the prediction for each of the block partitions or sub-blocks, wherein the mode selection comprises the selection of the tree-structure of the partitioned block 203 and the prediction modes are applied to each of the block partitions or sub-blocks.

In the following the partitioning (e.g. by partitioning unit 260) and prediction processing (by inter-prediction unit 244 and intra-prediction unit 254) performed by an example video encoder 20 will be explained in more detail.

Partitioning

The partitioning unit 262 may partition (or split) a current block 203 into smaller partitions, e.g. smaller blocks of square or rectangular size. These smaller blocks (which may also be referred to as sub-blocks) may be further partitioned into even smaller partitions. This is also referred to tree-partitioning or hierarchical tree-partitioning, wherein a root block, e.g. at root tree-level 0 (hierarchy-level 0, depth 0), may be recursively partitioned, e.g. partitioned into two or more blocks of a next lower tree-level, e.g. nodes at tree-level 1 (hierarchy-level 1, depth 1), wherein these blocks may be again partitioned into two or more blocks of a next lower level, e.g. tree-level 2 (hierarchy-level 2, depth 2), etc. until the partitioning is terminated, e.g. because a termination criterion is fulfilled, e.g. a maximum tree depth or minimum block size is reached. Blocks which are not further partitioned are also referred to as leaf-blocks or leaf nodes of the tree. A tree using partitioning into two partitions is referred to as binary-tree (BT), a tree using partitioning into three partitions is referred to as ternary-tree (TT), and a tree using partitioning into four partitions is referred to as quad-tree (QT).

As mentioned before, the term "block" as used herein may be a portion, in particular a square or rectangular portion, of a picture. With reference, for example, to HEVC and VVC, the block may be or correspond to a coding tree unit (CTU), a coding unit (CU), prediction unit (PU), and transform unit (TU) and/or to the corresponding blocks, e.g. a coding tree block (CTB), a coding block (CB), a transform block (TB) or prediction block (PB).

For example, a coding tree unit (CTU) may be or comprise a CTB of luma samples, two corresponding CTBs of chroma samples of a picture that has three sample arrays, or a CTB of samples of a monochrome picture or a picture that is coded using three separate colour planes and syntax structures used to code the samples. Correspondingly, a coding tree block (CTB) may be an N×N block of samples for some value of N such that the division of a component into CTBs is a partitioning. A coding unit (CU) may be or comprise a coding block of luma samples, two corresponding coding blocks of chroma samples of a picture that has three sample arrays, or a coding block of samples of a monochrome picture or a picture that is coded using three separate colour planes and syntax structures used to code the samples. Correspondingly a coding block (CB) may be an M×N block of samples for some values of M and N such that the division of a CTB into coding blocks is a partitioning.

In embodiments, e.g., according to HEVC, a coding tree unit (CTU) may be split into CUs by using a quad-tree structure denoted as coding tree. The decision whether to code a picture area using inter-picture (temporal) or intra-picture (spatial) prediction is made at the CU level. Each CU can be further split into one, two or four PUs according to the PU splitting type. Inside one PU, the same prediction process is applied and the relevant information is transmitted to the decoder on a PU basis. After obtaining the residual block by applying the prediction process based on the PU splitting type, a CU can be partitioned into transform units (TUs) according to another quadtree structure similar to the coding tree for the CU.

In embodiments, e.g., according to the latest video coding standard currently in development, which is referred to as Versatile Video Coding (VVC), a combined Quad-tree and binary tree (QTBT) partitioning is for example used to partition a coding block. In the QTBT block structure, a CU can have either a square or rectangular shape. For example, a coding tree unit (CTU) is first partitioned by a quadtree structure. The quadtree leaf nodes are further partitioned by a binary tree or ternary (or triple) tree structure. The partitioning tree leaf nodes are called coding units (CUs), and that segmentation is used for prediction and transform processing without any further partitioning. This means that the CU, PU and TU have the same block size in the QTBT coding block structure. In parallel, multiple partition, for example, triple tree partition may be used together with the QTBT block structure.

In some embodiments, such as in the draft VVC standard, in order to facilitate a processing pipeline in hardware with limited internal memory compared to the CTU, a virtual pipeline data unit (VPDU) is defined. A VPDU is a virtual partitioning of a CTU into uniform sub-blocks of luminance samples and corresponding chrominance samples with a specific processing order across the partitions within the CTU in such a manner that the processing of a given VPDU does not depend on the processing of any other future VPDU in the processing order. However, certain syntax elements can still be signaled in the bitstream at the CTU level and shall apply for all VPDUs in that CTU. Certain constraints to partitioning may be imposed to ensure that a coding unit completely spans one or more VPDUs, but cannot partially cover a VPDU. In one example, the mode selection unit 260 of video encoder 20 may be configured to perform any combination of the partitioning techniques described herein.

As described above, the video encoder 20 is configured to determine or select the best or an optimum prediction mode from a set of (e.g. pre-determined) prediction modes. The set of prediction modes may comprise, e.g., intra-prediction modes and/or inter-prediction modes.

Intra-Prediction

The set of intra-prediction modes may comprise 35 different intra-prediction modes, e.g. non-directional modes like DC (or mean) mode and planar mode, or directional modes, e.g. as defined in HEVC, or may comprise 67 different intra-prediction modes, e.g. non-directional modes like DC (or mean) mode and planar mode, or directional modes, e.g. as defined for VVC.

The intra-prediction unit 254 is configured to use reconstructed samples of neighboring blocks of the same current picture to generate an intra-prediction block 265 according to an intra-prediction mode of the set of intra-prediction modes.

The intra prediction unit 254 (or in general the mode selection unit 260) is further configured to output intra-prediction parameters (or in general information indicative of the selected intra prediction mode for the block) to the entropy encoding unit 270 in form of syntax elements 266 for inclusion into the encoded picture data 21, so that, e.g., the video decoder 30 may receive and use the prediction parameters for decoding.

Inter-Prediction

The set of (or possible) inter-prediction modes depends on the available reference pictures (i.e. previous at least partially decoded pictures, e.g. stored in DPB 230) and other inter-prediction parameters, e.g. whether the whole reference picture or only a part, e.g. a search window area around the area of the current block, of the reference picture is used for searching for a best matching reference block, and/or e.g. whether pixel interpolation is applied, e.g. half/semi-pel and/or quarter-pel interpolation, or not. Additional to the above prediction modes, skip mode and/or direct mode may be applied.

The inter prediction unit 244 may include a motion estimation (ME) unit and a motion compensation (MC) unit (both not shown in FIG. 2). The motion estimation unit may be configured to receive or obtain the picture block 203 (current picture block 203 of the current picture 17) and a decoded picture 231, or at least one or a plurality of previously reconstructed blocks, e.g. reconstructed blocks of one or a plurality of other/different previously decoded pictures 231, for motion estimation. E.g. a video sequence may comprise the current picture and the previously decoded pictures 231, or in other words, the current picture and the previously decoded pictures 231 may be part of or form a sequence of pictures forming a video sequence.

The encoder 20 may, e.g., be configured to select a reference block from a plurality of reference blocks of the same or different pictures of the plurality of other pictures and provide a reference picture (or reference picture index) and/or an offset (spatial offset) between the position (x, y coordinates) of the reference block and the position of the current block as inter prediction parameters to the motion estimation unit. This offset is also called motion vector (MV).

The motion compensation unit is configured to obtain, e.g. receive, an inter prediction parameter and to perform inter prediction based on or using the inter prediction parameter to obtain an inter prediction block 265. Motion compensation, performed by the motion compensation unit, may involve fetching or generating the prediction block based on the motion/block vector determined by motion estimation, possibly performing interpolations to sub-pixel precision. Interpolation filtering may generate additional pixel samples from known pixel samples, thus potentially increasing the number of candidate prediction blocks that may be used to code a picture block. Upon receiving the motion vector for the PU of the current picture block, the motion compensation unit may locate the prediction block to which the motion vector points in one of the reference picture lists.

The motion compensation unit may also generate syntax elements associated with the blocks and video slices for use by video decoder 30 in decoding the picture blocks of the video slice. In addition or as an alternative to slices and respective syntax elements, tile groups and/or tiles and respective syntax elements may be generated or used.

As will be discussed in detail below, the embodiments presented herein provide an improvement to the inter-prediction unit 244 by providing more accurate motion vector prediction used by the inter-prediction unit when performing the inter prediction, for example, the bi-directional optical flow (BDOF) based inter prediction.

Entropy Coding

The entropy encoding unit 270 is configured to apply, for example, an entropy encoding algorithm or scheme (e.g. a variable length coding (VLC) scheme, an context adaptive VLC scheme (CAVLC), an arithmetic coding scheme, a binarization, a context adaptive binary arithmetic coding (CABAC), syntax-based context-adaptive binary arithmetic coding (SBAC), probability interval partitioning entropy (PIPE) coding or another entropy encoding methodology or technique) or bypass (no compression) on the quantized coefficients 209, inter prediction parameters, intra prediction parameters, loop filter parameters and/or other syntax elements to obtain encoded picture data 21 which can be output via the output 272, e.g. in the form of an encoded bitstream 21, so that, e.g., the video decoder 30 may receive and use the parameters for decoding. The encoded bitstream 21 may be transmitted to video decoder 30, or stored in a memory for later transmission or retrieval by video decoder 30.

Other structural variations of the video encoder 20 can be used to encode the video stream. For example, a non-transform based encoder 20 can quantize the residual signal directly without the transform processing unit 206 for certain blocks or frames. In another implementation, an encoder 20 can have the quantization unit 208 and the inverse quantization unit 210 combined into a single unit.

Decoder and Decoding Method

FIG. 3 shows an example of a video decoder 30 that is configured to implement the techniques of this present application. The video decoder 30 is configured to receive encoded picture data 21 (e.g. encoded bitstream 21), e.g. encoded by encoder 20, to obtain a decoded picture 331. The encoded picture data or bitstream comprises information for decoding the encoded picture data, e.g. data that represents picture blocks of an encoded video slice (and/or tile groups or tiles) and associated syntax elements.

In the example of FIG. 3, the decoder 30 comprises an entropy decoding unit 304, an inverse quantization unit 310, an inverse transform processing unit 312, a reconstruction unit 314 (e.g. a summer 314), a loop filter 320, a decoded picture buffer (DBP) 330, a mode application unit 360, an inter prediction unit 344 and an intra prediction unit 354. Inter prediction unit 344 may be or include a motion compensation unit. Video decoder 30 may, in some examples, perform a decoding pass generally reciprocal to the encoding pass described with respect to video encoder 100 from FIG. 2.

As explained with regard to the encoder 20, the inverse quantization unit 210, the inverse transform processing unit 212, the reconstruction unit 214 the loop filter 220, the decoded picture buffer (DPB) 230, the inter prediction unit 344 and the intra prediction unit 354 are also referred to as forming the "built-in decoder" of video encoder 20. Accordingly, the inverse quantization unit 310 may be identical in function to the inverse quantization unit 110, the inverse transform processing unit 312 may be identical in function to the inverse transform processing unit 212, the reconstruction unit 314 may be identical in function to reconstruction unit 214, the loop filter 320 may be identical in function to the loop filter 220, and the decoded picture buffer 330 may be identical in function to the decoded picture buffer 230. Therefore, the explanations provided for the respective units and functions of the video 20 encoder apply correspondingly to the respective units and functions of the video decoder 30.

Entropy Decoding

The entropy decoding unit 304 is configured to parse the bitstream 21 (or in general encoded picture data 21) and perform, for example, entropy decoding to the encoded picture data 21 to obtain, e.g., quantized coefficients 309 and/or decoded coding parameters (not shown in FIG. 3), e.g. any or all of inter prediction parameters (e.g. reference picture index and motion vector), intra prediction parameter (e.g. intra prediction mode or index), transform parameters, quantization parameters, loop filter parameters, and/or other syntax elements. Entropy decoding unit 304 maybe configured to apply the decoding algorithms or schemes corresponding to the encoding schemes as described with regard to the entropy encoding unit 270 of the encoder 20. Entropy decoding unit 304 may be further configured to provide inter prediction parameters, intra prediction parameter and/or other syntax elements to the mode application unit 360 and other parameters to other units of the decoder 30. Video decoder 30 may receive the syntax elements at the video slice level and/or the video block level. In addition or as an alternative to slices and respective syntax elements, tile groups and/or tiles and respective syntax elements may be received and/or used.

Inverse Quantization

The inverse quantization unit 310 may be configured to receive quantization parameters (QP) (or in general information related to the inverse quantization) and quantized coefficients from the encoded picture data 21 (e.g. by parsing and/or decoding, e.g. by entropy decoding unit 304) and to apply based on the quantization parameters an inverse quantization on the decoded quantized coefficients 309 to obtain dequantized coefficients 311, which may also be referred to as transform coefficients 311. The inverse quantization process may include use of a quantization parameter determined by video encoder 20 for each video block in the video slice (or tile or tile group) to determine a degree of quantization and, likewise, a degree of inverse quantization that should be applied.

Inverse Transform

Inverse transform processing unit 312 may be configured to receive dequantized coefficients 311, also referred to as transform coefficients 311, and to apply a transform to the dequantized coefficients 311 in order to obtain reconstructed residual blocks 213 in the sample domain. The reconstructed residual blocks 213 may also be referred to as transform blocks 313. The transform may be an inverse transform, e.g., an inverse DCT, an inverse DST, an inverse integer transform, or a conceptually similar inverse transform process. The inverse transform processing unit 312 may be further configured to receive transform parameters or corresponding information from the encoded picture data 21 (e.g. by parsing and/or decoding, e.g. by entropy decoding unit 304) to determine the transform to be applied to the dequantized coefficients 311.

Reconstruction

The reconstruction unit 314 (e.g. adder or summer 314) may be configured to add the reconstructed residual block 313, to the prediction block 365 to obtain a reconstructed block 315 in the sample domain, e.g. by adding the sample values of the reconstructed residual block 313 and the sample values of the prediction block 365.

Filtering

The loop filter unit 320 (either in the coding loop or after the coding loop) is configured to filter the reconstructed block 315 to obtain a filtered block 321, e.g. to smooth pixel transitions, or otherwise improve the video quality. The loop filter unit 320 may comprise one or more loop filters such as a de-blocking filter, a sample-adaptive offset (SAO) filter or one or more other filters, e.g. a bilateral filter, an adaptive loop filter (ALF), a sharpening, a smoothing filters or a collaborative filters, or any combination thereof. Although the loop filter unit 320 is shown in FIG. 3 as being an in loop filter, in other configurations, the loop filter unit 320 may be implemented as a post loop filter.

Decoded Picture Buffer

The decoded video blocks 321 of a picture are then stored in decoded picture buffer 330, which stores the decoded pictures 331 as reference pictures for subsequent motion compensation for other pictures and/or for output respectively display. The decoder 30 is configured to output the decoded picture 311, e.g. via output 312, for presentation or viewing to a user.

Prediction

The inter prediction unit 344 may be identical to the inter prediction unit 244 (in particular to the motion compensation unit) and the intra prediction unit 354 may be identical to the intra prediction unit 254 in function, and performs split or partitioning decisions and prediction based on the partitioning and/or prediction parameters or respective information received from the encoded picture data 21 (e.g. by parsing and/or decoding, e.g. by entropy decoding unit 304). Mode application unit 360 may be configured to perform the prediction (intra or inter prediction) per block based on reconstructed pictures, blocks or respective samples (filtered or unfiltered) to obtain the prediction block 365.

When the video slice is coded as an intra coded (I) slice, intra prediction unit 354 of mode application unit 360 is configured to generate prediction block 365 for a picture block of the current video slice based on a signaled intra prediction mode and data from previously decoded blocks of the current picture. When the video picture is coded as an inter coded (i.e., B, or P) slice, inter prediction unit 344 (e.g. motion compensation unit) of mode application unit 360 is configured to produce prediction blocks 365 for a video block of the current video slice based on the motion vectors and other syntax elements received from entropy decoding unit 304. For inter prediction, the prediction blocks may be produced from one of the reference pictures within one of the reference picture lists. Video decoder 30 may construct the reference frame lists, List 0 and List 1, using default construction techniques based on reference pictures stored in DPB 330. The same or similar may be applied for or by embodiments using tile groups (e.g. video tile groups) and/or tiles (e.g. video tiles) in addition or alternatively to slices (e.g. video slices), e.g. a video may be coded using I, P or B tile groups and/or tiles.

As will be discussed in detail below, the embodiments presented herein provide an improvement to the inter-prediction unit 344 by providing more accurate motion vector prediction used by the inter-prediction unit when performing the inter prediction, for example, the bi-directional optical flow (BDOF) based inter prediction.

Mode application unit 360 is configured to determine the prediction information for a video block of the current video slice by parsing the motion vectors or related information and other syntax elements, and uses the prediction information to produce the prediction blocks for the current video block being decoded. For example, the mode application unit 360 uses some of the received syntax elements to determine a prediction mode (e.g., intra or inter prediction) used to code the video blocks of the video slice, an inter prediction slice type (e.g., B slice, P slice, or GPB slice), construction information for one or more of the reference picture lists for the slice, motion vectors for each inter encoded video block of the slice, inter prediction status for each inter coded video block of the slice, and other information to decode the video blocks in the current video slice. The same or similar may be applied for or by embodiments using tile groups (e.g. video tile groups) and/or tiles (e.g. video tiles) in addition or alternatively to slices (e.g. video slices), e.g. a video may be coded using I, P or B tile groups and/or tiles.

Embodiments of the video decoder 30 as shown in FIG. 3 may be configured to partition and/or decode the picture by using slices (also referred to as video slices), wherein a picture may be partitioned into or decoded using one or more slices (typically non-overlapping), and each slice may comprise one or more blocks (e.g. CTUs).

Embodiments of the video decoder 30 as shown in FIG. 3 may be configured to partition and/or decode the picture by using tile groups (also referred to as video tile groups) and/or tiles (also referred to as video tiles), wherein a picture may be partitioned into or decoded using one or more tile groups (typically non-overlapping), and each tile group may comprise, e.g. one or more blocks (e.g. CTUs) or one or more tiles, wherein each tile, e.g. may be of rectangular shape and may comprise one or more blocks (e.g. CTUs), e.g. complete or fractional blocks.

Other variations of the video decoder 30 can be used to decode the encoded picture data 21. For example, the decoder 30 can produce the output video stream without the loop filtering unit 320. For example, a non-transform based decoder 30 can inverse-quantize the residual signal directly without the inverse-transform processing unit 312 for certain blocks or frames. In another implementation, the video decoder 30 can have the inverse-quantization unit 310 and the inverse-transform processing unit 312 combined into a single unit.

It should be understood that, in the encoder 20 and the decoder 30, a processing result of a current operation may be further processed and then output to the next operation. For example, after interpolation filtering, motion vector derivation or loop filtering, a further operation, such as Clip or shift, may be performed on the processing result of the interpolation filtering, motion vector derivation or loop filtering.

It should be noted that further operations may be applied to the derived motion vectors of current block (including but not limit to control point motion vectors of affine mode, sub-block motion vectors in affine, planar, ATMVP modes, temporal motion vectors, and so on). For example, the value of motion vector is constrained to a predefined range according to its representing bit. If the representing bit of motion vector is bitDepth, then the range is −2^(bitDepth−1)~2^(bitDepth−1)−1, where "A" means exponentiation. For example, if bitDepth is set equal to 16, the range is −32768~32767; if bitDepth is set equal to 18, the range is −131072−131071. For example, the value of the derived motion vector (e.g. the MVs of four 4×4 sub-blocks within one 8×8 block) is constrained such that the max difference between integer parts of the four 4×4 sub-block MVs is no more than N pixels, such as no more than 1 pixel. Here provides two methods for constraining the motion vector according to the bitDepth.

Method 1: remove the overflow MSB (most significant bit) by flowing operations $$ux = \left(mvx + 2^{bitDepth}\right) \% \ 2^{bitDepth} \tag{1}$$

$$mvx = \left(ux >= 2^{bitDepth-1}\right) \ ? \ \left(ux - 2^{bitDepth}\right) : \ ux \tag{2}$$

$$uy = \left(mvy + 2^{bitDepth}\right) \% \ 2^{bitDepth} \tag{3}$$

$$mvy = \left(uy >= 2^{bitDepth-1}\right) \ ? \ \left(uy - 2^{bitDepth}\right) : \ uy \tag{4}$$

where mvx is a horizontal component of a motion vector of an image block or a sub-block, mvy is a vertical component of a motion vector of an image block or a sub-block, and ux and uy indicates an intermediate value.

For example, if the value of mvx is −32769, after applying formula (1) and (2), the resulting value is 32767. In computer system, decimal numbers are stored as two's complement. The two's complement of −32769 is 1,0111,1111, 1111,1111 (17 bits), then the MSB is discarded, so the resulting two's complement is 0111,1111,1111,1111 (decimal number is 32767), which is same as the output by applying formula (1) and (2).

$$ux = \left(mvpx + mvdx + 2^{bitDepth}\right) \% \ 2^{bitDepth} \tag{5}$$

$$mvx = \left(ux >= 2^{bitDepth-1}\right) \ ? \ \left(ux - 2^{bitDepth}\right) : \ ux \tag{6}$$

$$uy = \left(mvpy + mvdy + 2^{bitDepth}\right) \% \ 2^{bitDepth} \tag{7}$$

$$mvy = \left(uy >= 2^{bitDepth-1}\right) \ ? \ \left(uy - 2^{bitDepth}\right) : \ uy \tag{8}$$

The operations may be applied during the sum of mvp and mvd, as shown in formula (5) to (8).

Method 2: remove the overflow MSB by clipping the value $$vx = \text{Clip3}\left(-2^{bitDepth-1}, \ 2^{bitDepth-1} - 1, \ vx\right) \tag{9}$$

$$vy = \text{Clip3}\left(-2^{bitDepth-1}, \ 2^{bitDepth-1} - 1, \ vy\right) \tag{10}$$

where $v_x$ is a horizontal component of a motion vector of an image block or a sub-block, $v_y$ is a vertical component of a motion vector of an image block or a sub-block; x, y and z respectively correspond to three input value of the MV clipping process, and the definition of function Clip3 is as follow:

$$\text{Clip3}(x, y, z) = \begin{cases} x; & z < x \\ y; & z > y \\ z; & \text{otherwise} \end{cases} \tag{11}$$

Figure 4:
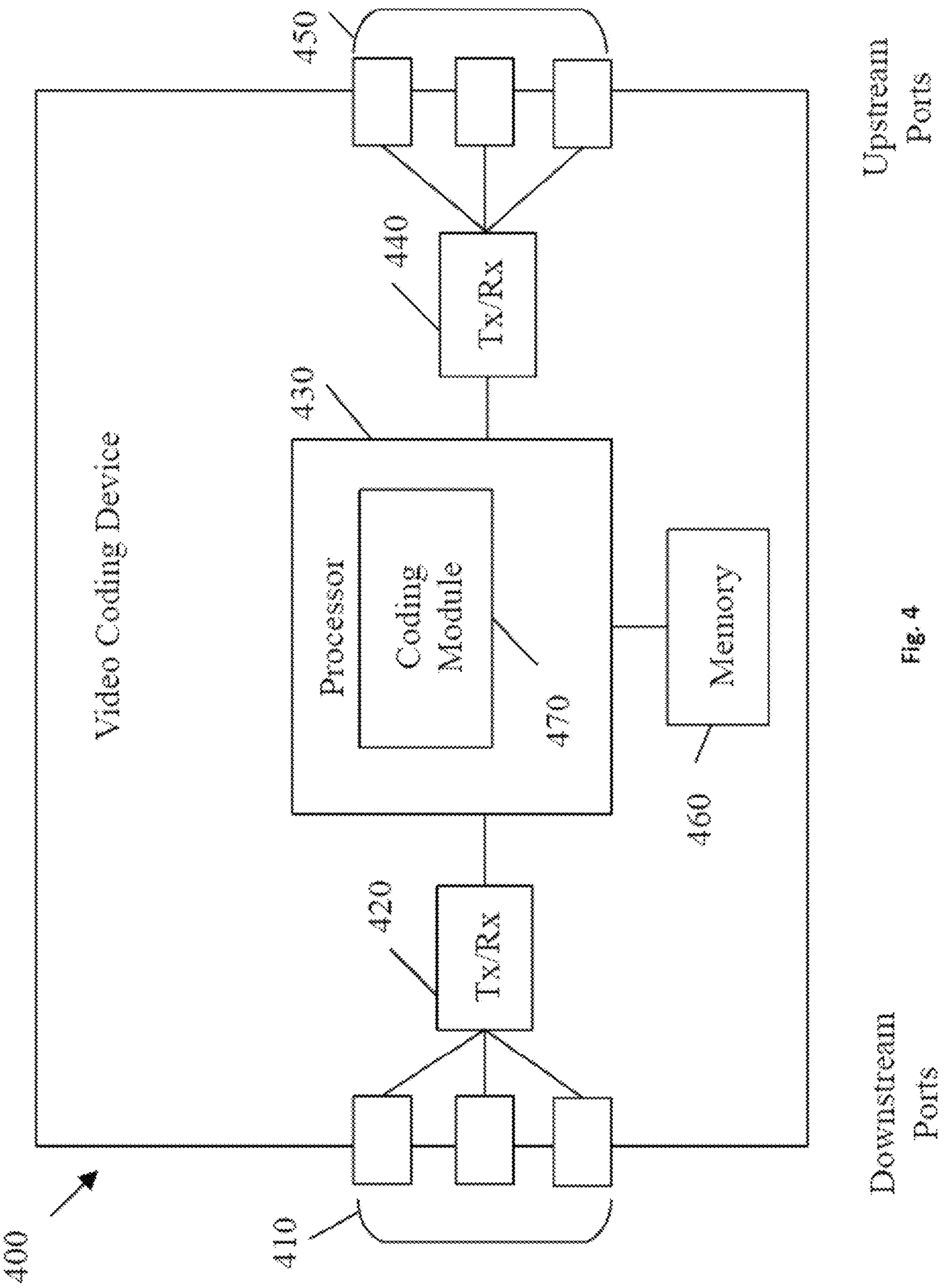
FIG. 4 is a block diagram illustrating an example of an encoding apparatus or a decoding apparatus.

FIG. 4 is a schematic diagram of a video coding device 400 according to an embodiment. The video coding device 400 is suitable for implementing the disclosed embodiments as described herein. In an embodiment, the video coding device 400 may be a decoder such as video decoder 30 of FIG. 1A or an encoder such as video encoder 20 of FIG. 1A.

The video coding device 400 comprises ingress ports 410 (or input ports 410) and receiver units (Rx) 420 for receiving data; a processor, logic unit, or central processing unit (CPU) 430 to process the data; transmitter units (Tx) 440 and egress ports 450 (or output ports 450) for transmitting the data; and a memory 460 for storing the data. The video coding device 400 may also comprise optical-to-electrical (OE) components and electrical-to-optical (EO) components coupled to the ingress ports 410, the receiver units 420, the transmitter units 440, and the egress ports 450 for egress or ingress of optical or electrical signals.

The processor 430 is implemented by hardware and software. The processor 430 may be implemented as one or more CPU chips, cores (e.g., as a multi-core processor), FPGAs, ASICs, and DSPs. The processor 430 is in communication with the ingress ports 410, receiver units 420, transmitter units 440, egress ports 450, and memory 460. The processor 430 comprises a coding module 470. The coding module 470 implements the disclosed embodiments described above. For instance, the coding module 470 implements, processes, prepares, or provides the various coding operations. The inclusion of the coding module 470 therefore provides a substantial improvement to the functionality of the video coding device 400 and effects a transformation of the video coding device 400 to a different state. Alternatively, the coding module 470 is implemented as instructions stored in the memory 460 and executed by the processor 430.

The memory 460 may comprise one or more disks, tape drives, and solid-state drives and may be used as an overflow data storage device, to store programs when such programs are selected for execution, and to store instructions and data that are read during program execution. The memory 460 may be, for example, volatile and/or non-volatile and may be a read-only memory (ROM), random access memory (RAM), ternary content-addressable memory (TCAM), and/or static random-access memory (SRAM).

Figure 5:
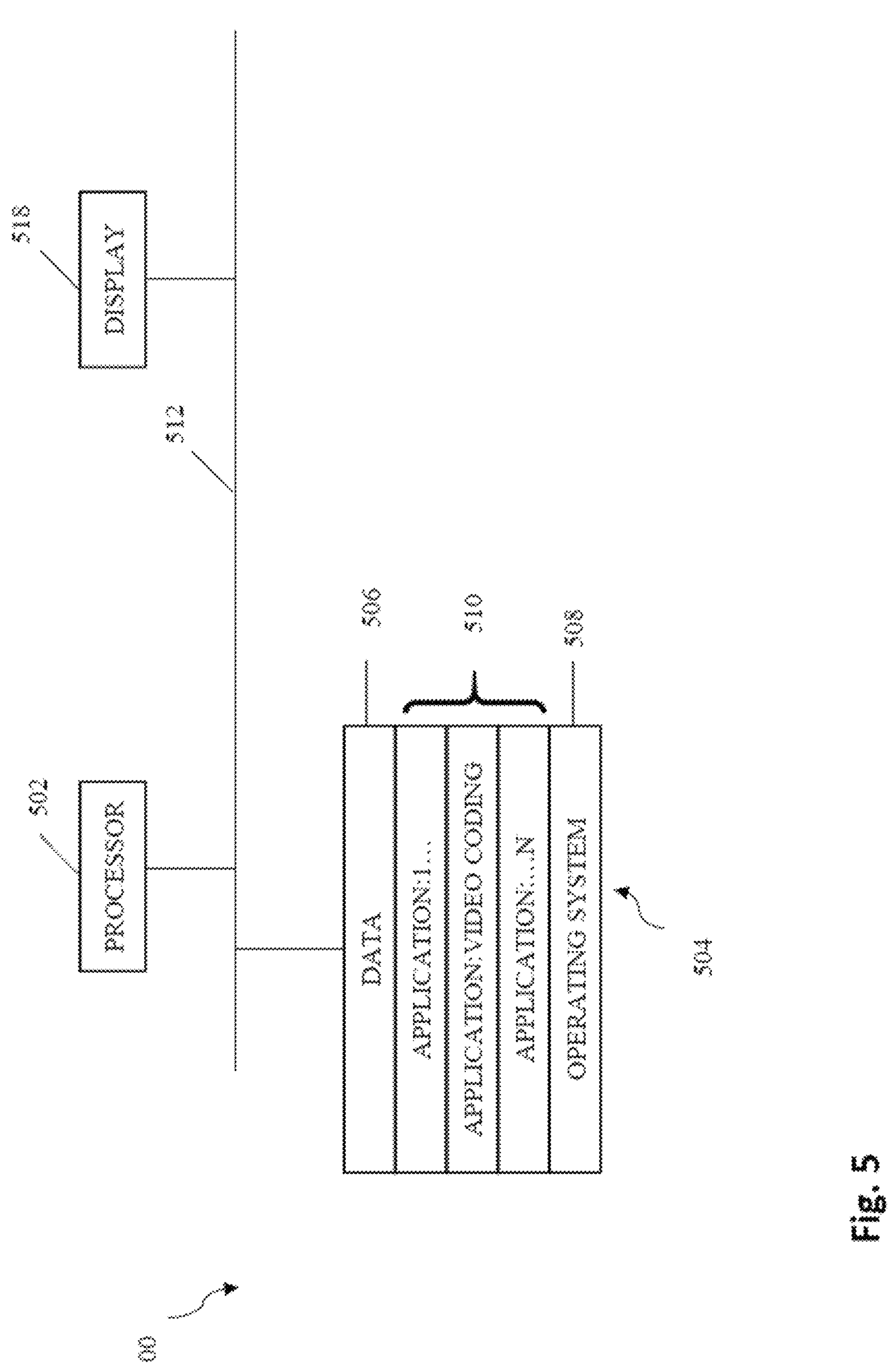
FIG. 5 is a block diagram illustrating another example of an encoding apparatus or a decoding apparatus.

FIG. 5 is a simplified block diagram of an apparatus 500 that may be used as either or both of the source device 12 and the destination device 14 from FIG. 1A according to an exemplary embodiment. A processor 502 in the apparatus 500 can be a central processing unit. Alternatively, the processor 502 can be any other type of device, or multiple devices, capable of manipulating or processing information now-existing or hereafter developed. Although the disclosed implementations can be practiced with a single processor as shown, e.g., the processor 502, advantages in speed and efficiency can be achieved using more than one processor.

A memory 504 in the apparatus 500 can be a read only memory (ROM) device or a random access memory (RAM) device in an implementation. Any other suitable type of storage device can be used as the memory 504. The memory 504 can include code and data 506 that is accessed by the processor 502 using a bus 512. The memory 504 can further include an operating system 508 and application programs 510, the application programs 510 including at least one program that permits the processor 502 to perform the methods described here. For example, the application programs 510 can include applications 1 through N, which further include a video coding application that performs the methods described here.

The apparatus 500 can also include one or more output devices, such as a display 518. The display 518 may be, in one example, a touch sensitive display that combines a display with a touch sensitive element that is operable to sense touch inputs. The display 518 can be coupled to the processor 502 via the bus 512.

Although depicted here as a single bus, the bus 512 of the apparatus 500 can be composed of multiple buses. Further, the secondary storage 514 can be directly coupled to the other components of the apparatus 500 or can be accessed via a network and can comprise a single integrated unit such as a memory card or multiple units such as multiple memory cards. The apparatus 500 can thus be implemented in a wide variety of configurations.

Motion Vector Refinement (MVR)

Motion vectors are usually at least partially determined at the encoder side and signaled to the decoder within the coded bitstream. However, the motion vectors may also be refined at the decoder (and also at the encoder) starting from initial motion vectors indicated in the bitstream. In such case, for instance, similarity between the patches of already decoded pixels pointed by the initial motion vectors may be used to improve the accuracy of the initial motion vectors. Such motion refinement provides an advantage of reducing the signaling overhead: the accuracy of the initial motion vectors is improved in the same way at both the encoder and the decoder and thus, no additional signaling for the refinement is needed.

It is noted that the initial motion vectors before refinement might not be the best motion vectors that result in the best prediction. Since the initial motion vectors are signaled in the bitstream, it might not be possible to represent the initial motion vector with very high accuracy (which would increase the bitrate), therefore the motion vector refinement process is utilized to improve the initial motion vector. Initial motion vectors might, for instance, be the motion vectors that are used in the prediction of a neighbor block of a current block. In this case, it is enough to signal an indication in the bitstream, indicating motion vectors of which neighbor block is used by the current block. Such a prediction mechanism is very efficient in reducing the number of bits to represent the initial motion vectors. However the accuracy of the initial motion vectors might be low, since in general the motion vectors of two neighboring blocks are not expected to be identical.

In order to further improve the accuracy of motion vectors without further increase in signaling overhead, it may be beneficial to further refine the motion vectors derived at the encoder side and provided (signaled) in the bitstream. The motion vector refinement may be performed at the decoder without assistance from the encoder. The encoder in its decoder loop may employ the same refinement to obtain corresponding refined motion vectors as would be available at the decoder. The refinement for a current block that is being reconstructed in a current picture is performed by determining a template of reconstructed samples, determining a search space around the initial motion information for the current block and finding in the search space a reference picture portion best matching the template. The best matching portion determines the refined motion vectors for the current block which is then used to obtain the Inter-predicted samples for the current block, i.e. the current block being reconstructed. Motion vector refinement is a part of Inter Prediction Unit (244) in FIGS. 2 and 344 in FIG. 3.

The motion vector refinement may be performed according to the following operations. Typically, an initial motion vectors can be determined based on an indication in the bitstream. For example, an index might be signaled in the bitstream which indicates a position in a list of candidate motion vectors. In another example, a motion vector predictor index and motion vector difference value can be signaled in the bitstream. Motion vectors that are determined based on an indication in the bitstream are defined to be initial motion vectors. In the case of bi-prediction, the inter-prediction for the current block is obtained as a weighted combination of the predicted block of samples determined according to two motion vectors MV0 and MV1. Here, MV0 is the initial motion vector in a first reference picture in list L0 and MV1 is the initial motion vector in the second reference picture in list L1.

Using the initial motion vectors, refinement candidate motion vector (MV) pairs are determined. At least, two refinement candidate pairs need to be determined. Typically, the refinement candidate motion vector pairs are determined based on the initial motion vector pair (MV0, MV1). Furthermore, the candidate MV pairs are determined by adding small motion vector differences to MV0 and MV1. For example, the candidate MV pairs might include the following:

$$(MV0, MV1)$$
$$(MV0+(0,1), MV1+(0,-1))$$
$$(MV0+(1,0), MV1+(-1,0))$$
$$(MV0+(0,-1), MV1+(0,1))$$
$$(MV0+(-1,0), MV1+(1,0))$$
$$\ldots$$

Here, (1,−1) denotes a vector that has a displacement of 1 in the horizontal (or x) direction and a displacement of −1 in the vertical (or y) direction. It is noted that the above list of candidate pairs are just examples for explanation and the disclosure is not limited to a specific list of candidates. In some examples, the search space of the motion vector refinement process includes the refinement candidate motion vector (MV) pairs.

In a bi-prediction of current block, two prediction blocks obtained using the respective first motion vector for list L0 and the second motion vector for list L1, are combined to a single prediction signal, which can provide a better adaptation to the original signal than uni-prediction, resulting in less residual information and possibly a more efficient compression.

In motion vector refinement, the two prediction blocks obtained using the respective first motion vector and the second motion vector of a candidate MV pair are compared based on a similarity metric for each of the refinement candidate MV pairs. A candidate MV pair resulting in the highest similarity metric is selected as the refined motion vectors. The refined motion vector for a first reference picture in list L0 and the refined motion vector for a second reference picture in list L1 are denoted MV0' and MV1', respectively. In other words, predictions are obtained corresponding to list L0 motion vector and list L1 motion vector of the candidate motion vector pair, which are then compared based on a similarity metric. The candidate motion vector pair that has the highest associated similarity is selected as refined MV pair.

Typically the output of the refinement process are refined MVs. The refined MVs might be same as the initial MVs or might be different with the initial MVs, depending on which candidate MV pair achieves the highest similarity, the candidate MV pair formed by initial MVs are also among the MV pair candidates. In other words, if the highest candidate MV pair that achieves the highest similarity is formed by the initial MVs, the refined MVs and initial MVs are equal to each other.

Instead of selecting the position that maximizes a similarity metric, another method is select a position that minimizes a dis-similarity metric. The dis-similarity comparison measure might be SAD (Sum of absolute differences), MRSAD (mean removed sum of absolute differences, SSE (Sum of Squared Error) etc. The SAD between two prediction blocks may be obtained using a candidate MV pair (CMV0, CMV1), the SAD can be computed as follows:

$$SAD(CMV0, CMV1) = \sum_{x=0}^{nCbW-1} \sum_{y=0}^{nCbH-1} \text{abs}(predSamplesL0[x][y] - predSamplesL1[x][y]) \quad (12)$$

where nCbH and nCbW are the height and the width of the prediction blocks; the function abs(a) specifies the absolute value of the argument a; and predSAmplesL0 and predSAmplesL1 are prediction block samples obtained according to a candidate MV pair which is denoted by (CMV0, CMV1).

Alternatively, the dis-similarity comparison measures can be obtained by evaluating only a subset of samples in a prediction block, in order to reduce the number of computations. An example is below, where rows of samples are alternatively included in the SAD calculation (every second row is evaluated).

$$SAD(CMV0, CMV1) = \sum_{x=0}^{nCbW-1} \sum_{y=0}^{nCbH/2-1} \text{abs}(predSamplesL0[x][2*y] - predSamplesL1[x][2*y]) \quad (13)$$

One example of motion vector refinement is explained in the document JVET-M1001-v3, "Versatile Video Coding (Draft 4)" of JVET (of ITU-T SG 16 WP 3 and ISO/IEC JTC 1/SC 29/WG 11) which is publicly available under http://phenix.it-sudparis.eu/jvet/". The section "8.4.3 Decoder side motion vector refinement process" in the document exemplifies the motion vector refinement.

In order to reduce internal memory requirements for refinement, in some embodiments, the motion vector refinement process may be performed independently on blocks of luma samples. The blocks of luma samples can be obtained by partitioning coded block of samples that exceed a certain pre-determined width or pre-determined height in luma samples into sub-blocks of samples that are less than or equal to the pre-determined width and pre-determined height in luma sample. The refined MV pair for each sub-block within a partitioned coded block can be different. Inter-prediction for both luma and chroma are then performed for each sub-block using the refined MV pair of that sub-block.

Denote the maximum allowed subblock width and height as max_sb_width and max_sb_height, respectively. A current coding unit of size cbWidth x cbHeight that is eligible for applying MVR is typically partitioned into a number of sub-blocks numSbs each of size sbWidth×sbHeight as follows:

$$numSbs = numSbX * numSbY \quad (14)$$

$$numSbX = (cbWidth > \text{max\_sb\_width}) ? (cbWidth/\text{max\_sb\_width}): 1 \quad (15)$$

$$numSbY = (cbHeight > \text{max\_sb\_height}) ? (cbHeight/\text{max\_sb\_height}): 1 \quad (16)$$

$$sbWidth = (cbWidth > \text{max\_sb\_width}) ? \text{max\_sb\_width}: cbWidth \quad (17)$$

$$sbHeight = (cbHeight > \text{max\_sb\_height}) ? \text{max\_sb\_height}: cbHeight \quad (18)$$

where the expression (x>y)?a:b returns value a if x>y is true and returns b if x>y is false. Each MV of the initial MV pair can have a fractional pixel precision. In other words, the MV can indicate a displacement between a current block of samples and a re-sampled reference region. This displacement can point to a fractional position in the horizontal and vertical directions from the integer grid of reconstructed reference samples.

Typically, a 2-dimensional interpolation of the reconstructed reference integer sample grid values is performed to obtain the sample values at the fractional sample offset location. The process of obtaining predicted samples from the reconstructed reference pictures using a candidate MV pair can be through one of the following methods:

- Round the fractional part of the initial MV pair to the nearest integer location and obtain the integer grid values of the reconstructed reference pictures.
- Perform a 2-tap (e.g. bilinear) separable bilinear interpolation to obtain the predicted sample values at the fractional pixel accuracy indicated by the initial MV pair.
- Perform a higher tap (e.g. 8-tap or 6-tap) separable interpolation to obtain the predicted sample values at the fractional pixel accuracy indicated by the initial MV pair.

While the candidate MV pairs can have arbitrary sub-pixel offset with respect to the initial MV pair, in some embodiments, for the sake of simplicity of search, the candidate MV pairs are chosen with integer pixel distance with respect to the initial MV pair. In such cases, the predicted samples across the candidate MV pairs can be obtained by performing a prediction for a block of samples around the initial MV pair to cover all the refinement positions around the initial MV pair.

In some embodiments, after the dis-similarity cost values for candidate MV pairs that are at an integer distance from the initial MV pair have been evaluated, additional candidate MV pairs at sub-pixel offsets from the best cost value position can be added and evaluated. Predicted samples are obtained for each of these positions using one of the methods described earlier and the dis-similarity costs are evaluated and compared to obtain the lowest dis-similarity position. In other embodiments, to avoid this computationally expensive prediction process for each sub-pixel distance position around the best cost integer-distance position, the integer-distance cost values evaluated are remembered and a parametric error surface is fitted in the vicinity of the best integer-distance position. The minimum of this error surface is then analytically computed and used as the position with the minimum dis-similarity. In such cases, the dis-similarity cost value is derived from the computed integer-distance cost values.

The application of motion vector refinement for a given coded block of samples can be conditioned on certain coding properties of the coded block of samples. Some examples of such coding properties include the distance in number of pictures (when sampled at a uniform frame-rate) from the current picture to the two reference pictures used for bi-prediction of the coded block of samples are equal and fall on opposite sides of the current picture. The coding properties can also include the initial dis-similarity between the two predicted blocks obtained using the initial MV pair is less than a pre-determined per-sample threshold.

In some implementations, BPOF is applied to bi-predicted blocks when the two predictions are from different reference pictures. BPOF is not applied to affine, weighted bi-predictive motion compensated, and sub-block based advanced temporal merge mode cases.

Bi-Predictive Optical Flow Refinement

Bi-predictive optical flow refinement is a process of improving the accuracy of bi-prediction of a block without explicitly providing additional signals in the bitstream other than the signals for bi-prediction. The bi-predictive optical flow refinement can be implemented in the inter prediction unit 244 in FIG. 2 and the inter prediction unit 344 in FIG. 3. The input of optical flow refinement process are the prediction samples from two reference pictures and the output of the optical flow refinement is combined prediction (predBIO) which is calculated according to optical flow equation.

In bi-prediction, two inter-predictions are obtained from two reference frames according to two motion vectors, such as the motion vector pair MV0 and MV1 or the refined motion vector pair discussed above. The two predictions can be combined, such as through weighted averaging. The combined prediction can result in a reduced residual energy because the quantization noise in the two predictions are canceled out, thereby providing more coding efficiency compared to uni-prediction (i.e. prediction using one motion vector). In one example, the weighted combination in bi-prediction can be performed as follows:

$$\text{Bi-prediction} = \text{Prediction1} * W1 + \text{Prediction2} * W2 + K, \tag{19}$$

where W1 and W2 are weighting factors that might be signaled in the bitstream or might be predefined. K is an additive factor which might also be signaled or be predefined. As an example, the bi-prediction might be obtained through $$\text{Bi-prediction} = (\text{Prediction1} + \text{Prediction2})/2, \tag{20}$$

where W1 and W2 are set to ½ and K is set to 0.

The accuracy of the bi-prediction can be improved through optical flow refinement. An optical flow is the pattern of apparent motion of image objects between two frames caused by the movement of object or camera. Optical flow refinement process improves the accuracy of the bi-prediction by determining the optical flow between the two references frames and adjust the bi-prediction based on the determined optical flow.

Consider a pixel I(x, y, t) in a first frame with x and y corresponding to spatial coordinates and t corresponding to time dimension. It moves by a distance (dx,dy) in the next frame taken after dt time. Assuming the pixels in the two frames are the same and the intensity does not change within the dt time, the optical flow equation can be formulated as:

$$I(x, y, t) = I(x + v_x, y + v_y, t + dt) \tag{21}$$

I(x, y, t) specifies the intensity (i.e. the sample value) of a pixel at the coordinates of (x, y, t). Based on an assumption that the movement or displacement of the pixel is small and other assumptions such as higher order terms in a Taylor series expansion can be ignored, the optical flow equations can be written as:

$$\frac{\partial I}{\partial t} + v_x \frac{\partial I}{\partial x} + v_y \frac{\partial I}{\partial y} = 0, \tag{22}$$

where $$\frac{\partial I}{\partial x} \text{ and } \frac{\partial I}{\partial y}$$

are the horizontal and vertical spatial sample gradients at position (x,y) and $$\frac{\partial I}{\partial t}$$

is the partial temporal derivative at (x,y). In some examples, sample gradients can be obtained by:

$$\partial I(x, y, t)/\partial x = I(x+1, y, t) - I(x-1, y, t),$$

$$\partial I(x, y, t)/\partial y = I(x, y+1, t) - I(x, y-1, t).$$

Figure 7:
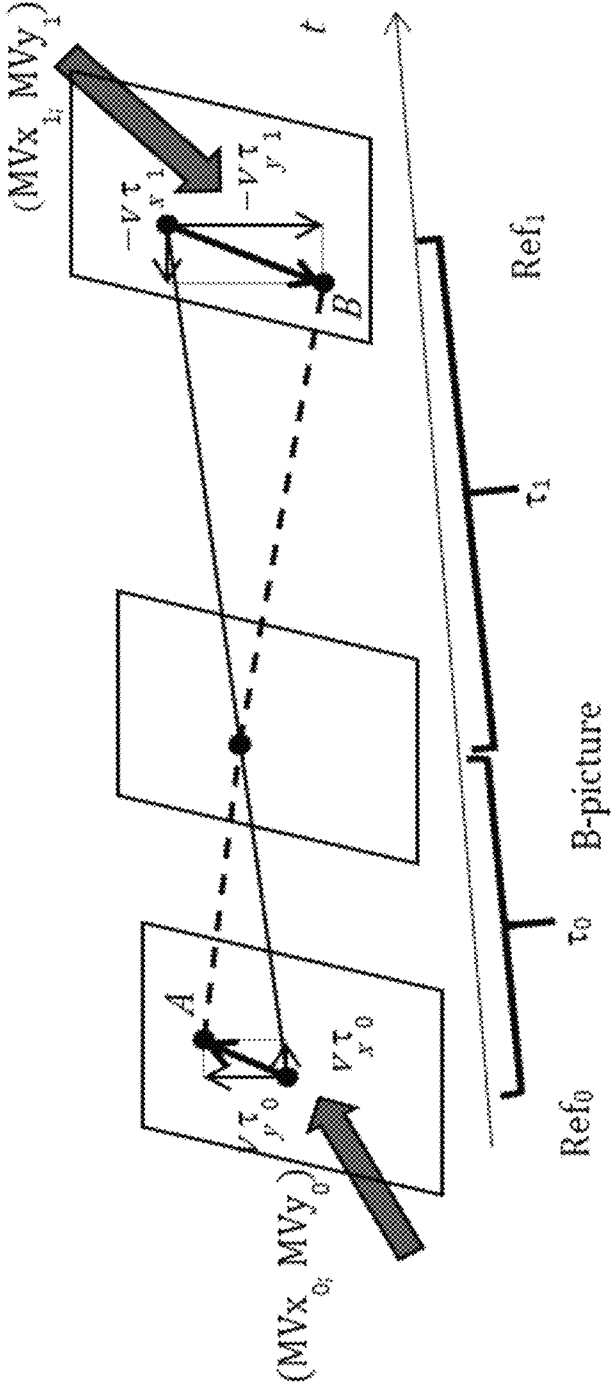
FIG. 7 is a diagram showing an example of Bi-predictive Optical Flow.

The optical flow refinement utilizes the principle shown in Eqn. (22) in order to improve the quality of bi-prediction. In some implementations, the optical flow refinement is performed by calculating sample gradients $$\frac{\partial I}{\partial x} \text{ and } \frac{\partial I}{\partial y},$$

calculating difference between first prediction and second prediction ($I^{(0)}-I^{(1)}$), and calculating displacement of pixels or group of pixels ($v_x$, $v_y$). The displacement is calculated so that the error Δ between samples in the two reference frames obtained using the optical flow equation is minimized. The error Δ is defined as:

$$\Delta = \left(I^{(0)} - I^{(1)}\right) + v_x\left(\tau_0 \frac{\partial I^{(0)}}{\partial x} + \tau_1 \frac{\partial I^{(1)}}{\partial x}\right) + v_y\left(\tau_0 \frac{\partial I^{(0)}}{\partial y} + \tau_1 \frac{\partial I^{(1)}}{\partial y}\right) \tag{23}$$

where $I^{(0)}$ represents a sample value in the first prediction (e.g., prediction samples in the first reference frame in L0), and $I^{(1)}$ is the sample value in second prediction (e.g., prediction samples in the second reference frame in L1) that corresponds to $I^{(0)}$. $v_x$ and $v_y$ are the displacements calculated in −x and −y direction, respectively. $\partial I^{(0)}/\partial x$ and $\partial I^{(0)}/\partial y$ are the sample gradients in the first reference frame in −x and −y directions, respectively. $\partial I^{(1)}/\partial x$ and $\partial I^{(1)}/\partial y$ are the sample gradients in the second reference frame in −x and −y directions, respectively. $\tau_1$ and $\tau_0$ denote the distances of the current frame to the first and second reference frames, respectively. FIG. 7 illustrates the relationship among the various variables involved in Eqn. (23).

To determine the displacement ($v_x$, $v_y$) in Eqn. (23), a patch of samples around a given position (x,y) are utilized to solving the minimization problem mentioned above. Some approaches minimize the sum of squared errors for different pixels in a patch of the reference frames. Other approaches minimize the sum of absolute error. After the displacement ($v_x$, $v_y$) are determined, the combined prediction at the given position (x,y) can be determined as:

$$pred_{BIO} = \frac{1}{2}\left(\left(I^{(0)} + I^{(1)} + \frac{v_x}{2}\left(\tau_1\frac{\partial I^{(1)}}{\partial x} - \tau_0\frac{\partial I^{(0)}}{\partial x}\right) + \frac{v_y}{2}\left(\tau_1\frac{\partial I^{(1)}}{\partial y} - \tau_0\frac{\partial I^{(0)}}{\partial y}\right)\right)\right) \tag{24}$$

where $pred_{BIO}$ is the modified prediction at position (x,y) which is the output of the optical flow refinement process.

From this equation, it can be determined that the offset determined based on the BDOF is, assuming $\tau_0$ and $\tau_1$ equal to 1.

$$BDOF_{offset} = v_x\left(\frac{\partial I^{(1)}}{\partial x} - \frac{\partial I^{(0)}}{\partial x}\right)/2 + v_y\left(\frac{\partial I^{(1)}}{\partial y} - \frac{\partial I^{(0)}}{\partial y}\right)/2.$$

In some embodiments, in order to simplify the complexity of estimating the displacement for each pixel, the displacement is estimated for a group of pixels. For example, the displacement can be estimated for a block of 4×4 pixels, such as 4×4 luma samples, instead of an individual pixel. In these examples, to compute the improved bi-prediction for a block of 4×4 luma samples, the displacements are estimated using sample values near the block of 4×4 luma samples, such as a block of 8×8 luma samples with the 4×4 block of samples at its center. A coding unit is partitioned into sub-blocks when the coding unit's width or height exceeds 16. At the boundary of a sub-block, sample gradients are computed using integer grid reference sample values without any 2-D separable motion compensated interpolation. After that, extended samples and sample gradients outside the sub-block positions are obtained by extending the closest sample and sample gradient values from the boundary of the sub-block.

The input of optical flow refinement process are the prediction samples from two reference pictures and the output of the optical flow refinement is combined prediction ($pred_{BIO}$) which is calculated according to optical flow equation.

In a currently adopted version of BDOF, the following equations are used to compute the optical flow ($v_x$, $v_y$) based on the horizontal and vertical sample gradients of a 6×6 block of samples centered on a current 4×4 block of samples.

$$s_1 = \sum_{i,j}\left(\frac{\partial I^{(0)}}{\partial x} + \frac{\partial I^{(1)}}{\partial x}\right) * \left(\frac{\partial I^{(0)}}{\partial x} + \frac{\partial I^{(1)}}{\partial x}\right) \tag{25}$$

$$s_2 = \sum_{i,j}\left(\frac{\partial I^{(0)}}{\partial y} + \frac{\partial I^{(1)}}{\partial y}\right) * \left(\frac{\partial I^{(0)}}{\partial y} + \frac{\partial I^{(1)}}{\partial y}\right) \tag{26}$$

$$s_3 = \sum_{i,j}\left(\frac{\partial I^{(0)}}{\partial x} + \frac{\partial I^{(1)}}{\partial x}\right) * \left(I^{(1)} - I^{(0)}\right) \tag{27}$$

$$s_4 = \sum_{i,j}\left(\frac{\partial I^{(0)}}{\partial y} + \frac{\partial I^{(1)}}{\partial y}\right) * \left(I^{(1)} - I^{(0)}\right) \tag{28}$$

$$s_5 = \sum_{i,j}\left(\frac{\partial I^{(0)}}{\partial x} + \frac{\partial I^{(1)}}{\partial x}\right) * \left(\frac{\partial I^{(0)}}{\partial y} + \frac{\partial I^{(1)}}{\partial y}\right) \tag{29}$$

$$v_x = -\frac{s_3}{s_1} \tag{30}$$

$$v_y = -\frac{\left(s_4 - (v_x/2) * s_5\right)}{s_2} \tag{31}$$

The optical flow displacement ($v_x$, $v_y$) is also referred to herein as "optical flow ($v_x$, $v_y$)." The division operation required to compute $v_x$ and $v_y$ is simplified at the expense of precision by right shifting the numerator with only the position of the most significant bit in the denominator. In certain other prior art, the division is replaced by an N-bit look-up table containing the reciprocals values with a variable shift representing the position of the most significant bit to improve the precision. However, the look-up table results in increased on-chip memory. An N-bit look-up table with an M-bit precision for the reciprocal requires N*M-bits of SRAM.

One example of motion vector refinement is explained in the 8.4.7.4 "Bidirectional optical flow prediction process" section of the document JVET-M1001, Versatile Video Coding (Draft 4).

As discussed above, an optical flow contains two components: $v_x$ in the horizontal direction and $v_y$ in the vertical direction. Compared with the method shown in Eqns. (25)-(31), the computation presented herein for the two components: $v_x$ in the horizontal direction and $v_y$ in the vertical direction eliminates multiplication operations and reduces bit-depth of the terms.

In particular, the optical flow can be estimated as follows:

$$s_1 = \sum_{i,j}\text{abs}\left(G_{x1}(i,j) + G_{x0}(i,j)\right) \tag{32}$$

$$s_2 = \sum_{i,j}\text{abs}\left(G_{y1}(i,j) + G_{y0}(i,j)\right) \tag{33}$$

$$s_3 = \sum_{i,j}\left(\text{sign}\left(G_{x1}(i,j) + G_{x0}(i,j)\right)\right) * \left(I^{(1)}(i,j) - I^{(0)}(i,j)\right) \tag{34}$$

$$s_4 = \sum_{i,j}\left(\text{sign}\left(G_{y1}(i,j) + G_{y0}(i,j)\right)\right) * \left(I^{(1)}(i,j) - I^{(0)}(i,j)\right) \tag{35}$$

$$s_5 = \sum_{ij}\left(\text{sign}\left(G_{y1}(i,j) + G_{y0}(i,j)\right)\right) * \left(G_{x1}(i,j) + G_{x0}(i,j)\right) \tag{36}$$

$$v_x = -\frac{s_3}{s_1} \tag{37}$$

$$v_y = -\frac{\left(s_4 - v_x * s_5/2\right)}{s_2} \tag{38}$$

where $$G_{x0}(i,j)=\frac{\partial I^{(0)}}{\partial x} \text{ and } G_{x1}(i,j)=\frac{\partial I^{(1)}}{\partial x}$$

are horizontal predicted sample gradients at the pixel (i, j) in the first and second reference frames, respectively, and $$G_{y0}(i,j)=\frac{\partial I^{(0)}}{\partial y} \text{ and } G_{y1}(i,j)=\frac{\partial I^{(1)}}{\partial y}$$

are vertical predicted sample gradients at the pixel (i,j) in the first and second reference frames, respectively. Here, i and j are integers and span over a set of sample positions centered on a current block of sample positions. In one embodiment, for a 4×4 block, a 6×6 block of sample positions centered on the 4×4 block are employed. In one example, the value of i varies from −1 to 4, and the value of j varies from −1 to 4.

It should be understood that during the calculation of the cross- and auto-correlation terms $s_1$-$s_5$ shown above, one or more terms can be shifted to adjust the precision and bit depth of the values.

It should be further noted that Eqns. (32)-(38) listed above are for illustration purpose only and should not be construed as limiting. Various terms in these equations can be pre-processed before being combined with other terms in these equations. For example, the term $(G_{y1}(i,j)+G_{y0}(i,j))$ or $G_{x1}(i,j)+G_{x0}(i,j)$ can be shifted, flipped by changing its sign or otherwise processed before being used as shown in the above equations to calculate $s_1$–$s_5$. Similarly, the term $(I^{(1)}-I^{(0)})$ can also be pre-processed before being combined with other terms in the above equations. Likewise, various values determined in the above equations can also be post-processed before being used to calculate the value for $v_x$ and $v_y$. For example, $s_k$ (k=1 to 5) determined above can be post processed by adding the lower bits of its value to the higher bits of its value to determine the final version of $s_k$. This final version may then be used as shown above to determine $v_x$ and $v_y$.

As can be seen from this implementation, a new quantity $s_5$ is determined to facility the calculation of second component of the optical flow, $v_y$ in this example. $s_5$ is determined based on the sum of the product of the sign of the sum of vertical predicted sample gradients across the two reference frames and the sum of horizontal predicted sample gradients across the two reference frames. The calculation of $s_5$ can be realized without multiplication operations. For example, the calculation can be performed by conditionally adding or subtracting the sum of horizontal predicted sample gradients at a given sample position based on the sign of the sum of the vertical predicted sample gradients at that sample position. Then the vertical component of optical flow, $v_y$, is modified based on $v_x$, $s_5$, and $s_2$. In some implementations, the division by $s_1$ or $s_2$ in Eqns. (37)-(38) can be simplified by applying a right shift equal to the position of the most significant bit position in $s_1$ and $s_2$ respectively. As a result, the calculation of the components $s_1$-$s_5$, especially $s_5$, for the optical flow as specified in Eqns. (32)-(44) has reduced bit-depth because the calculation is based on the sign operation. In particular, the bit-depth of $v_x$ is reduced because the calculation involves only absolute operation and sign operation, so that in the calculation of $v_y$, the bit-depth of the multiplier for $v_x \times s_5$ can be reduced. Thus the computational complexity of the calculation for $v_x$ and $v_y$ is significantly reduced.

As can be seen from the above, the BDOF thus requires much less computation, especially in terms of number of multiplications and the size of the multiplier. In some examples, BDOF is used to refine the bi-prediction signal of a CU at the 4×4 subblock level and is only applied to the luma component. The BDOF mode is based on the optical flow concept, which assumes that the motion of an object is smooth. For each 4×4 subblock, a motion refinement or motion offset $(v_x, v_y)$ is calculated by minimizing the difference between the L0 and L1 prediction samples. The motion refinement is then used to adjust the bi-predicted sample values in the 4×4 subblock.

Figure 6:
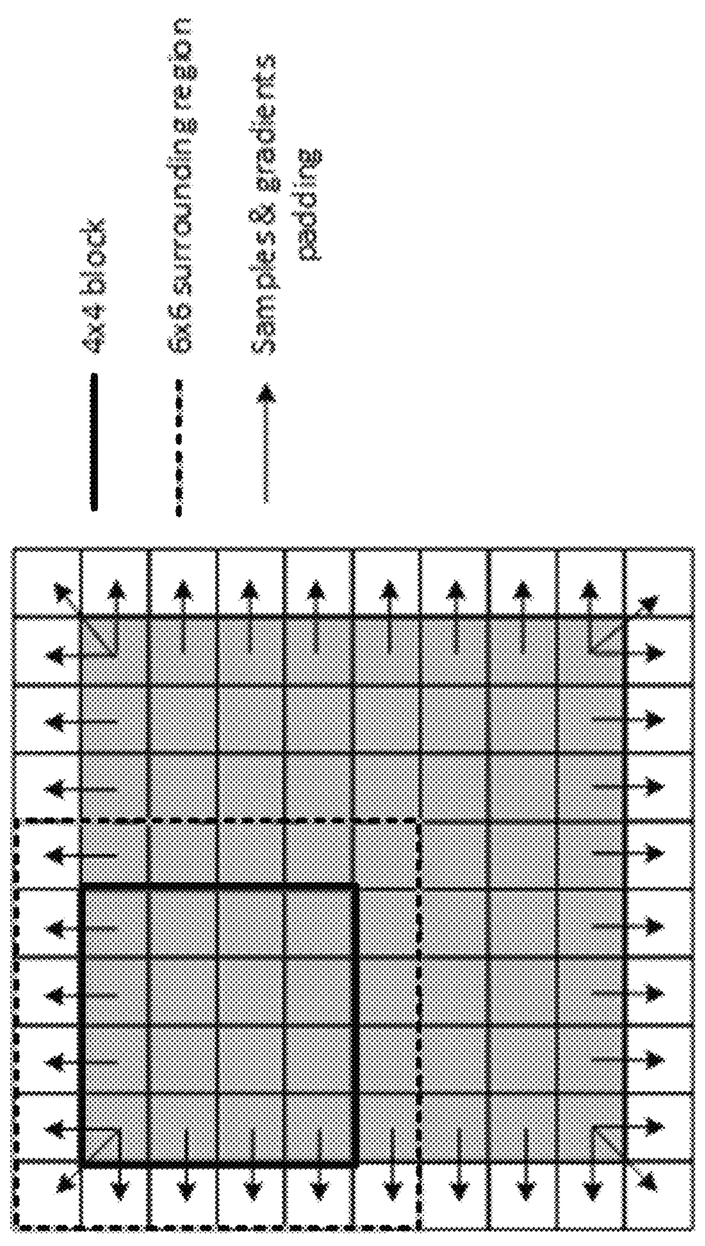
FIG. 6 is a diagram illustrating the relation between a 6×6 window for calculating the auto- and cross-correlation of gradients and a 4×4 subblock.

As discussed above, the horizontal and vertical gradients $$\frac{\partial I^{(k)}}{\partial x}(i,j) \text{ and } \frac{\partial I^{(k)}}{\partial y}(i,j),$$

k=0,1, can be calculated by calculating the difference between two neighboring samples in the corresponding reference frames. The samples may be shifted based on the luma bit depth before calculating the difference. The auto- and cross-correlation of the gradients, $s_1$, $s_2$, $s_3$, $s_4$ and $s_5$, are calculated for a 6×6 window around the 4×4 subblock. FIG. 6 shows the relation between the 6×6 window and the 4×4 subblock. As can be seen, in order to derive the gradient values used in $s_1$, $s_2$, $s_3$, $s_4$ and $s_5$, some prediction samples $I^{(k)}(i,j)$ in list k (k=0,1) outside of the current CU (gray positions) boundaries need to be generated. In the example shown in FIG. 6, the BDOF uses one extended row/column around the CU's boundaries. These extended sample values are used in gradient calculation only. For the remaining operations in the BDOF process, if any sample and gradient values outside of the CU boundaries are needed, they are padded (i.e. repeated) from their nearest neighbors.

The motion refinement $(v_x, v_y)$ is then derived using the cross- and auto-correlation terms using the following:

$$v_x = S_1 > 0?\ \text{clip3}\left(-th'_{BIO},\ th'_{BIO},\ -\left((S_3 \cdot 2^{n_b-n_a}) \gg \lfloor \log_2 S_1 \rfloor\right)\right):\ 0 \tag{3-28}$$

$$v_y = S_5 > 0?\ \text{clip3}\left(-th'_{BIO},\ th'_{BIO},\ -\left(\left(S_6 \cdot 2^{n_b-n_a} - \left((v_x S_{2,m}) \ll n_{S_2} + v_x S_{2,s}\right)/2\right) \gg \lfloor \log_2 S_5 \rfloor\right)\right):\ 0$$

where $$S_{2,m} = S_2 \gg n_{S_2},\ S_{2,s} = S_2\ \&\left(2^{n_{S_2}} - 1\right),\ th'_{BIO} = 2^{max(5,BD-7)}.$$

$\lfloor \cdot \rfloor$ is the floor function, and $n_{S_2}=12$.

Based on the motion refinement and the gradients, the following adjustment is calculated for each sample in the 4×4 subblock:

$$b(x,y) = rnd\left(\left(v_x\left(\frac{\partial I^{(1)}(x,y)}{\partial x} - \frac{\partial I^{(0)}(x,y)}{\partial x}\right) + v_y\left(\frac{\partial I^{(1)}(x,y)}{\partial y} - \frac{\partial I^{(0)}(x,y)}{\partial y}\right) + 1\right)/2\right) \tag{3-29}$$

Finally, the BDOF samples of the CU are calculated by adjusting the bi-prediction samples as follows:

$$pred_{BDOF}(x, y) = \left(I^{(0)}(x, y) + I^{(1)}(x, y) + b(x, y) + o_{offset}\right) \gg \text{shift} \quad (3\text{-}30)$$

Figure 8:
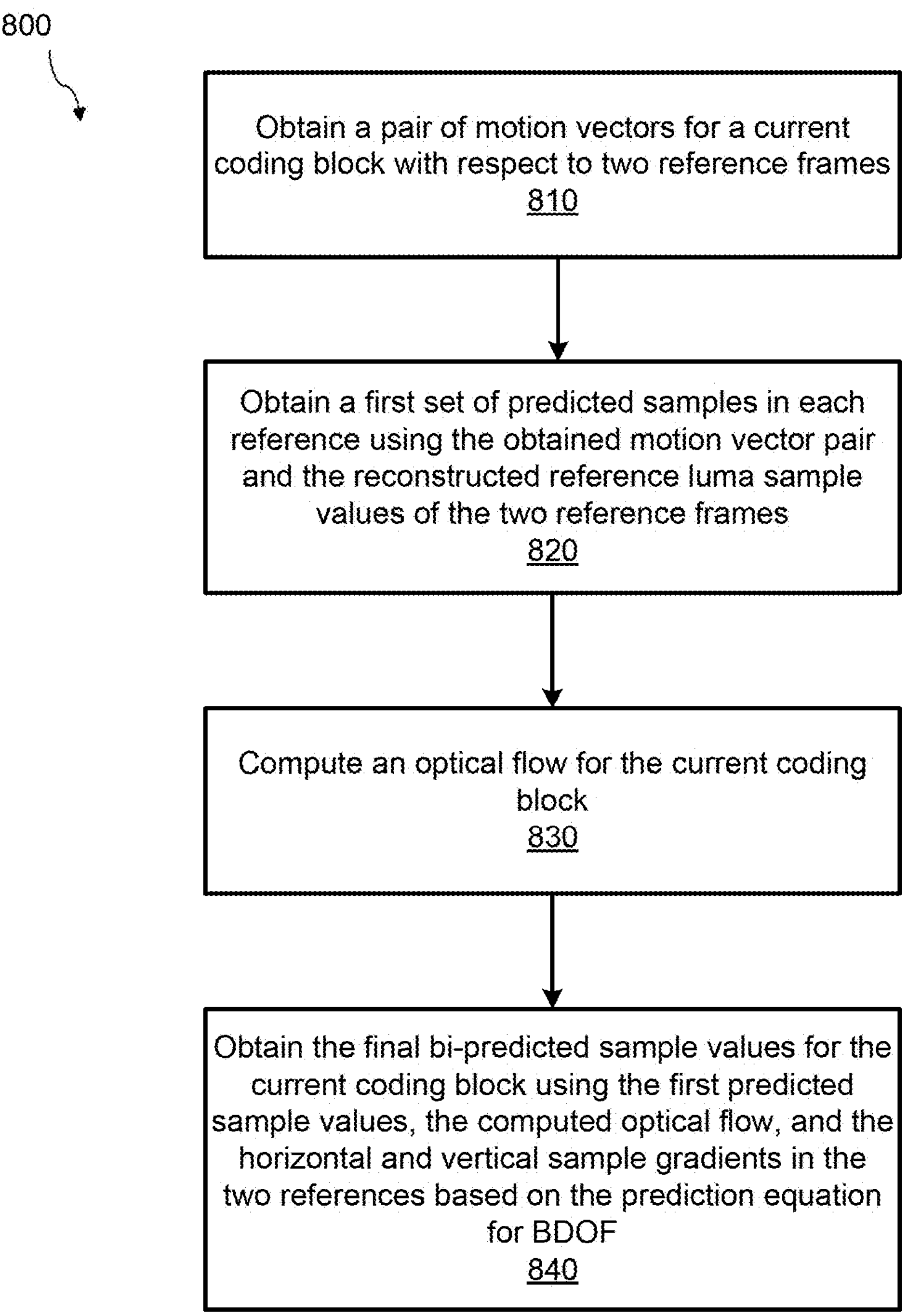
FIG. 8 is a flowchart illustrating an example of a process for inter prediction based on optical flow according to an embodiment.

FIG. 8 illustrates an example of a process 800 for performing bi-predictive optical flow refinement based on the optical flow calculation presented herein. One or more computing devices (e.g., the encoding apparatus 200 or the decoding apparatus 300) implement operations depicted in FIG. 8 by executing suitable program code.

Block 810 corresponds to the first operation described above. In this block, two motion vectors are obtained as input. The initial motion vectors can be determined based on an indication information in the bitstream. For example, an index might be signaled in the bitstream, the index indicates a position in a list of candidate motion vectors. In another example, a motion vector predictor index and motion vector difference value can be signaled in the bitstream. In another example, these motion vectors can be derived as a refinement motion vector using motion vector refinement starting from an initial pair of motion vectors that are indicated in the bitstream. In another example, reference frames indications can be obtained from the bitstream to indicate the reference frame with which a given motion vector in the obtained motion vector pair is associated. For instance, the indication can specify that a frame from a first reference frame list L0 is associated with the motion vector MV0 in the motion vector pair and a frame from a second reference frame list L1 is associated with the motion vector MV1 in the motion vector pair.

Block 820 corresponds to the second operation described above. In this block, a uni-directional prediction can be obtained in each of the two reference frames (i.e. reconstructed luma samples) according to the obtained motion vector pair and a K-tap interpolation filter. For example, the prediction obtains reconstructed reference sample values when the motion vector corresponds to an integer sample position. If the motion vector has a non-zero horizontal component, but a zero vertical component, it performs a horizontal K-tap interpolation to obtain the predicted sample values. If the motion vector has a non-zero vertical component, but a zero horizontal component, it performs a vertical K-tap interpolation to obtain the predicted sample values. If the motion vector has non-zero values for both the horizontal and vertical components, a 2-D separable K-tap interpolation is performed with the horizontal interpolation performed first followed by the vertical interpolation to obtain the predicted sample values. In this way, a first prediction is generated using MV0 in a reference frame from the first reference frame list L0 and a second prediction is generated using MV1 in a reference frame from the second reference frame list L1.

Block 830 corresponds to the third operation described above. In this block, an optical flow is estimated for each sub-block in a given current coding unit using the predictions obtained in the second operation in the reference frames. Consistent with notations discussed above, the prediction samples in the prediction obtained in the first reference frame is denoted as $I^{(0)}$ and the prediction samples in the prediction obtained in the second reference is denoted as $I^{(1)}$. The horizontal sample gradient at a position (i,j) can be computed by taking the difference between the predicted sample value to the right of this position and the sample value to the left of this position, i.e. $\partial I/\partial x = I(x+1, y) - I(x-1, y)$. The vertical sample gradient at a position (i,j) can be computed by taking the difference between the predicted sample value below this position and the sample value above this position, i.e. $\partial I/\partial y = I(x, y+1) - I(x, y-1)$. Note that for an image or a frame, the horizontal direction points from left to right, and the vertical direction points from top to bottom. In some examples, $\partial I^{(0)}/\partial x$, $\partial I^{(0)}/\partial y$ and $\partial I^{(1)}/\partial x$, $\partial I^{(1)}/\partial y$ are computed for a set of positions within the current coding sub-block. Based on the determined sample gradients, the optical flow can be determined using the method described above with respective Eqns. (31)-(40) or the iterative optical flow estimation method described above with respective Eqns. (38)-(46) or Eqns. (47)-(52).

Block 840 corresponds to the fourth operation described above. In this block, the final inter bi-predicted samples for the current coding block can be calculated according to Eqn. (24) which taking into account, the predicted sample values, the determined sample gradients, and the estimated optical flow.

Figure 9:
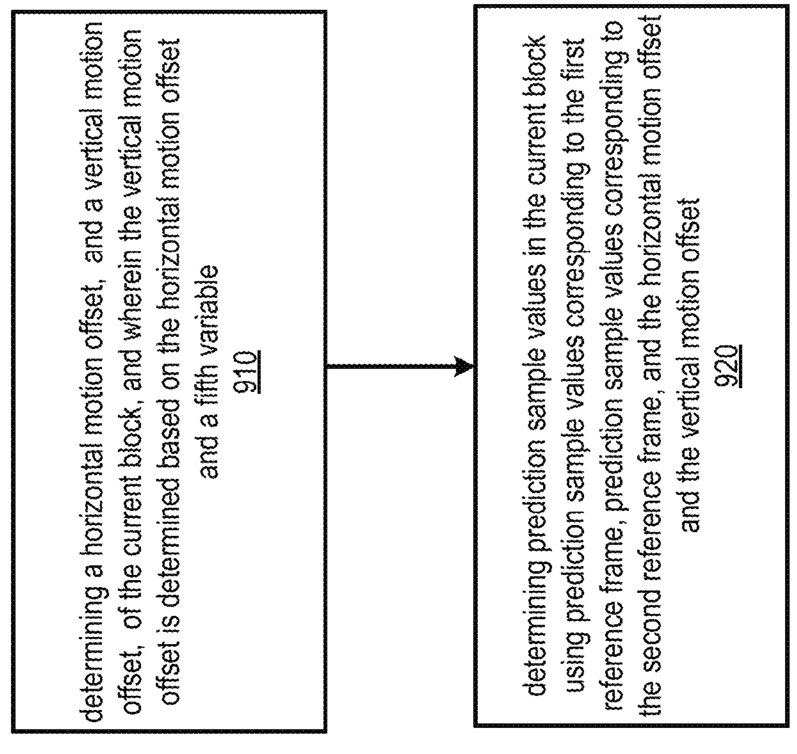
FIG. 9 is a flowchart illustrating an example of a method for bi-directional optical flow (BDOF) based inter prediction for a current block of a video signal.

FIG. 9 is a flowchart of an example method 900 for bi-directional optical flow (BDOF) based inter prediction for a current block of a video signal.

At operation 910, the method 900 involves determining a horizontal motion offset, $v_x$ and a vertical motion offset, $v_y$ of the current block, and wherein the vertical motion offset is determined based on the horizontal motion offset and a fifth variable $s_5$. The fifth variable $s_5$ indicates a sum of a plurality of terms. Each of the plurality of terms is obtained from a sign of an element of a second matrix and an element of a first matrix. The element of the first matrix corresponds to the element of the second matrix.

Each element of the first matrix is obtained from a sum of a first horizontal predicted sample gradient that corresponds to a first reference frame of the current block and a second horizontal predicted sample gradient that corresponds to a second reference frame of the current block. The first horizontal predicted sample gradient and the second horizontal predicted sample gradient correspond to the element of the first matrix. Each element of the second matrix is obtained from a sum of a first vertical predicted sample gradient that corresponds to the first reference frame of the current block and a second vertical predicted sample gradient that corresponds to the second reference frame of the current block. The first vertical predicted sample gradient and the second vertical predicted sample gradient correspond to the element of the second matrix.

At operation 920, the process 900 involves determining prediction sample values in the current block using prediction sample values corresponding to the first reference frame, prediction sample values corresponding to the second reference frame, and the horizontal motion offset and the vertical motion offset.

It is noted that the current block can be a block of any size, such as a 4×4 block. The current block can be a sub block of a frame of the video signal. Pixels of the current block can be referred to using absolute positions of the pixels with respect to the upper left corner of the frame, e.g., (x,y), or relative positions of the pixels with respect to the upper left corner of the block, e.g., (xBlock+i, yBlock+j). Here, (xBlock, yBlock) is the coordinate of the upper left corner of the block with respect to the upper left corner of the frame.

The first matrix and the second matrix can be any two-dimensional array that include rows and columns and an element of the array can be referred to using (i,j) where x is a horizontal/row index and y is a vertical/column index. The range of i and j can be, for example, i=xBlock−1, . . . , xBlock+4 and j=yBlock−1, . . . , yBlock+4. The first and second matrices correspond to, or are determined for the current block. In some examples, the size of the first matrix is the same as the size of the second matrix which can be larger than the size of the current block. For example, the size of the first matrix and the second matrix can be 6×6, whereas the current block has a size of 4×4.

An element of the first matrix (first element) corresponds to an element of the second matrix (second element) if the first element's position in the first matrix, (x,y) is the same as the second element's position in the second matrix, (p,q), i.e., (x,y)=(p,q). The first horizontal predicted sample gradient corresponds to a first reference frame of the current block means that the first horizontal predicted sample gradient is generated based on samples in the first reference frame of the current block. The second horizontal predicted sample gradient corresponds to the second reference frame of the current block means that the second horizontal predicted sample gradient is generated based on samples in the second reference frame of the current block. The first horizontal predicted sample gradient corresponds to the element of the first matrix means that the first horizontal predicted sample gradient is generated for the position (x,y) of the element in the first matrix. Likewise, the second horizontal predicted sample gradient corresponds to the element of the first matrix means that the second horizontal predicted sample gradient is generated for the position (x,y) of the element in the first matrix.

The first vertical predicted sample gradient corresponds to the first reference frame of the current block means that the first vertical predicted sample gradient is generated based on samples in the first reference frame of the current block. The second vertical predicted sample gradient corresponds to the second reference frame of the current block means that the second vertical predicted sample gradient is generated based on samples in the second reference frame of the current block. The first vertical predicted sample gradient corresponds to the element of the second matrix means that the first vertical predicted sample gradient is generated for the position (p,q) of the element in the second matrix. Likewise, the second vertical predicted sample gradient corresponds to the element of the second matrix means that the second vertical predicted sample gradient is generated for the position (p,q) of the element in the second matrix.

Each element of a matrix is obtained from a sum of two terms means that the element can be determined as the sum of two terms itself or as a value after processing the sum of two terms. The processing can include left shifting, right shifting, clipping, or a combination thereof. Similarly, a term is obtained from a sign of an element of a second matrix and an element of a first matrix means that the term can take the value of the element of the first matrix by itself or after the element of the first matrix being processed and apply the sign of the element of the second matrix. The processing of the element of the first matrix can include left shifting, right shifting, clipping, or a combination thereof. The sign of the element x can be determined as $$\text{Sign}(x) = \begin{cases} 1; & x > 0 \\ 0; & x == 0 \\ -1; & x < 0 \end{cases}$$

The technology presented herein adjusts the bi-predicted sample values of the current block based on the horizontal motion offset and the vertical motion offset. The vertical motion offset are calculated based on a fifth variable $s_5$ which only involves summation of terms obtained from a sign of an element of a second matrix and an element of a first matrix. Applying a sign of one element to another element does not involve multiplication operations. Likewise, summation also does not involve any multiplications. As a result, the BDOF based inter prediction technology presented herein eliminates the multiplication operations. Compared with the traditional approaches, the bit-depth of the fifth variable $s_5$ is reduced because multiplication operations are replaced with the sign determination. This leads to the reduction of the bit-depth of the horizontal motion offset, $v_x$ and the vertical motion offset, $v_y$ and also significant reduction in the computational complexity of the prediction and the size of the multiplier.

Figure 10:
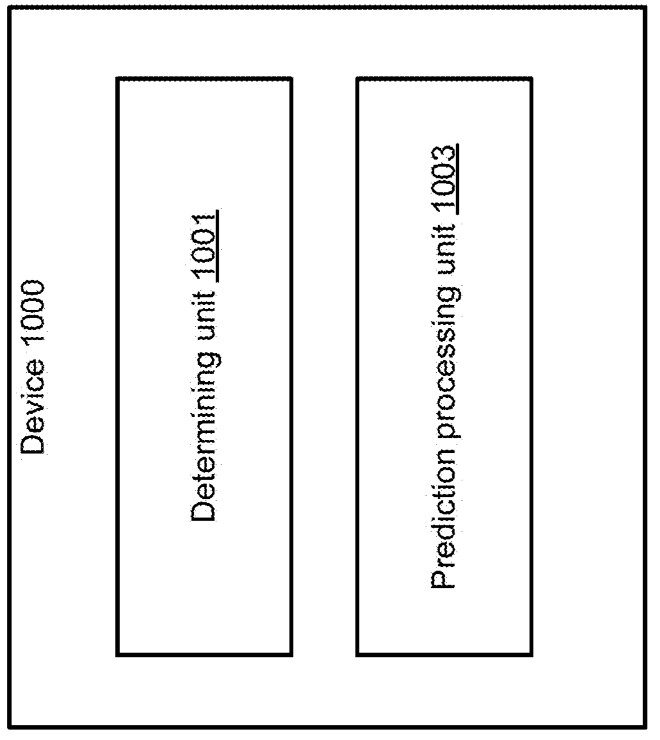
FIG. 10 is a block diagram showing an example structure of an apparatus for bi-directional optical flow (BDOF) based inter prediction for a current block of a video signal.

FIG. 10 illustrates a device 1000 for bi-directional optical flow (BDOF) based inter prediction for a current block of a video signal. The device 1000 includes:

- a determining unit 1001 configured to determine a horizontal motion offset, $v_x$ and a vertical motion offset, $v_y$ of the current block, and wherein the vertical motion offset is determined based on the horizontal motion offset and a fifth variable $s_5$. The fifth variable $s_5$ indicates a sum of a plurality of terms, wherein each of the plurality of terms is obtained from a sign of an element of a second matrix and an element of a first matrix, and the element of the first matrix corresponds to the element of the second matrix; and
- a prediction processing unit 1003 configured to predict prediction sample values in the current block using prediction sample values corresponding to the first reference frame, prediction sample values corresponding to the second reference frame, and the horizontal motion offset and the vertical motion offset.

The determining unit 1001 is further configured to obtain each element of the first matrix from a sum of a first horizontal predicted sample gradient that corresponds to a first reference frame of the current block and a second horizontal predicted sample gradient that corresponds to a second reference frame of the current block. The first horizontal predicted sample gradient and the second horizontal predicted sample gradient correspond to the element of the first matrix.

The determining unit 1001 is further configured to obtain each element of the second matrix from a sum of a first vertical predicted sample gradient that corresponds to the first reference frame of the current block and a second vertical predicted sample gradient that corresponds to the second reference frame of the current block. The first vertical predicted sample gradient and the second vertical predicted sample gradient correspond to the element of the second matrix.

Correspondingly, in an example, an example structure of the device 1000 may be corresponding to encoder 200 in FIG. 2. In another example, an example structure of the device 1000 may be corresponding to the decoder 300 in FIG. 3. In another example, an example structure of the device 1000 may be corresponding to inter prediction unit 244 in FIG. 2. In another example, an example structure of the device 1000 may be corresponding to the inter prediction unit 344 in FIG. 3.

The technology presented herein for calculating the optical flow and the bi-predicted samples improves the coding efficiency by computing a second component of the optical flow based on an independently computed first component of the optical flow. The computational complexity is kept low because the dependent computation also does not require any multiplication operations. The sum of the product of the sign of the sum of gradients in the second direction and the sum of gradients in the first direction can be realized without any multiplications by conditionally adding or subtracting the sum of gradients in the first direction based on the sign of the sum of gradients in the second direction. The technology presented herein also achieves a compression efficiency similar to those methods that use multiplication operations.

The present disclosure provides the following further aspects.

According to a first aspect, a method for inter prediction based on optical flow, comprises:

determining an optical flow for a current coding block, wherein a second component of the optical flow is determined or derived based on a first component of the optical flow (such as, $v_y$ is based on $v_x$ or $v_x$ is based on $v_y$ in bi-predictive optical flow based inter bi-prediction) by a first formulation; and obtaining or deriving prediction sample values (such as bi-predicted sample values) for the current sub-block using the determined optical flow for the current coding block.

In an embodiment, the operation of determining an optical flow for a current coding block, comprises:

computing an optical flow for a current coding block, wherein a second component of optical flow is computed using a computed first component of optical flow, sign and absolute value of a sum of corresponding predicted sample gradients (such as corresponding sample positions in the two predicted blocks) across two reference frames in a direction corresponding to the second component, and the sum of corresponding predicted sample gradients across the two reference frames in a direction corresponding to the first component.

In an embodiment, the operation of obtaining or deriving prediction sample values (such as bi-predicted sample values) for the current sub-block using the determined optical flow for the current coding block, comprises:

obtaining bi-predicted sample values for the current coding block using a set of predicted sample values, the computed optical flow, and horizontal and vertical sample gradients in two reference frames, wherein the set of predicted sample values is obtained in each of the two reference frames using a pair of motion vectors for the current coding block with respect to the two reference frames.

In an embodiment, the method further comprises:

computing an optical flow for a current coding block, wherein a second component of optical flow is computed using a computed first component of optical flow, sign and absolute value of a sum of corresponding predicted sample gradients across two reference frames in a direction corresponding to the second component, and the sum of corresponding predicted sample gradients across the two reference frames in a direction corresponding to the first component;

obtaining bi-predicted sample values for the current coding block using a set of predicted sample values, the computed optical flow, and horizontal and vertical sample gradients in the two reference frames, wherein the set of predicted sample values is obtained in each of the two reference frames using a pair of motion vectors for the current coding block with respect to the two reference frames.

According to a second aspect, a method for inter prediction based on optical flow comprises:

obtaining a pair of motion vectors for a current coding block with respect to two reference frames;

obtaining a set of predicted samples in each reference frame using the obtained motion vector pair and the reconstructed luma sample values of the two reference frames;

computing an optical flow for the current coding block using first predicted sample differences between the corresponding samples in the two reference frames, and the sum of corresponding horizontal sample gradients (sGx) and vertical sample gradients (sGy) in the two reference frames; wherein a second component of optical flow is computed using a computed first component of optical flow, sign and absolute value of sum of corresponding predicted sample gradients across the two references in the direction corresponding to the second component, and the sum of corresponding predicted sample gradients across the two references in the direction corresponding to the first component;

obtaining the bi-predicted sample values for the current coding block using the first predicted sample values, the computed optical flow, and the horizontal and vertical sample gradients in the two references based on the prediction equation for BDOF (Bi-Directional Optical Flow).

In an embodiment, the reconstructed reference luma sample values of the two reference frames comprise the reconstructed neighbouring luma sample values of the two reference frames.

In an embodiment, an optical flow is computed according to an optical flow equation, as follows:

$$\Delta = \left(I^{(0)} - I^{(1)}\right) + v_x\left(\tau_0\frac{\partial I^{(0)}}{\partial x} + \tau_1\frac{\partial I^{(1)}}{\partial x}\right) + v_y\left(\tau_0\frac{\partial I^{(0)}}{\partial y} + \tau_1\frac{\partial I^{(1)}}{\partial y}\right)$$

where $I^{(0)}$ corresponds to sample value in a first prediction, $I^{(1)}$ is the sample value in a second prediction, $v_x$ and $v_y$ are the displacements calculated in −x and −y direction, and $\partial I^{(0)}/\partial x$ and $\partial I^{(0)}/\partial y$ are the gradients in −x and −y directions, $\tau_1$ and $\tau_0$ denote the distances to the reference pictures, where the first prediction and second prediction are obtained.

In an embodiment, the method is used for bidirectional prediction; correspondingly, the pair of motion vectors includes a first motion vector which corresponds to a first reference frame list and a second motion vector which corresponds to a second reference frame list;

the obtained set of predicted samples comprises a first set of predicted samples obtained according to the first motion vector and a second set of predicted samples obtained according to the second motion vector;

the horizontal and vertical sample gradients comprise a first set of horizontal and vertical sample gradients computed using the first set of predicted samples, and a second set of horizontal and vertical sample gradients computed using the second set of predicted samples;

a motion offset is obtained based on the first and second set of horizontal and vertical gradients, and the first and second set of predicted samples; and the prediction sample values for the current sub-block is obtained using the motion offset.

In an embodiment, a second component of the optical flow (such as vy) is determined or derived based on a first component (such as vx) of the optical flow and one or more of a first value, a second value, a third value, a fourth value and a fifth value; the first component (such as vx) of the optical flow is determined or derived based on one or more of the first value, the second value, the third value, the fourth value and the fifth value.

In an embodiment, vy is based on vx in bi-predictive optical flow based inter bi-prediction, as follows:

$$v_x = -\frac{s_3}{s_1}$$

$$v_y = -\frac{(s_4 - v_x * s_5/2)}{s_2}$$

In an embodiment, $$s_1 = \sum_{i,j} \text{abs}(Gx1 + Gx0)$$

$$s_2 = \sum_{i,j} \text{abs}(Gy1 + Gy0)$$

$$s_3 = \sum_{i,j} f(Gx1 + Gx0) * (I^{(1)} - I^{(0)})$$

$$s_4 = \sum_{i,j} \text{sign}(Gy1 + Gy0) * (I^{(1)} - I^{(0)})$$

$$s_5 = \sum_{i,j} \text{sign}(Gy1 + Gy0) * (Gx1 + Gx0)$$

According to a fourth aspect, an encoder (20) comprises processing circuitry for carrying out the method according to any one of the first and second aspects.

According to a fifth aspect, a decoder (30) comprises processing circuitry for carrying out the method according to any one of the first and second aspects.

According to a sixth aspect, a computer program product comprises a program code for performing the method according to any one of the first and second aspects.

According to a seventh aspect, a non-transitory computer-readable medium carrying a program code which, when executed by a computer device, causes the computer device to perform the method of any one of the first and second aspects.

According to an eighth aspect, a decoder comprises: one or more processors; and a non-transitory computer-readable storage medium coupled to the processors and storing programming for execution by the processors, wherein the programming, when executed by the processors, configures the decoder to carry out the method according to any one of the first and second aspects.

According to a ninth aspect, an encoder, comprises:

one or more processors; and a non-transitory computer-readable storage medium coupled to the processors and storing programming for execution by the processors, wherein the programming, when executed by the processors, configures the encoder to carry out the method according to any one of the first and second aspects.

According to a tenth aspect, an apparatus for inter prediction based on optical flow, comprising:

a determining unit, configured for determining an optical flow for a current coding block, wherein a second component of the optical flow is determined or derived based on a first component of the optical flow (such as, in bi-predictive optical flow based inter bi-prediction); and an obtaining unit, configured for obtaining or deriving prediction sample values (such as bi-predicted sample values) for the current sub-block using the determined optical flow for the current coding block.

Following is an explanation of the applications of the encoding method as well as the decoding method as shown in the above-mentioned embodiments, and a system using them.

Figure 11:
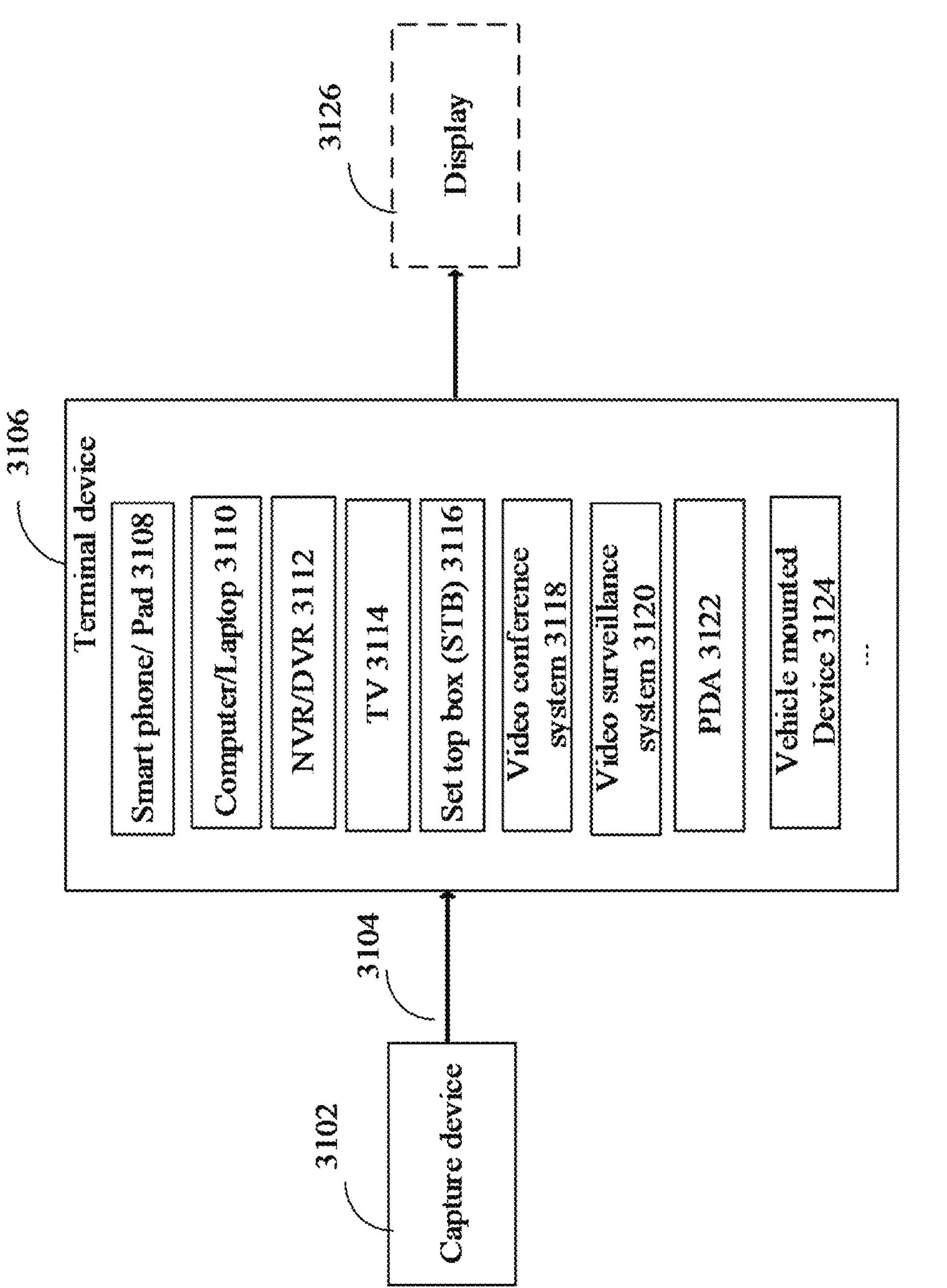
FIG. 11 is a block diagram showing an example structure of a content supply system which provides a content delivery service.

FIG. 11 is a block diagram showing a content supply system 3100 for realizing content distribution service. This content supply system 3100 includes capture device 3102, terminal device 3106, and optionally includes display 3126. The capture device 3102 communicates with the terminal device 3106 over communication link 3104. The communication link may include the communication channel 13 described above. The communication link 3104 includes but not limited to WIFI, Ethernet, Cable, wireless (3G/4G/5G), USB, or any kind of combination thereof, or the like.

The capture device 3102 generates data, and may encode the data by the encoding method as shown in the above embodiments. Alternatively, the capture device 3102 may distribute the data to a streaming server (not shown in the Figures), and the server encodes the data and transmits the encoded data to the terminal device 3106. The capture device 3102 includes but not limited to camera, smart phone or Pad, computer or laptop, video conference system, PDA, vehicle mounted device, or a combination of any of them, or the like. For example, the capture device 3102 may include the source device 12 as described above. When the data includes video, the video encoder 20 included in the capture device 3102 may actually perform video encoding processing. When the data includes audio (i.e., voice), an audio encoder included in the capture device 3102 may actually perform audio encoding processing. For some practical scenarios, the capture device 3102 distributes the encoded video and audio data by multiplexing them together. For other practical scenarios, for example in the video conference system, the encoded audio data and the encoded video data are not multiplexed. Capture device 3102 distributes the encoded audio data and the encoded video data to the terminal device 3106 separately.

In the content supply system 3100, the terminal device 310 receives and reproduces the encoded data. The terminal device 3106 could be a device with data receiving and recovering capability, such as smart phone or Pad 3108, computer or laptop 3110, network video recorder (NVR)/ digital video recorder (DVR) 3112, TV 3114, set top box (STB) 3116, video conference system 3118, video surveillance system 3120, personal digital assistant (PDA) 3122, vehicle mounted device 3124, or a combination of any of them, or the like capable of decoding the above-mentioned encoded data. For example, the terminal device 3106 may include the destination device 14 as described above. When the encoded data includes video, the video decoder 30 included in the terminal device is prioritized to perform video decoding. When the encoded data includes audio, an audio decoder included in the terminal device is prioritized to perform audio decoding processing.

For a terminal device with its display, for example, smart phone or Pad 3108, computer or laptop 3110, network video recorder (NVR)/digital video recorder (DVR) 3112, TV 3114, personal digital assistant (PDA) 3122, or vehicle mounted device 3124, the terminal device can feed the decoded data to its display. For a terminal device equipped with no display, for example, STB 3116, video conference system 3118, or video surveillance system 3120, an external display 3126 is contacted therein to receive and show the decoded data.

When each device in this system performs encoding or decoding, the picture encoding device or the picture decoding device, as shown in the above-mentioned embodiments, can be used.

Figure 12:
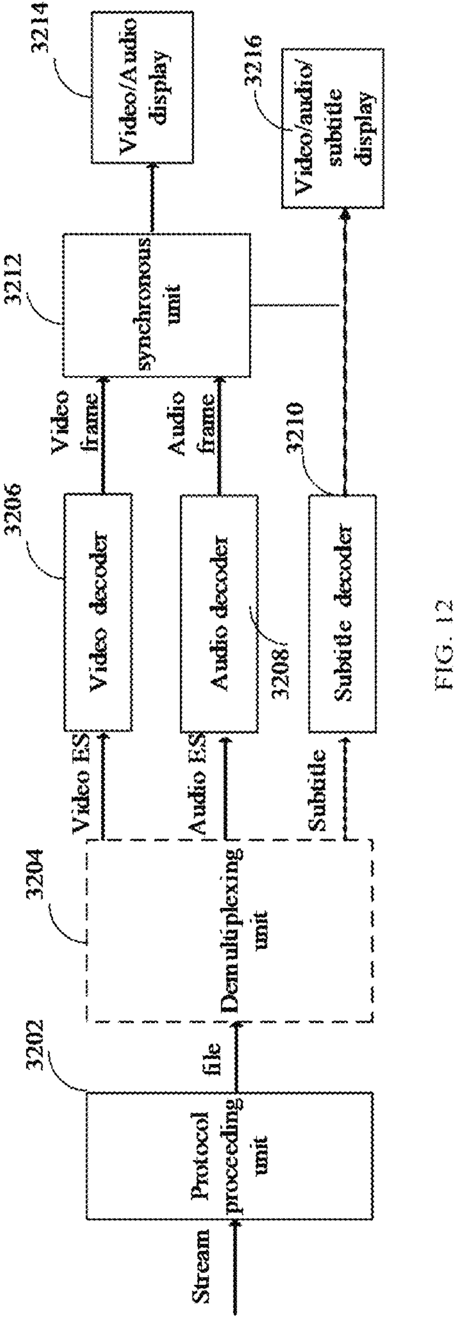
FIG. 12 is a block diagram showing a structure of an example of a terminal device.

FIG. 12 is a diagram showing a structure of an example of the terminal device 3106. After the terminal device 3106 receives stream from the capture device 3102, the protocol proceeding unit 3202 analyzes the transmission protocol of the stream. The protocol includes but not limited to Real Time Streaming Protocol (RTSP), Hyper Text Transfer Protocol (HTTP), HTTP Live streaming protocol (HLS), MPEG-DASH, Real-time Transport protocol (RTP), Real Time Messaging Protocol (RTMP), or any kind of combination thereof, or the like.

After the protocol proceeding unit 3202 processes the stream, stream file is generated. The file is outputted to a demultiplexing unit 3204. The demultiplexing unit 3204 can separate the multiplexed data into the encoded audio data and the encoded video data. As described above, for some practical scenarios, for example in the video conference system, the encoded audio data and the encoded video data are not multiplexed. In this situation, the encoded data is transmitted to video decoder 3206 and audio decoder 3208 without through the demultiplexing unit 3204.

Via the demultiplexing processing, video elementary stream (ES), audio ES, and optionally subtitle are generated. The video decoder 3206, which includes the video decoder 30 as explained in the above mentioned embodiments, decodes the video ES by the decoding method as shown in the above-mentioned embodiments to generate video frame, and feeds this data to the synchronous unit 3212. The audio decoder 3208, decodes the audio ES to generate audio frame, and feeds this data to the synchronous unit 3212. Alternatively, the video frame may store in a buffer (not shown in FIG. Y) before feeding it to the synchronous unit 3212. Similarly, the audio frame may store in a buffer (not shown in FIG. Y) before feeding it to the synchronous unit 3212.

The synchronous unit 3212 synchronizes the video frame and the audio frame, and supplies the video/audio to a video/audio display 3214. For example, the synchronous unit 3212 synchronizes the presentation of the video and audio information. Information may code in the syntax using time stamps concerning the presentation of coded audio and visual data and time stamps concerning the delivery of the data stream itself.

If subtitle is included in the stream, the subtitle decoder 3210 decodes the subtitle, and synchronizes it with the video frame and the audio frame, and supplies the video/audio/subtitle to a video/audio/subtitle display 3216.

The present disclosure is not limited to the above-mentioned system, and either the picture encoding device or the picture decoding device in the above-mentioned embodiments can be incorporated into other system, for example, a car system.

Mathematical Operators

The mathematical operators used in this application are similar to those used in the C programming language. However, the results of integer division and arithmetic shift operations are defined more precisely, and additional operations are defined, such as exponentiation and real-valued division. Numbering and counting conventions generally begin from 0, e.g., "the first" is equivalent to the 0-th, "the second" is equivalent to the 1-th, etc.

Arithmetic Operators

The following arithmetic operators are defined as follows:

+ Addition

− Subtraction (as a two-argument operator) or negation (as a unary prefix operator)

* Multiplication, including matrix multiplication $x^y$ Exponentiation. Specifies x to the power of y. In other contexts, such notation is used for superscripting not intended for interpretation as exponentiation.

/ Integer division with truncation of the result toward zero. For example, 7/4 and −7/−4 are truncated to 1 and −7/4 and 7/−4 are truncated to −1.

÷ Used to denote division in mathematical equations where no truncation or rounding is intended.

$$\frac{x}{y}$$

Used to denote division in mathematical equations where no truncation or rounding is intended.

$$\sum_{i=x}^{y} f(i)$$

The summation of f(i) with i taking all integer values from x up to and including y.

x % y Modulus. Remainder of x divided by y, defined only for integers x and y with x>=0 and y>0.

Logical Operators

The following logical operators are defined as follows:

x && y Boolean logical "and" of x and y x||y Boolean logical "or" of x and y

! Boolean logical "not"

x?y:z If x is TRUE or not equal to 0, evaluates to the value of y; otherwise, evaluates to the value of z.

Relational Operators

The following relational operators are defined as follows:

> Greater than

>= Greater than or equal to

< Less than

<= Less than or equal to

== Equal to

!= Not equal to

When a relational operator is applied to a syntax element or variable that has been assigned the value "na" (not applicable), the value "na" is treated as a distinct value for the syntax element or variable. The value "na" is considered not to be equal to any other value.

Bit-Wise Operators

The following bit-wise operators are defined as follows:

& Bit-wise "and". When operating on integer arguments, operates on a two's complement representation of the integer value. When operating on a binary argument that contains fewer bits than another argument, the shorter argument is extended by adding more significant bits equal to 0.

| Bit-wise "or". When operating on integer arguments, operates on a two's complement representation of the integer value. When operating on a binary argument that contains fewer bits than another argument, the shorter argument is extended by adding more significant bits equal to 0.

^ Bit-wise "exclusive or". When operating on integer arguments, operates on a two's complement representation of the integer value. When operating on a binary argument that contains fewer bits than another argument, the shorter argument is extended by adding more significant bits equal to 0.

x>>y Arithmetic right shift of a two's complement integer representation of x by y binary digits. This function is defined only for non-negative integer values of y. Bits shifted into the most significant bits (MSBs) as a result of the right shift have a value equal to the MSB of x prior to the shift operation.

x<<y Arithmetic left shift of a two's complement integer representation of x by y binary digits. This function is defined only for non-negative integer values of y. Bits shifted into the least significant bits (LSBs) as a result of the left shift have a value equal to 0.

Assignment Operators

The following arithmetic operators are defined as follows:

= Assignment operator

++ Increment, i.e., x++ is equivalent to x=x+1; when used in an array index, evaluates to the value of the variable prior to the increment operation.

— Decrement, i.e., x— is equivalent to x=x−1; when used in an array index, evaluates to the value of the variable prior to the decrement operation.

+= Increment by amount specified, i.e., x+=3 is equivalent to x=x+3, and x+=(−3) is equivalent to x=x+(−3).

−=Decrement by amount specified, i.e., x−=3 is equivalent to x=x−3, and x−=(−3) is equivalent to x=x−(−3).

Range Notation

The following notation is used to specify a range of values:

x=y . . . z x takes on integer values starting from y to z, inclusive, with x, y, and z being integer numbers and z being greater than y.

Mathematical Functions

The following mathematical functions are defined:

$$\mathrm{Abs}(x) = \begin{cases} x; & x >= 0 \\ -x; & x < 0 \end{cases}$$

A sin(x) the trigonometric inverse sine function, operating on an argument x that is in the range of −1.0 to 1.0, inclusive, with an output value in the range of −π÷2 to π÷2, inclusive, in units of radians A tan(x) the trigonometric inverse tangent function, operating on an argument x, with an output value in the range of −π÷2 to π÷2, inclusive, in units of radians $$Atan2(y, x) = \begin{cases} Atan\left(\frac{y}{x}\right); & x > 0 \\ Atan\left(\frac{y}{x}\right) + \pi; & x < 0 \ \&\& \ y >= 0 \\ Atan\left(\frac{y}{x}\right) - \pi; & x < 0 \ \&\& \ y < 0 \\ +\frac{\pi}{2}; & x == 0 \ \&\& \ y >= 0 \\ -\frac{\pi}{2}; & \text{otherwise} \end{cases}$$

Ceil(x) the smallest integer greater than or equal to x.

$$\mathrm{Clip1}_Y(x) = \mathrm{Clip3}(0, (1 \ll BitDepth_Y) - 1, x)$$

$$\mathrm{Clip}_C(x) = \mathrm{Clip3}(0, (1 \ll BitDepth_C) - 1, x)$$

$$\mathrm{Clip3}(x, y, z) = \begin{cases} x; & z < x \\ y; & z > y \\ z; & \text{otherwise} \end{cases}$$

Cos(x) the trigonometric cosine function operating on an argument x in units of radians.

Floor(x) the largest integer less than or equal to x.

$$GetCurrMsb(a, b, c, d) = \begin{cases} c + d; & b - a >= d/2 \\ c - d; & a - b > d/2 \\ c; & \text{otherwise} \end{cases}$$

Ln(x) the natural logarithm of x (the base-e logarithm, where e is the natural logarithm base constant 2.718 281 828 . . . ).

Log 2(x) the base-2 logarithm of x.

Log 10(x) the base-10 logarithm of x.

$$\mathrm{Min}(x, y) = \begin{cases} x; & x <= y \\ y; & x > y \end{cases}$$

$$\mathrm{Max}(x, y) = \begin{cases} x; & x >= y \\ y; & x < y \end{cases}$$

$$\mathrm{Round}(x) = \mathrm{Sign}(x) * \mathrm{Floor}(\mathrm{Abs}(x) + 0.5)$$

$$\mathrm{Sign}(x) = \begin{cases} 1; & x > 0 \\ 0; & x == 0 \\ -1; & x < 0 \end{cases}$$

Sin(x) the trigonometric sine function operating on an argument x in units of radians $$Sqrt(x) = \sqrt{x}$$

$$\mathrm{Swap}(x, y) = (y, x)$$

Tan(x) the trigonometric tangent function operating on an argument x in units of radians The disclosure has been described in conjunction with various embodiments herein. However, other variations to the disclosed embodiments can be understood and effected by those skilled in the art in practicing the claimed disclosure, from a study of the drawings, the disclosure and the appended claims. In the claims, the word "comprising" does not exclude other elements or operations and the indefinite article "a" or "an" does not exclude a plurality. A single processor or other unit may fulfill the functions of several items recited in the claims. The mere fact that certain measures are recited in usually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the internet or other wired or wireless communication systems.

The person skilled in the art will understand that the "blocks" ("units") of the various figures (method and apparatus) represent or describe functionalities of embodiments of the disclosure (rather than necessarily individual "units" in hardware or software) and thus describe equally functions or features of apparatus embodiments as well as method embodiments (unit=operation).

The terminology of "units" is merely used for illustrative purposes of the functionality of embodiments of the encoder/decoder and are not intended to limiting the disclosure.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit.

Embodiments of the disclosure may further comprise an apparatus, e.g. encoder and/or decoder, which comprises a processing circuitry configured to perform any of the methods and/or processes described herein.

Although embodiments of the disclosure have been primarily described based on video coding, it should be noted that embodiments of the coding system 10, encoder 20 and decoder 30 (and correspondingly the system 10) and the other embodiments described herein may also be configured for still picture processing or coding, i.e. the processing or coding of an individual picture independent of any preceding or consecutive picture as in video coding. In general, only inter-prediction units 244 (encoder) and 344 (decoder) may not be available in case the picture processing coding is limited to a single picture 17. All other functionalities (also referred to as tools or technologies) of the video encoder 20 and video decoder 30 may equally be used for still picture processing, e.g. residual calculation 204/304, transform 206, quantization 208, inverse quantization 210/310, (inverse) transform 212/312, partitioning 262/362, intra-prediction 254/354, and/or loop filtering 220, 320, and entropy coding 270 and entropy decoding 304.

Embodiments, e.g. of the encoder 20 and the decoder 30, and functions described herein, e.g. with reference to the encoder 20 and the decoder 30, may be implemented in hardware, software, firmware, or any combination thereof. If implemented in software, the functions may be stored on a computer-readable medium or transmitted over communication media as one or more instructions or code and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limiting, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

The invention claimed is:

1. A method of encoding implemented by an encoding device, comprising:

performing bi-directional optical flow (BDOF) based inter prediction for a current block of a video signal, by:

obtaining a pair of motion vectors for the current block with respect to a first reference frame and a second reference frame;

obtaining prediction sample values corresponding to the first reference frame and prediction sample values corresponding to the second reference frame from the first reference frame and the second reference frame, respectively, using the pair of motion vectors for the current block with respect to the first reference frame and the second reference frame;

determining a horizontal motion offset $v_x$ and a vertical motion offset $v_y$ of the current block, and wherein the vertical motion offset is determined based on the horizontal motion offset and a fifth variable $s_5$, wherein:

the fifth variable $s_5$ indicates a sum of a plurality of first terms, wherein each of the plurality of first terms is obtained from a sign of an element of a second matrix and an element of a first matrix, and the element of the first matrix corresponds to the element of the second matrix;

each element of the first matrix is obtained from a sum of a first horizontal predicted sample gradient that corresponds to a first reference frame of the current block and a second horizontal predicted sample gradient that corresponds to a second reference frame of the current block, wherein the first horizontal predicted sample gradient and the second horizontal predicted sample gradient correspond to the element of the first matrix; and each element of the second matrix is obtained from a sum of a first vertical predicted sample gradient that corresponds to the first reference frame of the current block and a second vertical predicted sample gradient that corresponds to the second reference frame of the current block, wherein the first vertical predicted sample gradient and the second vertical predicted sample gradient correspond to the element of the second matrix; and determining prediction sample values of the current block using the prediction sample values corresponding to the first reference frame, the prediction sample values corresponding to the second reference frame, and the horizontal motion offset and the vertical motion offset;

obtaining residual information of the current block based on sample values of the current block and the prediction sample values of the current block; and encoding information associated with the current block into a bitstream for transmission, wherein the information associated with the current block comprises the residual information of the current block and indication information, and wherein the indication information indicates the pair of motion vectors for the current block.

2. The method of claim 1, wherein the vertical motion offset is derived based on the horizontal motion offset, a second variable $s_2$, a fourth variable $s_4$ and the fifth variable $s_5$, wherein:

the second variable $s_2$ indicates a sum of absolute values of elements of the second matrix; and the fourth variable $s_4$ indicates a sum of a plurality of second terms, wherein each of the plurality of second terms is obtained from a sign of an element of the second matrix and an element of a third matrix, and the element of the third matrix corresponds to the element of the second matrix, and each element of the third matrix is a difference which is obtained from a first predicted sample of the first reference frame that corresponds to the element of the third matrix and a second predicted sample of the second reference frame that corresponds to the element of the third matrix.

3. The method of claim 2, wherein the horizontal motion offset is derived based on a first variable $s_1$ and a third variable $s_3$, the first variable $s_1$ indicates a sum of absolute values of elements of the first matrix; and the third variable $s_3$ indicates a sum of a plurality of third terms, wherein each of the plurality of third terms is obtained from a sign of an element of the first matrix and an element of the third matrix, and the element of the third matrix corresponds to the element of the first matrix.

4. The method of claim 3, wherein the horizontal motion offset is determined according to $$v_x = -\frac{s_3}{s_1}$$

wherein:

$v_x$ represents the horizontal motion offset.

5. The method of claim 2, wherein the vertical motion offset $v_y$ is determined according to $$v_y = -\frac{(s_4 - v_x * s_5/2)}{s_2},$$

wherein:

$v_x$ represents the horizontal motion offset; and $v_y$ represents the vertical motion offset.

6. The method of claim 4, wherein $s_1$, $s_2$, $s_3$, $s_4$ and $s_5$ are determined as:

$$s_1 = \sum_{i,j} \text{abs}(G_{x1} + G_{x0});$$

$$s_2 = \sum_{i,j} \text{abs}(G_{y1} + G_{y0}),$$

$$s_3 = \sum_{i,j} \text{sign}(G_{x1} + G_{x0}) * (I^{(1)} - I^{(0)}).$$

$$s_4 = \sum_{i,j} \text{sign}(G_{y1} + G_{y0}) * (I^{(1)} - I^{(0)}),$$

-continued $$s_5 = \sum_{i,j} \text{sign}(G_{y1} + G_{y0}) * (G_{x1} + G_{x0});$$

and wherein:

$I^{(0)}$ is obtained from the prediction sample values that correspond to the first reference frame, and $I^{(1)}$ is obtained from the prediction sample values that correspond to the second reference frame;

$G_{x0}$ and $G_{x1}$ indicate the first horizontal predicted sample gradient and the second horizontal predicted sample gradient that correspond to the first reference frame and the second reference frame, respectively;

$G_{y0}$ and $G_{y1}$ indicate the first vertical predicted sample gradient and the second vertical predicted sample gradient that correspond to the first reference frame and the second reference frame, respectively; and i and j are integer numbers, wherein a value of i varies from −1 to 4, and a value of j varies from −1 to 4.

7. The method of claim 6, wherein the Gro is determined as a difference obtained from two predicted samples that correspond to the first reference frame along a horizontal direction, and the $G_{y0}$ is determined as a difference obtained from two predicted samples that correspond to the first reference frame along a vertical direction.

8. The method of claim 6, wherein the $G_{x1}$ is determined as a difference obtained from two predicted samples that correspond to the second reference frame along a horizontal direction, and the $G_{y1}$ is determined as a difference obtained from two predicted samples that correspond to the second reference frame along a vertical direction.

9. The method of claim 1, wherein reference frames indications are also encoded into the bitstream, and the reference frames indications indicate that the first reference frame from a first reference frame list L0 is associated with a motion vector MV0 in the pair of motion vectors and the second reference frame from a second reference frame list L1 is associated with a motion vector MV1 in the pair of motion vectors.

10. The method of claim 1, wherein the prediction sample values for the current block are bi-predicted sample values based on bi-directional optical flow (BDOF) prediction.

11. An encoding apparatus, comprising:

one or more memories configured to store programming instructions; and at least one processor coupled to the one or more memories and configured to execute the instructions to cause the encoding apparatus to:

perform bi-directional optical flow (BDOF) based inter prediction for a current block of a video signal, by:

obtaining a pair of motion vectors for the current block with respect to a first reference frame and a second reference frame;

obtaining prediction sample values corresponding to the first reference frame and prediction sample values corresponding to the second reference frame from the first reference frame and the second reference frame, respectively, using the pair of motion vectors for the current block with respect to the first reference frame and the second reference frame;

determining a horizontal motion offset $v_x$ and a vertical motion offset $v_y$ of the current block, and wherein the vertical motion offset is determined based on the horizontal motion offset and a fifth variable $s_5$, wherein:

the fifth variable $s_5$ indicates a sum of a plurality of first terms, wherein each of the plurality of first terms is obtained from a sign of an element of a second matrix and an element of a first matrix, and the element of the first matrix corresponds to the element of the second matrix;

each element of the first matrix is obtained from a sum of a first horizontal predicted sample gradient that corresponds to a first reference frame of the current block and a second horizontal predicted sample gradient that corresponds to a second reference frame of the current block, wherein the first horizontal predicted sample gradient and the second horizontal predicted sample gradient correspond to the element of the first matrix; and each element of the second matrix is obtained from a sum of a first vertical predicted sample gradient that corresponds to the first reference frame of the current block and a second vertical predicted sample gradient that corresponds to the second reference frame of the current block, wherein the first vertical predicted sample gradient and the second vertical predicted sample gradient correspond to the element of the second matrix; and determining prediction sample values of the current block using the prediction sample values corresponding to the first reference frame, the prediction sample values corresponding to the second reference frame, and the horizontal motion offset and the vertical motion offset; and obtain residual information of the current block based on sample values of the current block and the prediction sample values of the current block; and encode information associated with the current block into a bitstream for transmission, wherein the information associated with the current block comprises the residual information of the current block and indication information, and wherein the indication information indicates the pair of motion vectors for the current block.

12. The encoding apparatus of claim 11, wherein the vertical motion offset is derived based on the horizontal motion offset, a second variable $s_2$, a fourth variable $s_4$ and the fifth variable $s_5$, wherein:

the second variable $s_2$ indicates a sum of absolute values of elements of the second matrix; and the fourth variable $s_4$ indicates a sum of a plurality of second terms, wherein each of the plurality of second terms is obtained from a sign of an element of the second matrix and an element of a third matrix, and the element of the third matrix corresponds to the element of the second matrix, and each element of the third matrix is a difference which is obtained from a first predicted sample of the first reference frame that corresponds to the element of the third matrix and a second predicted sample of the second reference frame that corresponds to the element of the third matrix.

13. The encoding apparatus of claim 12, wherein the horizontal motion offset is derived based on a first variable $s_1$ and a third variable $s_3$;

the first variable $s_1$ indicates a sum of absolute values of elements of the first matrix; and the third variable $s_3$ indicates a sum of a plurality of third terms, wherein each of the plurality of third terms is obtained from a sign of an element of the first matrix and an element of the third matrix, and the element of the third matrix corresponds to the element of the first matrix.

14. The encoding apparatus of claim 13, wherein the horizontal motion offset is determined according to $$v_x = -\frac{s_3}{s_1}$$

wherein:

$v_x$ represents the horizontal motion offset.

15. The encoding apparatus of claim 12, wherein the vertical motion offset $v_y$ is determined according to $$v_y = -\frac{(s_4 - v_x * s_5/2)}{s_2},$$

wherein:

$v_x$ represents the horizontal motion offset; and $v_y$ represents the vertical motion offset.

16. The encoding apparatus of claim 14, wherein $s_1$, $s_2$, $s_3$, $s_4$ and $s_5$ are determined as:

$$S_1 = \sum_{i,j} \text{abs}(G_{x1} + G_{x0});$$

$$S_2 = \sum_{i,j} \text{abs}(G_{y1} + G_{y0}),$$

$$S_3 = \sum_{i,j} \text{sign}(G_{x1} + G_{x0}) * (I^{(1)} - I^{(0)}),$$

$$S_4 = \sum_{i,j} \text{sign}(G_{y1} + G_{y0}) * (I^{(1)} - I^{(0)}),$$

$$S_5 = \sum_{i,j} \text{sign}(G_{y1} + G_{y0}) * (G_{x1} + G_{x1});$$

and wherein:

$I^{(0)}$ is obtained from the prediction sample values that correspond to the first reference frame, and $I^{(1)}$ is obtained from the prediction sample values that correspond to the second reference frame;

$G_{x0}$ and $G_{x1}$ indicate the first horizontal predicted sample gradient and the second horizontal predicted sample gradient that correspond to the first reference frame and the second reference frame, respectively;

$G_{y0}$ and $G_{y1}$ indicate the first vertical predicted sample gradient and the second vertical predicted sample gradient that correspond to the first reference frame and the second reference frame, respectively; and i and j are integer numbers, wherein a value of i varies from −1 to 4, and a value of j varies from −1 to 4.

17. The encoding apparatus of claim 16, wherein the Gro is determined as a difference obtained from two predicted samples that correspond to the first reference frame along a horizontal direction, and the $G_{y0}$ is determined as a difference obtained from two predicted samples that correspond to the first reference frame along a vertical direction.

18. The encoding apparatus of claim 16, wherein the $G_{x1}$ is determined as a difference obtained from two predicted samples that correspond to the second reference frame along a horizontal direction, and the $G_{y1}$ is determined as a difference obtained from two predicted samples that correspond to the second reference frame along a vertical direction.

19. The encoding apparatus of claim 11, wherein reference frames indications are also encoded into the bitstream, and the reference frames indications indicate that the first reference frame from a first reference frame list L0 is associated with a motion vector MV0 in the pair of motion vectors and the second reference frame from a second reference frame list L1 is associated with a motion vector MV1 in the pair of motion vectors.

20. The encoding apparatus of claim 11, wherein the prediction sample values for the current block are bi-predicted sample values based on bi-directional optical flow (BDOF) prediction.

21. A computer-readable medium storing computer instructions that, when executed by one or more processors, cause an encoding apparatus to:

perform bi-directional optical flow (BDOF) based inter prediction for a current block of a video signal, by:

obtaining a pair of motion vectors for the current block with respect to a first reference frame and a second reference frame;

obtaining prediction sample values corresponding to the first reference frame and prediction sample values corresponding to the second reference frame from the first reference frame and the second reference frame, respectively, using the pair of motion vectors for the current block with respect to the first reference frame and the second reference frame;

determining a horizontal motion offset $v_x$ and a vertical motion offset $v_y$ of the current block, and wherein the vertical motion offset is determined based on the horizontal motion offset and a fifth variable $s_5$, wherein:

the fifth variable $s_5$ indicates a sum of a plurality of first terms, wherein each of the plurality of first terms is obtained from a sign of an element of a second matrix and an element of a first matrix, and the element of the first matrix corresponds to the element of the second matrix;

each element of the first matrix is obtained from a sum of a first horizontal predicted sample gradient that corresponds to a first reference frame of the current block and a second horizontal predicted sample gradient that corresponds to a second reference frame of the current block, wherein the first horizontal predicted sample gradient and the second horizontal predicted sample gradient correspond to the element of the first matrix; and each element of the second matrix is obtained from a sum of a first vertical predicted sample gradient that corresponds to the first reference frame of the current block and a second vertical predicted sample gradient that corresponds to the second reference frame of the current block, wherein the first vertical predicted sample gradient and the second vertical predicted sample gradient correspond to the element of the second matrix; and determining prediction sample values of the current block using the prediction sample values corresponding to the first reference frame, the prediction sample values corresponding to the second reference frame, and the horizontal motion offset and the vertical motion offset; and the instructions, when executed by the one or more processors, causes the encoding apparatus to further:

obtain residual information of the current block based on sample values of the current block and the prediction sample values of the current block; and encode information associated with the current block into a bitstream for transmission, wherein the information associated with the current block comprises the residual information of the current block and indication information, and wherein the indication information indicates the pair of motion vectors for the current block.

22. A non-transitory computer-readable medium storing a bitstream and one or more instructions executable by at least one processor to perform operations of encoding or decoding of the bitstream, the operations comprising:

performing bi-directional optical flow, BDOF, based inter prediction for a current block of a video, by:

obtaining a pair of motion vectors for the current block with respect to a first reference frame and a second reference frame;

obtaining prediction sample values corresponding to the first reference frame and prediction sample values corresponding to the second reference frame from the first reference frame and the second reference frame, respectively, using the pair of motion vectors for the current block with respect to the first reference frame and the second reference frame;

determining a horizontal motion offset $v_x$ and a vertical motion offset $v_y$ of the current block, and wherein the vertical motion offset is determined based on the horizontal motion offset and a fifth variable $s_5$, wherein:

the fifth variable $s_5$ indicates a sum of a plurality of first terms, wherein each of the plurality of first terms is obtained from a sign of an element of a second matrix and an element of a first matrix, and the element of the first matrix corresponds to the element of the second matrix;

each element of the first matrix is obtained from a sum of a first horizontal predicted sample gradient that corresponds to a first reference frame of the current block and a second horizontal predicted sample gradient that corresponds to a second reference frame of the current block, wherein the first horizontal predicted sample gradient and the second horizontal predicted sample gradient correspond to the element of the first matrix; and each element of the second matrix is obtained from a sum of a first vertical predicted sample gradient that corresponds to the first reference frame of the current block and a second vertical predicted sample gradient that corresponds to the second reference frame of the current block, wherein the first vertical predicted sample gradient and the second vertical predicted sample gradient correspond to the element of the second matrix; and determining prediction sample values of the current block using the prediction sample values corresponding to the first reference frame, the prediction sample values corresponding to the second reference frame, and the horizontal motion offset and the vertical motion offset;

obtaining residual information of the current block based on sample values of the current block and the prediction sample values of the current block; and encoding information associated with the current block into the bitstream, wherein the information associated with the current block comprises the residual information of the current block and indication information, and wherein the indication information indicates the pair of motion vectors for the current block.

* * * * *